(12) United States Patent
Park et al.

(10) Patent No.: US 12,089,063 B2
(45) Date of Patent: Sep. 10, 2024

(54) METHOD AND APPARATUS FOR CONTROLLING BEAM IN WIRELESS COMMUNICATION SYSTEM

(71) Applicant: ELECTRONICS AND TELECOMMUNICATIONS RESEARCH INSTITUTE, Daejeon (KR)

(72) Inventors: Soon Gi Park, Daejeon (KR); Jun Sik Kim, Daejeon (KR); Seung Jae Bahng, Daejeon (KR); Jung Sook Bae, Daejeon (KR); Heesoo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 294 days.

(21) Appl. No.: 17/520,165

(22) Filed: Nov. 5, 2021

(65) Prior Publication Data
US 2022/0150719 A1    May 12, 2022

(30) Foreign Application Priority Data

Nov. 6, 2020  (KR) .................. 10-2020-0148150
Nov. 5, 2021  (KR) .................. 10-2021-0151671

(51) Int. Cl.
*H04W 16/28*    (2009.01)
*H04B 7/185*    (2006.01)

(52) U.S. Cl.
CPC ........ *H04W 16/28* (2013.01); *H04B 7/18506* (2013.01)

(58) Field of Classification Search
CPC ............... H04W 16/28; H04W 72/046; H04W 74/0833; H04W 24/10; H04W 72/0446;
(Continued)

(56) References Cited

U.S. PATENT DOCUMENTS 10,263,679 B2    4/2019  Kim et al.
10,355,761 B2    7/2019  Chen
(Continued)

FOREIGN PATENT DOCUMENTS

EP          3217577 B1 *  1/2022  ............ H01Q 1/084
KR        20200067091 A   6/2020

OTHER PUBLICATIONS

Morteza Hashemi et al., "Efficient Beam Alignment in Millimeter Wave Systems Using Contextual Bandits", IEEE INFOCOM 2018, pp. 1-10, Dec. 22, 2017.
(Continued)

*Primary Examiner* — Khalid W Shaheed
(74) *Attorney, Agent, or Firm* — Rabin & Berdo, P.C.

(57) ABSTRACT

A beam alignment method performed by a first communication node in a communication system may comprise: identifying a position of a first antenna of the first communication node; configuring a first coordinate system based on a physical position and direction of the first antenna, based on information on the position of the first antenna; identifying a position of a second antenna of a second communication node of the communication system; converting information on the position of the second antenna into coordinate information based on the first coordinate system; calculating direction change values of the first antenna based on the information on the position of the second antenna, which is converted based on the first coordinate system; changing a direction of the first antenna based on the direction change values of the first antenna; and updating a beam alignment state between the first and second antennas.

17 Claims, 32 Drawing Sheets

(58) Field of Classification Search
CPC . H04W 56/001; H04B 7/0695; H04B 7/0617; H04B 7/088; H04B 7/0408
See application file for complete search history.

(56) References Cited

U.S. PATENT DOCUMENTS

| | | |
|---|---|---|
| 10,637,558 B2 | 4/2020 | Wang et al. |
| 10,720,987 B2 | 7/2020 | Wang et al. |
| 11,082,903 B2 | 8/2021 | Yun et al. |
| 2020/0186220 A1 | 6/2020 | Freedman et al. |
| 2020/0186293 A1 | 6/2020 | You |
| 2020/0266889 A1 | 8/2020 | Lantz et al. |
| 2020/0372807 A1 | 11/2020 | Li et al. |

OTHER PUBLICATIONS

Jiri Pokorny et al., "Concept design and performance evaluation of UAV-based backhaul link with antenna steering" Journal of Communications and Networks, vol. 20, No. 5, Oct. 2018.

* cited by examiner

PAH(Physical Antenna Head) VWU coordinate system

MBT PAH reference position
(left hand)

MBH PAH reference position
(left hand)

RNH(Real North Head) VWU coordinate system

PAH VWU coordinate system

MBT PAH reference position (left hand)

AFH(Aerial Flight Head) VWU coordinate system

AFH reference position (left hand)

FIG. 13B

```
<PAGING MESSAGE> MBH → MBT (through PCCH)
S1310—[Option] MBH Antenna info
   - MBH Antenna's Position Type
         Type Flag = 0: GPS Coordinate System
                  = 1: Geocentric Coordinate System - GPS-like & EE Altitude Add
                  = 2: Geocentric Coordinate System - Axis Distance Expression
   - MBH Antenna's Position Info.
         (in case of 0) (GPS B(Lat. B(λ),.Lon. B(Ψ), GPS Altitude B)
         (in case of 1) (GCS B(Lat. B(λ),.Lon. B(Ψ), GPS Altitude B + EE Altitude B)
         (in case of 2) (GCS B(XB, YB, ZB))
   - [option] MBT Antenna Tx Power [dBm]
   - [option] MBT Antenna Beam Width (Vertical°, Horizontal° )
S1320—[option] MBT Antenna's Beam Position Info List[2]
         List.n = 1;
         [0] MBT Antenna's Position Type
               Type Flag = 0: GPS Coordinate System
                        = 1: Geocentric Coordinate System - GPS-like & EE Altitude Add
                        = 2: Geocentric Coordinate System - Axis Distance Expression
              MBT Antenna's Position Info,
                  (in case of 0) (GPS A(Lat. A(λ),.Lon. A(Ψ), GPS Altitude A)
                  (in case of 1) (GCS A(Lat. A(λ),.Lon. A(Ψ), GPS Altitude A + EE Altitude A)
                  (in case of 2) (GCS A(XA, YA, ZA))
```

FIG. 18B

```
<RRC MESSAGE> MBH → MBT (through DCCH)
S1810—[Option] MBH-driven Beam Alignment info
      - MBH-driven beam align. lock flag:setup(1), release(0), mutual-movement(2)
      - MBH-driven beam align. Activation time: X seconds
         [option] Duration Time: Y seconds (in case of 1,2)
S1820—[Option] MBH Antenna Info
      - MBH Antenna's Position Type
         Type Flag = 0 : GPS Coordinate System
                  = 1 : Geocentric Coordinate System - GPS-like & EE Altitude Add
                  = 2 : Geocentric Coordinate System - Axis Distance Expression
      - MBH Antenna's Position Info.
         (in case of 0) (GPS B(Lat. B($\lambda$).,Lon. B($\Psi$), GPS Altitude B)
         (in case of 1) (GCS B(Lat. B($\lambda$).,Lon. B($\Psi$), GPS Altitude B + EE Altitude B)
         (in case of 2) (GCS B(XB, YB, ZB))
      - [option] MBH Antenna Tx Power [dBm]
      - [option] MBH Antenna Beam Width (Vertical°,Horizontal° )
S1830—[Option] MBT Antenna's Beam Position Info List[2]
         List.n = 1;
         [0] MBT Unique Identity
             MBT Antenna's Position Type
                Type Flag = 0: GPS Coordinate System
                         = 1: Geocentric Coordinate System - GPS-like & EE Altitude Add
                         = 2: Geocentric Coordinate System - Axis Distance Expression
             MBT Antenna's Position Info,
                (in case of 0) (GPS A(Lat. A($\lambda$).,Lon. A($\Psi$), GPS Altitude A)
                (in case of 1) (GCS A(Lat. A($\lambda$).,Lon. A($\Psi$), GPS Altitude A + EE Altitude A)
                (in case of 2) (GCS A(XA, YA, ZA))
```

FIG. 18C

<RRC MESSAGE> MBT → MBH (through DCCH)
S1840—[Option] MBT Antenna's Position Info.
    MBT Unique Identity
    MBT Antenna's Position Type
        Type Flag = 0: GPS Coordinate System
                 = 1: Geocentric Coordinate System - GPS-like & EE Altitude Add
                 = 2: Geocentric Coordinate System - Axis Distance Expression
    MBT Antenna's Position Info.
        (in case of 0) (GPS A (Lat. A($\lambda$), Lon. A($\psi$), GPS Altitude A)
        (in case of 1) (GCS A (Lat. A($\lambda$), Lon. A($\psi$), GPS Altitude A + EE Altitude A)
        (in case of 2) (GCS A (XA, YA, ZA))
    - [option] MBT Antenna Tx Power [dBm]
    - [option] MBT Antenna Beam Width (Vertical°, Horizontal°)
S1850—[Option] MBH Antenna Info
    - MBH Antenna's Position Type
        Type Flag = 0 : GPS Coordinate System
                 = 1 : Geocentric Coordinate System - GPS-like & EE Altitude Add
                 = 2 : Geocentric Coordinate System - Axis Distance Expression
    - MBH Antenna's Position Info.
        (in case of 0) (GPS B (Lat. B($\lambda$), Lon. B($\psi$), GPS Altitude B)
        (in case of 1) (GCS B (Lat. B($\lambda$), Lon. B($\psi$), GPS Altitude B + EE Altitude B)
        (in case of 2) (GCS B (XB, YB, ZB))

METHOD AND APPARATUS FOR CONTROLLING BEAM IN WIRELESS COMMUNICATION SYSTEM

CROSS-REFERENCE TO RELATED APPLICATIONS

This application claims priority to Korean Patent Applications No. 10-2020-0148150 filed on Nov. 6, 2020, and No. 10-2021-0151671 filed on Nov. 5, 2021 with the Korean Intellectual Property Office (KIPO), the entire contents of which are hereby incorporated by reference.

BACKGROUND

1. Technical Field

The present disclosure relates to a beam control technique in a wireless communication system, and more particularly, to a beam control technique for effectively controlling a beam alignment operation between a communication node mounted on an aerial vehicle such as a drone and a communication node performing with the communication node mounted on the aerial vehicle.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies. Recently, research on 6th Generation (6G) wireless communication technologies, which are technologies beyond the 5G wireless communication, is also being conducted.

Recently, the use of aerial vehicles (AVs) or unmanned aerial vehicles (UAVs), such as drones, has been widely spread around the world. In the 5G or later wireless communication technologies, research for constructing a radio access network using base stations (hereinafter, referred to as 'aerial base stations') mounted on aerial vehicles is being conducted. The aerial base station (ABS) is mounted on an aerial vehicle such as a drone, airship, and air balloon to form a cell coverage in a place where the existing communication infrastructure is not constructed, such as a disaster or rescue site, and provide services to users or terminals. The aerial base station may perform communication with terrestrial communication nodes in a wired or tethered manner. Alternatively, the aerial base station may use wireless links to communicate with terrestrial or non-terrestrial communication nodes. The aerial base station may have an advantage that it is less likely to experience a communication failure due to obstacles on a wireless communication path, compared to a terrestrial base station located on the ground.

Meanwhile, the aerial base station may perform wireless communication using beams in a relatively high frequency band in order to improve the communication quality of the wireless link. In this reason, beam alignment between the aerial base station and other communication nodes may greatly affect the communication quality between the aerial base station and other communication nodes. Unlike a base station located on the ground, an error in beam alignment due to an aerial hovering error or a positioning error may occur in the aerial base station. In order for the aerial base station to achieve a required communication quality, techniques capable of effectively performing initial beam alignment and beam alignment control according to subsequent hovering and movement of the aerial base station may be required.

Matters described in the related art are prepared to enhance understanding of the background of the present disclosure, and may include matters that are not already known to those of ordinary skill in the art to which the technologies to be described belong.

SUMMARY

Accordingly, exemplary embodiments of the present disclosure are directed to providing a method and an apparatus for controlling an aerial base station by effectively controlling a beam alignment operation for aligning beams used for the aerial base station to perform communication with a terrestrial communication node or another non-terrestrial communication node, thereby improving communication quality of the aerial base station.

A beam alignment method performed by a first communication node, according to a first exemplary embodiment of the present disclosure for achieving the above-described objective, may comprise: identifying a position of a first antenna of the first communication node; configuring a first coordinate system based on a physical position and direction of the first antenna, based on information on the position of the first antenna; identifying a position of a second antenna of a second communication node of the communication system; converting information on the position of the second antenna into coordinate information based on the first coordinate system; calculating direction change values of the first antenna based on the information on the position of the second antenna, which is converted based on the first coordinate system; changing a direction of the first antenna based on the direction change values of the first antenna; and updating a beam alignment state between the first and second antennas.

The first coordinate system may be a VWU coordinate system with the physical position of the first antenna as an origin and the direction of the first antenna as a V axis.

The updating may comprise: re-identifying information on the position of the first antenna when a predetermined timer event occurs; updating the first coordinate system based on the information on the position of the first antenna; re-converting the information on the position of the second antenna based on the updated first coordinate system; and recalculating the direction change values of the first antenna based on the re-converted information on the position of the second antenna.

The recalculating of the direction change values may comprise: comparing the recalculated direction change values of the first antenna with preset change margins; and changing the direction of the first antenna again based on the recalculated direction change values of the first antenna when the recalculated direction change values of the first antenna exceed the preset change margins.

The beam alignment method may further comprise: receiving a first signal transmitted from the second communication node; and adjusting the beam alignment state between the first and second antennas based on information included in the first signal.

The first signal may include information on a transmission (TX) power and a beam width of a beam transmitted from the second communication node, and the adjusting of the beam alignment state may comprise: calculating an estimated range of a reception power (RP) when a beam transmitted from the second communication node is received at the first antenna, based on the information included in the first signal; receiving a beam transmitted from the second communication node; calculating an RP of the beam transmitted from the second communication node; and in response to determining that the RP of the beam transmitted from the second communication node is within the estimated range of the RP, determining that the beam alignment state is normal.

The first signal may include information on a transmission (TX) power and a beam width of a beam transmitted from the second communication node, and the adjusting of the beam alignment state may comprise: calculating an estimated range of a reception power (RP) when a beam transmitted from the second communication node is received at the first antenna, based on the information included in the first signal; receiving a first beam transmitted from the second communication node; calculating an RP of the first beam; in response to determining that the RP of the first beam is outside the estimated range of the RP, estimating an optimal reception point through physical control on the first antenna; and controlling the first antenna based on the estimated optimal reception point.

The estimating of the optimal reception point may comprise: receiving beams through the first antenna at each of three predetermined points, the beams being transmitted from the second communication node; and estimating a specific point between the three predetermined points as the optimal reception point based on RPs measured at the three predetermined points, wherein the three predetermined points are determined based on one of a projected area in which the beams transmitted from the second communication node are projected at a position of the first communication node, and a maximum rotatable angle supported by a direction control device in which an antenna of the first communication node is installed.

The estimating of the optimal reception point may comprise: receiving beams through the first antenna at each of three predetermined points, the beams being transmitted from the second communication node; and estimating a specific point between the three predetermined points as the optimal reception point based on RPs measured at the three predetermined points, wherein the three predetermined points are determined based on a predetermined movement interval reference set for an aerial vehicle on which the first communication node is mounted.

The adjusting of the beam alignment state may comprise: determining whether the beam alignment state is normal based on at least one of information on the position of the second antenna included in the first signal or information on the position of the first antenna identified by the second communication node; and in response to determining that the beam alignment state is not normal, adjusting the beam alignment state by physically controlling the first antenna based on the information included in the first signal.

The adjusting of the beam alignment state may comprise: determining whether the beam alignment state is normal based on at least one of information on the position of the second antenna included in the first signal or information on the position of the first antenna identified by the second communication node; and in response to determining that the beam alignment state is not normal, adjusting the beam alignment state by physically controlling an aerial vehicle on which the first communication node is mounted based on the information included in the first signal.

The beam alignment method may further comprise: identifying information on a movement path of the second communication node; transmitting, to the second communication node, a second signal indicating to change a direction of the second antenna based on the information on the movement path of the second communication node; and changing the direction of the first antenna based on information indicated by the second signal.

The beam alignment method may further comprise: identifying replacement information indicating that a third communication node of the communication system is to replace the second communication node; transmitting, to the second and third communication nodes, a third signal indicating not to change directions of the second antenna and a third antenna of the third communication node for a predetermined time, based on the replacement information; and changing the direction of the first antenna based on information indicated by the third signal.

A first communication node performing beam alignment in a communication system, according to another exemplary embodiment of the present disclosure for achieving the above-described objective, may comprise: a processor; a memory electronically communicating with the processor; and instructions stored in the memory, wherein when executed by the processor, the instructions cause the first communication node to: identify a position of a first antenna of the first communication node; configure a first coordinate system based on a physical position and direction of the first antenna, based on information on the position of the first antenna; identify a position of a second antenna of a second communication node of the communication system; convert information on the position of the second antenna into coordinate information based on the first coordinate system; calculate direction change values of the first antenna based on the information on the position of the second antenna, which is converted based on the first coordinate system; change a direction of the first antenna based on the direction change values of the first antenna; and update a beam alignment state between the first and second antennas.

The first coordinate system may be a VWU coordinate system with the physical position of the first antenna as an origin and the direction of the first antenna as a V axis.

The instructions may further cause the first communication node to: re-identify information on the position of the first antenna when a predetermined timer event occurs; update the first coordinate system based on the information on the position of the first antenna; re-convert the information on the position of the second antenna based on the updated first coordinate system; and recalculate the direction change values of the first antenna based on the re-converted information on the position of the second antenna.

The instructions may further cause the first communication node to: receive a first signal transmitted from the second communication node; and adjust the beam alignment state between the first and second antennas based on information included in the first signal.

The instructions may further cause the first communication node to: identify information on a movement path of the second communication node; transmit, to the second communication node, a second signal indicating to change a direction of the second antenna based on the information on the movement path of the second communication node; and change the direction of the first antenna based on information indicated by the second signal.

The instructions may further cause the first communication node to: identify replacement information indicating that a third communication node of the communication system is to replace the second communication node; transmit, to the second and third communication nodes, a third signal indicating not to change directions of the second antenna and a third antenna of the third communication node for a predetermined time, based on the replacement information; and change the direction of the first antenna based on information indicated by the third signal.

According to exemplary embodiments of the present disclosure, a beam alignment operation for communication between a communication node mounted on an aerial vehicle such as an aerial base station and another communication node can be effectively performed. To this end, each communication node may process coordinate information based on a plurality of coordinate systems such as a GPS coordinate system, a geocentric coordinate system (GCS), an RVCS coordinate system, and a PAH coordinate system. According to exemplary embodiments of the present disclosure, the aerial base station performing communication in the air can effectively maintain a wireless connection with another communication node on the ground or in the air, such as a wireless backhaul link for communication with a core network.

BRIEF DESCRIPTION OF DRAWINGS

FIGS. 13A and 13B are exemplary diagrams for describing a fifth exemplary embodiment of a beam control method in a communication system.

FIGS. 18A to 18C are exemplary diagrams for describing a tenth exemplary embodiment of a beam control method in a communication system.

DETAILED DESCRIPTION

Figure 1:
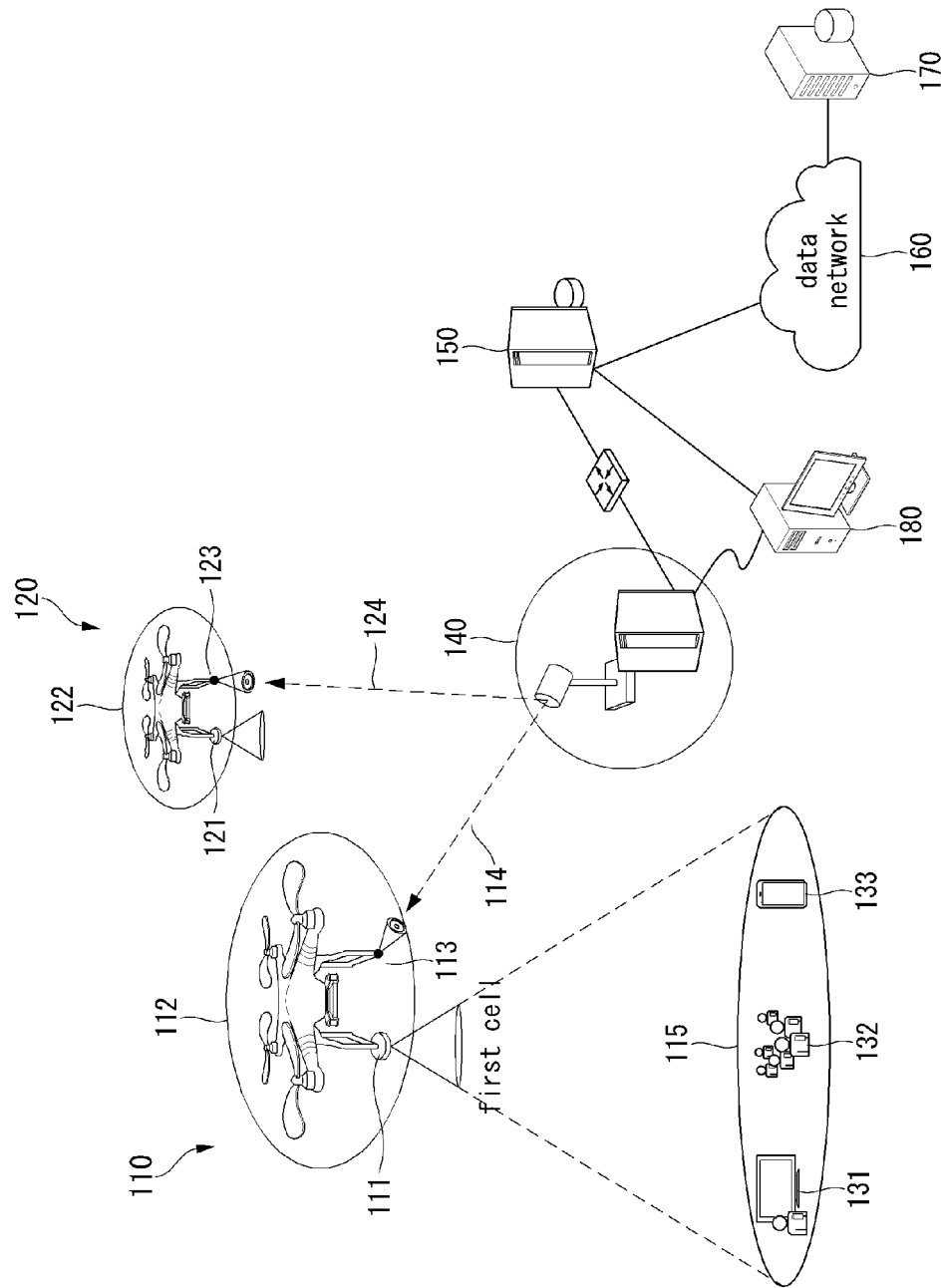
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, an access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B, evolved node B (eNodeB), base transceiver station, mobile multihop relay (MMR)-BS, or the like, and may include all or part of functions of the base station, access point, radio access station, nodeB, eNodeB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may include one or more communication nodes 111, 112, 113, 121, 123, 131, 132, 133, 140, 150, and 180. At least some of the one or more communication nodes 111, 112, 113, 121, 123, 131, 132, 133, 140, 150, and 180 may support 4G communication (e.g., long term evolution (LTE), LTE-Advanced (LTE-A)), 5G communication (e.g., new radio (NR)), or wireless communication after 5G (e.g., 6G communication, etc.) defined by the 3$^{rd}$ generation partnership project (3GPP). The 4G communication may be performed in a frequency band of 6 GHz or below. The 5G communication or wireless communications after the 5G communication may be performed not only in a frequency band of 6 GHz or below but also in a frequency band of 6 GHz or above. Meanwhile, at least some of the one or more communication nodes 111, 112, 113, 121, 123, 131, 132, 133, 140, 150, and 180 may perform mutual communications according to an independent scheme or an independent scheme. For example, an exemplary embodiment of the communication system 100 may include a first base station 111, a second base station 121, and/or a core network 150. The first base station 111 and the second base station 121 may support an orthogonal frequency division multiplexing (OFDM)-based 4G communication protocol, 5G communication protocol, and/or evolved communication protocol after the 5G communication. Here, when the communication system 100 supports the 4G communication, the core network 150 may include a serving-gateway (S-GW), a packet data network (PDN)-gateway (P-GW), a mobility management entity (MME), and the like. When the communication system 100 supports the 5G communication, the core network may include a user plane function (UPF), a session management function (SMF), an access and mobility management function (AMF), and the like. Meanwhile, each of the plurality of communication nodes 111, 112, 113, 121, 123, 131, 132, 133, 140, 150, and 180 constituting the communication system 100 may have the following structure.

Figure 2:
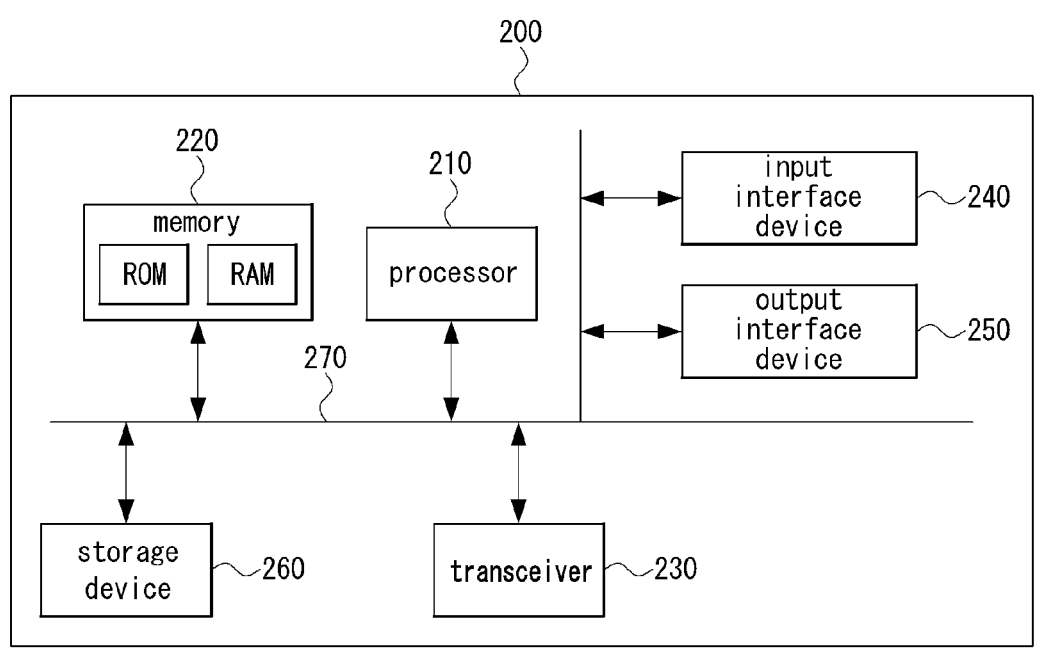
FIG. 2 is a block diagram illustrating a first exemplary embodiment of a communication node.

FIG. 2 is a block diagram illustrating a first exemplary embodiment of a communication node.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise one or more base stations 111 and 121, and one or more users or terminals 131, 132, and 133. A network formed by the one or more base stations 111 and 121, and the one or more users or terminals 131, 132, and 133 may be referred to as an 'access network'. The one or more base stations 111 and 121 and the one or more users or terminals 131, 132, and 133 that are interconnected by wireless communication may be viewed as forming a 'radio access network'. Meanwhile, each of the one or more users or terminals 131, 132, and 133 may be referred to as a user equipment (UE), terminal, access terminal, mobile terminal, station, and subscriber station, mobile station, portable subscriber station, node, device, Internet of Things (IoT) device, mounted device (e.g., mounted module/device/terminal or on-board device/terminal, etc.), or the like.

Each of the one or more base stations 111 and 121 may operate in a different frequency band, or may operate in the same frequency band. The one or more base stations 111 and 121 may be connected to each other through an ideal backhaul link or non-ideal backhaul link. The one or more base stations 111 and 121 may exchange information with each other through the ideal backhaul link or non-ideal backhaul link. Each of the one or more base stations 111 and 121 may be directly or indirectly connected to the core network 150 through an ideal backhaul link or non-ideal backhaul link. Each of the one or more base stations 111 and 121 may transmit signals received from the core network 150 to the one or more users or terminals 131, 132, and 133, and transmit signals received from the one or more users or terminals 131, 132, and 133 to the core network 150.

In an exemplary embodiment of the communication system 100, at least some of the one or more base stations 111 and 121 may correspond to an aerial base station (ABS) mounted on an aerial vehicle (AV) 112 or 122. Here, a system configured with at least one aerial base station and at least one aerial vehicle may be referred to as an 'aerial vehicle system (AVS)' 110 or 120. Each of the AVSs 110 and 120 may include one or more mobile backhaul terminals (MBTs) 113 and 123 so that the aerial base stations 111 and 121 can be connected to another base station, a hub, or a core network. The one or more MBTs 113 and 123 may be mounted on the one or more aerial vehicles 112 and 122. The one or more MBTs 113 and 123 may be connected to a terrestrial base station, a hub, or a core network. For example, the one or more MBTs 113 and 123 may be connected to one or more mobile backhaul hubs (MBHs) connected to a core network 150 on the ground in a wired or wireless communication scheme. The one or more MBTs 113 and 123 may be connected to the one or more MBHs in a wired or wireless communication scheme. Links between the one or more MBTs 113 and 123 and the one or more MBHs may be referred to as 'backhaul links'. An exemplary embodiment of the communication system 100 may include a first hub 140 corresponding to an MBH. The one or more MBTs 113 and 123 may be connected to the first hub 140, thereby being connected to the core network 150 connected to the first hub 140.

In each AVS, the aerial vehicle on which the aerial base station is mounted may mean a device capable of moving or flying using a predetermined power in the air. For example, the aerial vehicle may correspond to a drone, an aerial airship, an air balloon, or the like. The aerial base station mounted on the aerial vehicle may move to a specific position in the air. The aerial base station may be mounted on the aerial vehicle to form a cell coverage at the specific position in the air, and may communicate with users or terminals within the cell coverage. In the AVS, the aerial vehicle may perform a flight function, and a communication function may be performed through the aerial base station. Hereinafter, an exemplary embodiment of the communication system will be described by taking as an example a situation in which two aerial base stations are included in the communication system as shown in FIG. 1. However, exemplary embodiments of the present disclosure are not limited thereto, and the present disclosure may be applied to various exemplary embodiments. For example, the communication system may be configured to include one aerial base station, or three or more aerial base stations.

The communication system 100 may include aerial base stations such as the first base station 111 and the second base station 121. Each of the first base station 111 and the second base station 121 may be mounted on an aerial vehicle such as the first aerial vehicle 112 and the second aerial vehicle 122. The first aerial vehicle 112 and the second aerial vehicle 122 may be equipped with the first base station 111 and the second base station 121, respectively, and may move in the air or may perform hovering in a specific position in the air. Each of the first base station 111 and the second base station 121 may form a cell coverage in the air to perform wireless communication with one or more users or terminals within the formed cell coverage. For example, the first base station 111 may be mounted on the first aerial vehicle 112 to form a first cell 115 at a specific position in the air. The first base station 111 may communicate with one or more users or terminals 131, 132, and 133 located within the coverage of the first cell 115.

The first base station 111 and the first aerial vehicle 112 may constitute the first AVS 110. The first AVS 110 may be referred to as the 'first vehicle system' 110. The second base station 121 and the second aerial vehicle 122 may constitute the second AVS 120. The second AVS 120 may be referred to as the 'second vehicle system' 120.

Each of the first vehicle system 110 and the second vehicle system 120 may include one or more MBTs to connect the first base station 111 and the second base station 121 to a terrestrial base station, hub, or core network, respectively. For example, the first vehicle system 110 may include the first MBT 113 mounted on the first aerial vehicle 112. The second vehicle system 120 may include the second MBT 123 mounted on the second aerial vehicle 122.

The first base station 111 and the second base station 121 may be connected to the first hub 140 on the ground through the first MBT 113 and the second MBT 123, respectively. The first base station 111 and the second base station 121 may be connected to the core network 150 and the like through the first MBT 113, the second MBT 123, and the first hub 140. For example, the first base station 111 and the second base station 121 may be connected to the core network 150 on the ground through connection with the first MBT 113, the second MBT 123, and the first hub 140. The first MBT 113 and the second MBT 123 may be connected to the first hub 140 connected to the core network 150 on the ground in a wired or wireless communication scheme. The first hub 140 may correspond to, for example, an MBH. The communication link between the first MBT 113 or the second MBT 123 and the first hub 140 may be referred to as a first backhaul link 114 and a second backhaul link 124, respectively. The first base station 111 and the second base station 121 may be connected to the first hub 140 through the first MBT 113 and the second MBT 123, respectively. The first base station 111 and the second base station 121 may be connected to the core network 150 through the first hub 140, respectively. Each of the first base station 111 and the second base station 121 may be connected to a data network 160 and/or one or more application servers 170 through the core network 150.

Meanwhile, the communication system 100 may include a first control apparatus 180 for controlling the first base station 111, the first aerial vehicle 112, the first MBT 113, the second base station 121, the second aerial vehicle 122, the second MBT 123, the first hub 140, and/or the core network 150. The first control apparatus 180 may be connected to the components of the first vehicle system 110 and/or the second vehicle system 120 through the first hub 140. For example, the first control apparatus 180 may be connected to the first base station 111, the first aerial vehicle 112, the first MBT 113, the second base station 121, the second aerial vehicle 122, and/or the second MBT 123 through the first hub 140. The first control apparatus 180 may control operations of the first base station 111, the first aerial vehicle 112, the first MBT 113, the second base station 121, the second aerial vehicle 122 and/or the second MBT 123 through the first hub 140. Alternatively, the first control apparatus 180 may be connected to the first aerial vehicle system 110 and the second aerial vehicle system 120 through the first hub 140 to control the respective components.

The first control apparatus 180 may control the operations of the first and second AVSs 110 and 120 connected through the first hub 140 and components thereof. For example, the first control apparatus 180 may control wireless communication parameters such as wireless transmission powers of the first base station 111 and the second base station 121. In addition, the first control apparatus 180 may adjust antenna directions of the first base station 111 and the second base station 121. Meanwhile, the first control apparatus 180 may physically control the first aerial vehicle 112 and the second aerial vehicle 122. For example, the first control apparatus 180 may perform operations such as moving the positions of the first aerial vehicle 112 and the second aerial vehicle 122 or rotating the directions thereof. The first control apparatus 180 may adjust the antenna directions of the first base station 111 and the second base station 121, and the positions and/or directions of the first aerial vehicle 112 and the second aerial vehicle 122. In other words, the first control apparatus 180 may physically control the components of the first and second AVSs 110 and 120. The first control apparatus 180 may physically control the components of the first AVS 110 and the second AVS 120 to adjust the directions and positions on the ground, etc. of the first cell 115 and the second cell.

The aerial base stations such as the first base station 111 and the second base station 121 which are mounted on the aerial vehicles may have the advantage of being able to form cell coverages in a disaster situation or a place where the existing communication infrastructure is not constructed, and provide services to users or terminals. In addition, since the aerial base station transmits and receives radio signals in the air, it may have an advantage that it is less likely to experience a communication failure due to obstacles on a communication path compared to a base station installed on the ground.

Meanwhile, the aerial base station may perform wireless communication using beams in a relatively high frequency band in order to improve the communication quality of wireless links. In this reason, beam alignment between the aerial base station and other communication nodes may greatly affect the communication quality between the aerial base station and other communication nodes. Unlike a base station located on the ground, an error in beam alignment due to an aerial hovering error or a positioning error may occur in the aerial base station. In order for the aerial base station to achieve a required communication quality, techniques capable of effectively performing initial beam alignment and beam alignment control according to subsequent hovering and movement of the aerial base station may be required.

In the above, an exemplary embodiment of the communication system has been described with reference to the exemplary embodiment in which the AVS included in the communication system 100 includes the aerial base stations mounted on the aerial vehicles as an example. However, this is only an example for convenience of description, and exemplary embodiments of the present disclosure are not limited thereto. In another exemplary embodiment of the communication system, the AVS may include terminals mounted on aerial vehicles. For example, the AVS may be configured to include a predetermined terminal that is mounted on an aerial vehicle to photograph images and transmit the photographed images. As described above, the terminal mounted on the aerial vehicle may perform wireless communication with another communication node of the communication system 100 through beams. Here, the terminal may perform beam alignment control for wireless communications with another communication node of the communication system 100.

Figure 3A:
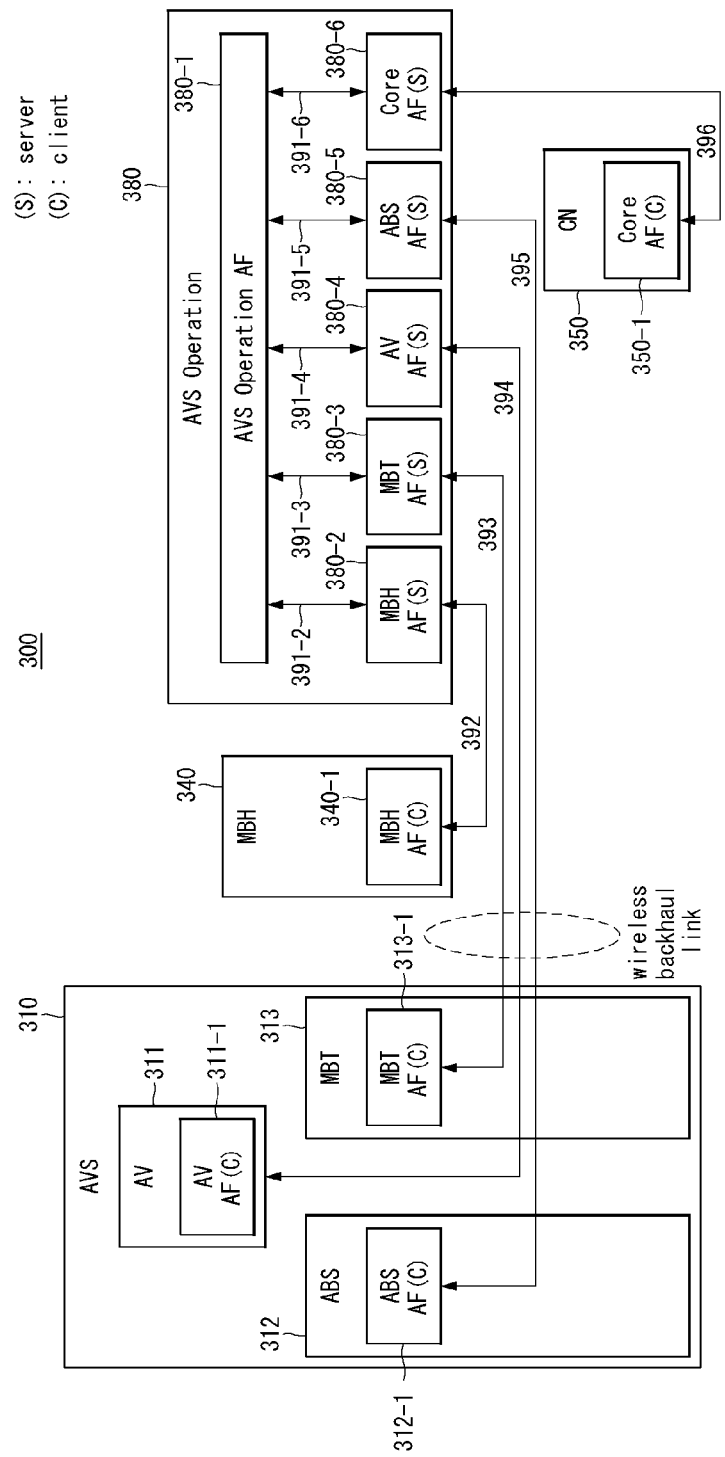
FIGS. 3A and 3B are block diagrams for describing an exemplary embodiment of an apparatus for controlling an aerial base station in a communication system.
Figure 3B:
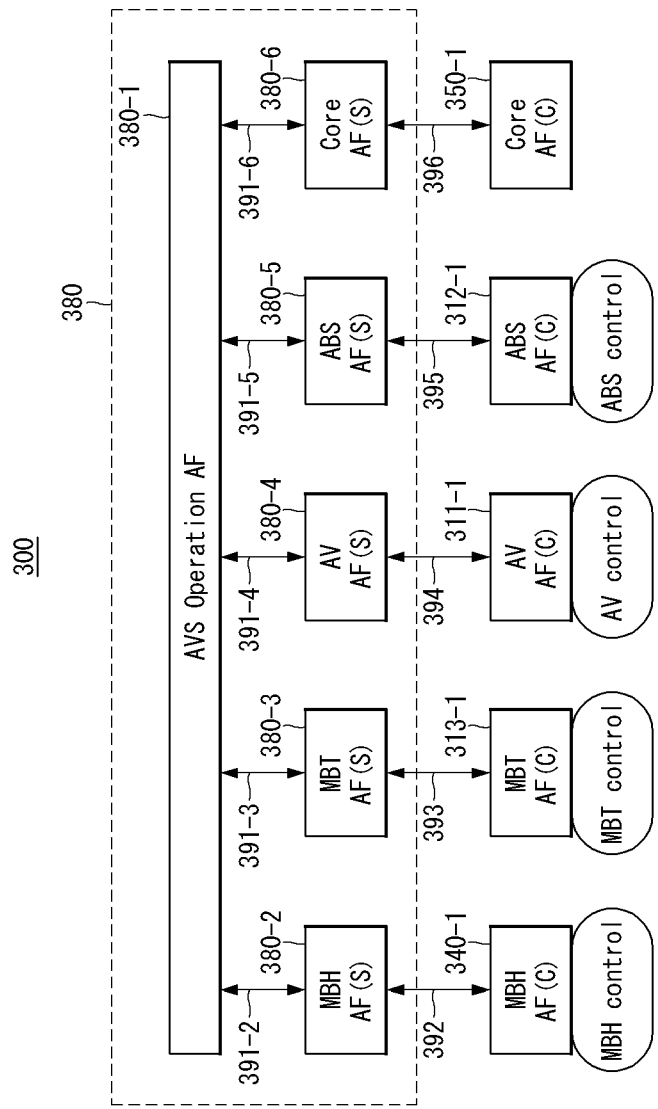

FIGS. 3A and 3B are block diagrams for describing an exemplary embodiment of an apparatus for controlling an aerial base station in a communication system.

Referring to FIGS. 3A and 3B, a communication system 300 may include an aerial base station control apparatus 380. The aerial base station control apparatus 380 may be connected to one or more AVSs 310, an MBH 340, a core network (CN) 350, and the like included in the communication system 300 in a wired or wireless communication scheme. The aerial base station control apparatus 380 may perform an aerial base station control operation through a control operation on at least some of the connected AVS 310, MBH 340, and CN 350. Here, the communication system 300 may be configured identically or similarly to the communication system 100 described with reference to FIG. 1. In other words, the communication system 100 described with reference to FIG. 1 may be configured identically or similarly to the communication system 300 described with reference to FIGS. 3A and 3B. The AVS 310 may be configured identically or similarly to the first and/or second AVSs 110 and 120 described with reference to FIG. 1. For example, the AVS 310 may include an aerial base station (ABS) 311, an aerial vehicle (AV) 312, and an MBT 313. The MBH 340 may be configured identically or similarly to the first hub 140 described with reference to FIG. 1. The CN 350 may be configured identically or similarly to the core network 150 described with reference to FIG. 1. The aerial base station control apparatus 380 may be configured identically or similarly to the first control apparatus 180 described with reference to FIG. 1.

In the system, the aerial base station control apparatus 380 may be referred to as an 'AVS operation apparatus', 'AVS operation server', or 'AVS operation'. The aerial base station control apparatus 380 may include one or more application functions (AFs) for controlling the aerial base stations or AVS. The aerial base station control apparatus 380 may include an AVS operation AF 380-1, MBH AF(S) 380-2, MBT AF(S) 380-3, AV AF(S) 380-4, ABS AF(S) 380-5, Core AF(S) 380-6, and the like. Here, the AVS operation AF 380-1 may establish connection 391-2, 391-3, 391-4, 391-5 or 391-6 with each of the one or more AFs 380-2, 380-3, 380-4, 380-5, and 380-6 included in the aerial base station control apparatus 380. The AVS operation AF 380-1 may control the one or more connected AFs 380-2, 380-3, 380-4, 380-5, and 380-6. Alternatively, the AVS operation AF 380-1 may perform control on other entities by being connected to AFs of other entities of the communication system 300 through other AFs 380-2, 380-3, 380-4, 380-5, and 380-6 included in the aerial base station control apparatus 380. Primitives, messages, information, etc. transmitted between the aerial base station control apparatus 380 and the respective entities for control may be transmitted through one or a combination of two or more among system information (e.g., master information block (MIB), system information block (SIB)), radio resource control (RRC) message, medium access control (MAC) control element (CE), and control information (e.g., downlink control information (DCI), uplink control information (UCI), sidelink control information (SCI)).

The AVS operation AF 380-1 may be connected to an MBH AF(C) 340-1 corresponding to a client-side AF of the MBH 340 through the MBH AF(S) 380-2 corresponding to a server-side AF. The AVS operation AF 380-1 may be connected to an MBT AF(C) 313-1 corresponding to a client-side AF of the MBT 313 through the MBT AF(S) 380-3 corresponding to a service-side AF. The AVS operation AF 380-1 may be connected to an AV AF(C) 312-1 corresponding to a client-side AF of the AV 312 through the AV AF(S) 380-4 corresponding to a server-end AF. The AVS operation AF 380-1 may be connected to an ABS AF(C) 311-1 corresponding to a client-side AF of the ABS 311 through the ABS AF(S) 380-5 corresponding to a server-side AF. The AVS operation AF 380-1 may be connected to a Core AF(C) 350-1 corresponding to a client-side AF of the CN 350 through the Core AF(S) 380-6 corresponding to a server-side AF. Each of the one or more server-side AFs 380-2, 380-3, 380-4, 380-5, and 380-6 included in the aerial base station control apparatus 380 may establish connection 392, 393, 394, 395, or 396 with each of the one or more client-side AFs 340-1, 313-1, 312-1, 311-1, and 350-1 included in different entities. The AVS operation AF 380-1 may perform communications with other entities and control on other entities through the connections 392, 393, 394, 395, and 396 between the one or more server-side AFs 380-2, 380-3, 380-4, 380-5, and 380-6 and the one or more client-side AFs 340-1, 313-1, 312-1, 311-1, and 350-1.

Referring to FIG. 3A, a wireless backhaul link may be formed between the MBH 340 and the AVS 310 or the MBT 313. The wireless backhaul link formed between the MBH 340 and the MBT 313 may be divided into two or more according to operations or tasks to be performed by the AVS 310. For example, the wireless backhaul link formed between the MBH 340 and the MBT 313 may be divided into a backhaul control plane protocol data unit session (i.e., BH CP PDU session) and a backhaul user plane protocol data unit session (i.e., BH UP PDU session). The BH UP PDU session may process a CP traffic and a UP traffic of the ABS with a BH ABS CP PDU session and a BH ABS UP PDU session, respectively. The aerial base station control apparatus 380 may process data for controlling each entity for operations or tasks to be performed by the AVS through the BH CP PDU session.

Referring to FIG. 3B, the AVS operation AF 380-1 may establish connections 391-2, 391-3, 391-4, 391-5, and 391-6 with the one or more AFs 380-2, 380-3, 380-4, 380-5, and 380-6 included in the aerial base station control apparatus 380, respectively. The one or more server-side AFs 380-2, 380-3, 380-4, 380-5, and 380-6 included in the aerial base station control apparatus 380 may establish connections 392, 393, 394, 395, and 396 with the client-side AFs 340-1, 313-1, 312-1, 311-1, and 350-1 included in different entities, respectively. Here, primitive groups may be defined between the respective connections 311-1, 312-1, 313-1, 340-1, 350-1, 392, 393, 394, 395, and 396 established between the respective AFs.

For example, a primitive group defined in a direction of the MBH AF(S) 380-2 between the AVS Operation AF 380-1 and the MBH AF(S) 380-2 may be referred to as 'AVSMBH_Primitives'. A primitive group defined between in a direction of the AVS operation AF 380-1 between the AVS Operation AF 380-1 and the MBH AF(S) 380-2 may be referred to as 'MBHAVS_Primitives'. A primitive group defined in a direction of the MBT AF(S) 380-3 between the AVS Operation AF 380-1 and the MBT AF(S) 380-3 may be referred to as 'AVSMBT_Primitives'. A primitive group defined in a direction of the AVS operation AF 380-1 between the AVS Operation AF 380-1 and the MBT AF(S) 380-3 may be referred to as 'MBTAVS_Primitives'. A primitive group defined in a direction of the AV AF(S) 380-4 between the AVS Operation AF 380-1 and the AV AF(S) 380-4 may be referred to as 'AVSAV_Primitives'. A primitive group defined in a direction of the AVS operation AF 380-1 between the AVS operation AF 380-1 and the AV AF(S) 380-4 may be referred to as 'AVAVS_Primitives'. A primitive group defined in a direction of the ABS AF(S) 380-5 between the AVS Operation AF 380-1 and the ABS AF(S) 380-5 may be referred to as 'AVSABS_Primitives'. A primitive group defined in a direction of the AVS operation AF 380-1 between the AVS operation AF 380-1 and the ABS AF(S) 380-5 may be referred to as 'ABSAVS_Primitives'. A primitive group defined in a direction of the Core AF(S) 380-6 between the AVS Operation AF 380-1 and the Core AF(S) 380-6 may be referred to as 'AVSCore_Primitives'. A primitive group defined in a direction of the AVS Operation AF 380-1 between the AVS Operation AF 380-1 and the Core AF(S) 380-6 may be referred to as 'CoreAVS_Primitives'.

Meanwhile, a primitive group defined in a direction of the MBH AF(C) 340-1 between the MBH AF(S) 380-2 and the MBH AF(C) 340-1 may be referred to as 'MBH_SC_Primitives'. A primitive group defined in a direction of the MBH AF(S) 380-2 between the MBH AF(S) 380-2 and the MBH AF(C) 340-1 may be referred to as 'MBH_CS_Primitives'. A primitive group defined in a direction of the MBT AF(C) 313-1 between the MBT AF(S) 380-3 and the MBT AF(C) 313-1 may be referred to as 'MBT_SC_Primitives'. A primitive group defined in a direction of the MBT AF(S) 380-3 between the MBT AF(S) 380-3 and the MBT AF(C) 313-1 may be referred to as 'MBT_CS_Primitives'. A primitive group defined in a direction of the AV AF(C) 312-1 between the AV AF(S) 380-4 and the AV AF(C) 312-1 may be referred to as 'AV_SC_Primitives'. A primitive group defined in a direction of the AV AF(S) 380-4 between the AV AF(S) 380-4 and the AV AF(C) 312-1 may be referred to as 'AV_CS_Primitives'. A primitive group defined in a direction of the ABS AF(C) 311-1 between the ABS AF(S) 380-5 and the ABS AF(C) 311-1 may be referred to as 'ABS_S-C_Primitives'. A primitive group defined in a direction of the ABS AF(S) 380-5 between the ABS AF(S) 380-5 and the ABS AF(C) 311-1 may be referred to as 'ABS_CS_Primitives'. A primitive group defined in a direction of the Core AF(C) 350-1 between the Core AF(S) 380-6 and the Core AF(C) 350-1 may be referred to as 'Core_SC_Primitives'. A primitive group defined in a direction of the Core AF(S) 380-6 between the Core AF(S) 380-6 and the Core AF(C) 350-1 may be referred to as 'Core_CS_Primitives'.

The aerial base station control apparatus 380 may perform a control operation on each entity through detail primitives defined in the primitive group defined between the respective AFs. For example, in Table 1, it can be seen that each primitive group and detailed primitives defined and used for MBH control, MBT control, AV control, ABS control, etc. shown in FIG. 3B are represented.

Figure 4A:
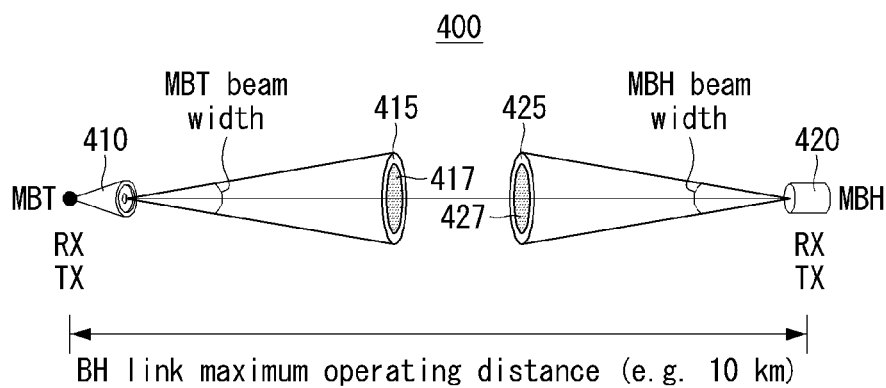
FIGS. 4A to 4C are conceptual diagrams for describing a first exemplary embodiment of a beam control method in a communication system.
Figure 4B:
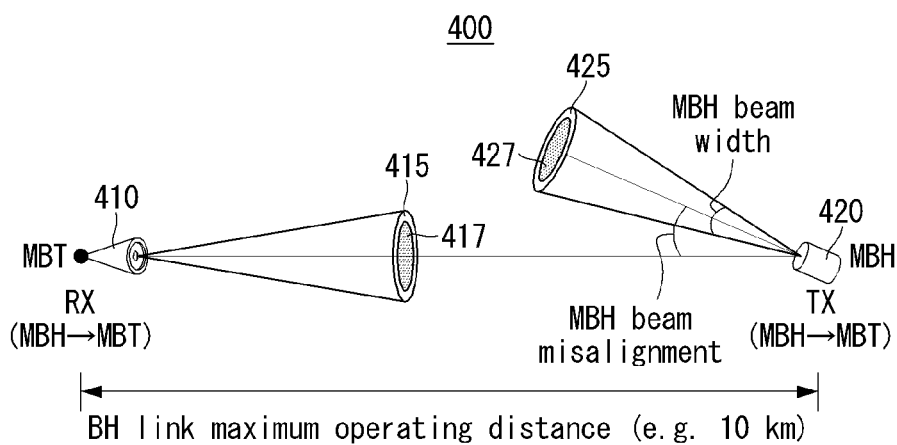
Figure 4C:
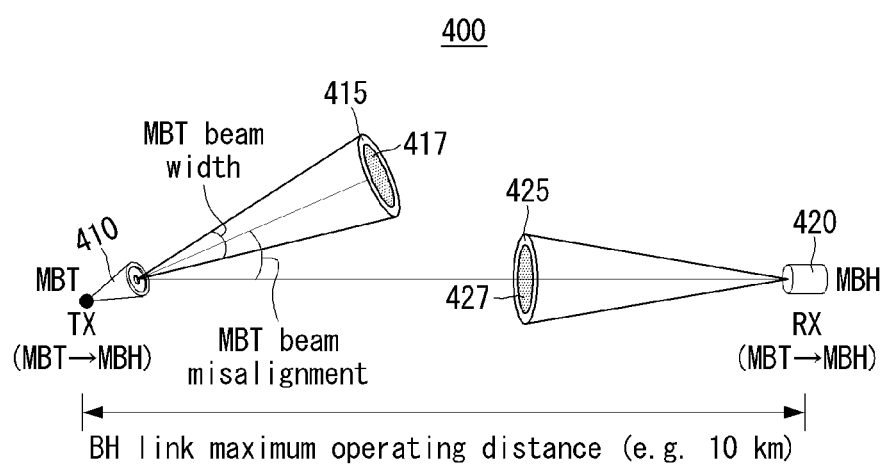

FIGS. 4A to 4C are conceptual diagrams for describing a first exemplary embodiment of a beam control method in a communication system.

Referring to FIGS. 4A to 4C, a communication system 400 may include a plurality of communication nodes that communicate with each other through beams. In FIGS. 4A to 4C, an exemplary embodiment in which the communication system 400 includes one MBT 410 and one MBH 420 performing mutual communication through beams is shown. Here, the MBT 410 may be the same as or similar to the first MBT 113 constituting the first AVS 110 described with reference to FIG. 1. The MBH 420 may be the same as or similar to the first hub 140 described with reference to FIG. 1. Hereinafter, in the description of the first exemplary embodiment of the beam control method in the communication system with reference to FIGS. 4A to 4C, content overlapping with those described with reference to FIGS. 1 to 3B may be omitted.

The MBT 410 mounted on an aerial vehicle such as a drone and the MBH 420 on the ground may establish a wireless backhaul link (i.e., BH link). The wireless backhaul link may be configured based on a beam having a high frequency, such as a millimeter wave. In an exemplary embodiment of the communication system 400, the MBT 410 may transmit a beam through an antenna of a horn antenna type. The MBH 420 may transmit a beam through an antenna of a Cassegrain antenna type. However, this is only an example for convenience of description, and exemplary embodiments of the present disclosure are not limited thereto.

In order to reduce a path loss in the wireless backhaul link, the MBT 410 and/or the MBH 420 may increase the frequency of the beam or sharpen the beam for transmission. A beam width of each beam may be calculated based on a horizontal or vertical angle. Alternatively, the beam width of each beam may be calculated based on a horizontal or vertical length at a specific point. The beam width of the beam may not be easy to be flexibly adjusted during communication. The sharper the beam width of the beam, the less path loss of the beam and the greater the maximum operating distance of the wireless backhaul link based on the beam. For example, in an exemplary embodiment of the communication system 400, when the beam width of the beam is 10 degrees, the maximum operating distance of the wireless backhaul link may be 2 km, and when the beam width is 5 degrees, the maximum operating distance of the wireless backhaul link may be 10 km. When the MBT 410 and/or the MBH 420 narrows the beam width of the beam to increase the operating distance of the wireless backhaul link, importance of a beam alignment operation between the MBT 410 and the MBH 420 may increase. If the aerial vehicle is operated on its own fuel or its own battery without a separate wired connection, there may be restrictions on a flight time. Accordingly, a time required for the beam alignment operation and the amount of power consumed by the beam alignment operation may need to be minimized.

Referring to FIG. 4A, the antenna of the MBT 410 and the antenna of the MBH 420 may be aligned toward each other. A state in which the antenna of the MBT 410 and the antenna of the MBH 420 are aligned toward each other may be referred to as a 'perfect mutual beam alignment' state.

The MBT 410 may transmit a beam having a predetermined beam width. The beam (hereinafter, 'MBT beam') transmitted by the MBT 410 may have a circular or circular-like cross-section 415. Due to the characteristics of the antenna of the MBT 410, a uniform expected power may be guaranteed only in a partial region 417 of the cross-section 415 of the MBT beam. The MBH 420 may transmit a beam having a predetermined beam width. The beam (hereinafter, 'MBH beam') transmitted by the MBH 420 may have a circular or circular-like cross-section 425. Due to the characteristics of the antenna of the MBH 420, a uniform expected power may be guaranteed only in a partial region 427 of the cross section 425 of the MBH beam.

In the alignment state as shown in FIG. 4A, beam transmission and reception (TRX) between the MBT 410 and the MBH 420 may be easy. That is, the beam transmitted from the antenna of the MBH 420 may be easily received at the antenna of the MBT 410. Conversely, the beam transmitted from the antenna of the MBT 410 may be easily received at the antenna of the MBH 420. If the MBT 410 or the MBH 420 operates a transmission antenna and a reception antenna separately, the transmission antenna of the MBH 420 and the reception antenna of the MBT 410 may have to be aligned with each other. Conversely, the transmission antenna of the MBT 410 and the reception antenna of the MBH 420 may have to be aligned with each other.

Referring to FIG. 4B, the antenna of the MBT 410 may be aligned in the direction of the MBH 420, and the antenna of the MBH 420 may not be aligned in the direction of the MBT 410. A state in which the antenna of the MBH 420 is not aligned in the direction of the MBT 410 may be referred to as a 'MBH misalignment' state.

In the MBH misalignment state, when an angle (hereinafter referred to as an 'MBH misalignment angle') between the direction in which the MBH beam is aligned and the direction of the MBT 410 is larger than the angle of the beam width of the MBH beam, wireless communication between the MBT 410 and the MBH 420 may not be easy. For example, if all the antennas responsible for radio signal transmission and reception (TRX) in the MBH 420 are misaligned, the MBH 420 cannot transmit a signal to the MBT 410 and receive a signal from the MBT 410. On the other hand, if the transmission antenna of the MBH 420 is aligned in the direction of the MBT 410 and the reception antenna is misaligned, the MBH 420 can transmit a radio signal to the MBT 410 but cannot receive a radio signal from the MBT 410. On the other hand, if the reception antenna of the MBH 420 is aligned in the direction of the MBT 410 and the transmission antenna is misaligned, the MBH 420 can receive a radio signal from the MBT 410, but cannot transmit a radio signal to the MBT 410.

Referring to FIG. 4C, the antenna of the MBH 420 may be aligned in the direction of the MBT 410, and the antenna of the MBT 410 may not be aligned in the direction of the MBH 420. A state in which the antenna of the MBT 410 is not aligned in the direction of the MBH 420 may be referred to as an 'MBT misalignment' state.

In the MBT misalignment state, when an angle (hereinafter referred to as an 'MBT misalignment angle') between the direction in which the MBT beam is aligned and the direction of the MBH 420 is larger than the angle of the beam width of the MBT beam, wireless communication between the MBT 410 and the MBH 420 may not be easy. For example, if all the antennas responsible for radio signal transmission and reception (TRX) in the MBT 410 are misaligned, the MBT 410 cannot transmit a signal to the MBH 420 and receive a signal from the MBH 420. On the other hand, if the transmission antenna of the MBT 420 is aligned in the direction of the MBH 420 and the reception antenna is misaligned, the MBT 410 can transmit a radio signal to the MBH 420 but cannot receive a radio signal from the MBH 420. On the other hand, if the reception antenna of the MBT 410 is aligned in the direction of the MBH 420 and the transmission antenna is misaligned, the MBT 410 can receive a radio signal from the MBH 420, but cannot transmit a radio signal to the MBH 420.

The MBT misalignment state and/or the MBH misalignment state shown in FIGS. 4B and 4C may occur due to a positioning error with respect to the MBT 410 and/or the MBH 420. Here, the positioning error may mean an error generated by a device or a sensor used for positioning. For example, when a Global Positioning System (GPS) is used for positioning, a positioning error may occur due to an error of the GPS itself or an error of a GPS module. When a level is used for positioning, a positioning error may occur due to an error of a level sensor. When a barometer is used for positioning, a positioning error may occur due to an error of a barometer sensor. When a real north (or, true north) sensor is used for positioning, a positioning error may occur due to an error of a true north sensor. When a magnetometer is used for positioning, a positioning error may occur due to an error of a magnetometer sensor. When an inertial sensor such as a gyroscope or an accelerometer is used for positioning, a positioning error may occur due to an error of the inertial sensor.

The positioning error generated by a device or a sensor used for positioning may be classified into a static error component and a drift error component. The static error component may mean an error component that does not change at a plurality of measurement time points. The drift error component may mean an error component that varies with time. For example, when positioning is performed at a plurality of time points through the GPS, an average of positioning errors included in positioning results at the plurality of time points may be defined as a static error component. Meanwhile, dispersion of positioning errors included in the positioning results at the plurality of time points may be defined as a drift error component. Alternatively, a remainder obtained by subtracting the static error component from the positioning errors included in the positioning results at the plurality of time points may be defined as a drift error component. On the other hand, the MBT misalignment state and/or the MBH misalignment state may occur due to an aerial hovering error of the aerial vehicle. For example, even if the aerial vehicle is intended to be stopped at a predetermined position in the air, it may not be able to maintain a complete hovering state due to a wind, air flow, operation error of a power unit, and the like, and may move little by little around the predetermined position. The drift error component of the positioning error and the aerial hovering error may be summed up as a 'dynamic error'.

The higher the performance of the positioning device, the smaller the positioning error may be. The higher the performance of a flight control device (or flight control software) of the aerial vehicle, the smaller the size of the aerial hovering error may be. However, a high performance positioning device and/or high performance flight control device may be expensive or heavy in weight. When an expensive positioning device and/or flight control device is used, the cost of configuring the system may increase. If a heavy positioning device and/or flight control device is used, the flight time of the aerial vehicle may be shortened.

In configuring the communication system 400, a positioning device and/or a flight control device having relatively low performance may be used. In this case, positioning errors and/or hovering errors may occur. Therefore, the MBT misalignment and/or MBH misalignment problem may occur. The MBT misalignment and/or MBH misalignment problem may occur during initial beam alignment or in the process of performing communication after initial beam alignment. The MBT misalignment and MBH misalignment may occur simultaneously, or either one of the MBT misalignment and MBH misalignment may occur. When the MBT misalignment and/or MBH misalignment problem occurs, a beam alignment operation may be performed to overcome the generated misalignment and achieve a perfect mutual beam alignment state. For example, the misalignment may occur due to one or more errors. If a total error angle, which reflects a sum of the one or more errors, is within a beam width angle (e.g., 5 degrees) of a beam, a separate beam alignment operation may not be required to overcome the misalignment, or the misalignment may be easily overcome through a relatively simple beam alignment operation. Even when the total error angle, which reflects the sum of the one or more errors, exceeds the beam width angle of the beam, if the dynamic error occurs within the beam width angle of the beam, the beam alignment operation may be relatively easy. On the other hand, if the total error angle, which reflects the sum of the one or more errors, exceeds the beam width angle of the beam and the dynamic error exceeds the beam width angle of the beam by 1 or 2 times or more, the beam alignment operation for overcoming the misalignment may not be easy. Accordingly, a control method and apparatus for effectively performing the beam alignment operation to overcome the misalignment may be required.

In FIGS. 4A to 4C, in the communication system 400 using a beam having a high frequency, such as a millimeter wave, as a communication medium, an exemplary embodiment of a beam control operation between a communication node mounted on an aerial vehicle and a communication node performing communication at a predetermined position on the ground may be shown. However, this is only an example for convenience of description, and exemplary embodiments of the present disclosure are not limited thereto. For example, the exemplary embodiment of the beam control method in the communication system 400 may be equally or similarly applied to a beam control operation between a plurality of communication nodes mounted on aerial vehicles. The exemplary embodiment of the beam control method in the communication system 400 may be equally or similarly applied to a beam control operation in a free space optic (FSO) communication system or a communication system using laser beams. The exemplary embodiment of the beam control method in the communication system 400 may be equally or similarly applied to a beam control operation between high-spec communication equipments having a maximum communication distance exceeding 10 km. For example, the exemplary embodiment of the beam control method in the communication system 400 may be equally or similarly applied to a beam control operation of a military beam having a maximum communication distance exceeding 100 km.

Figure 5A:
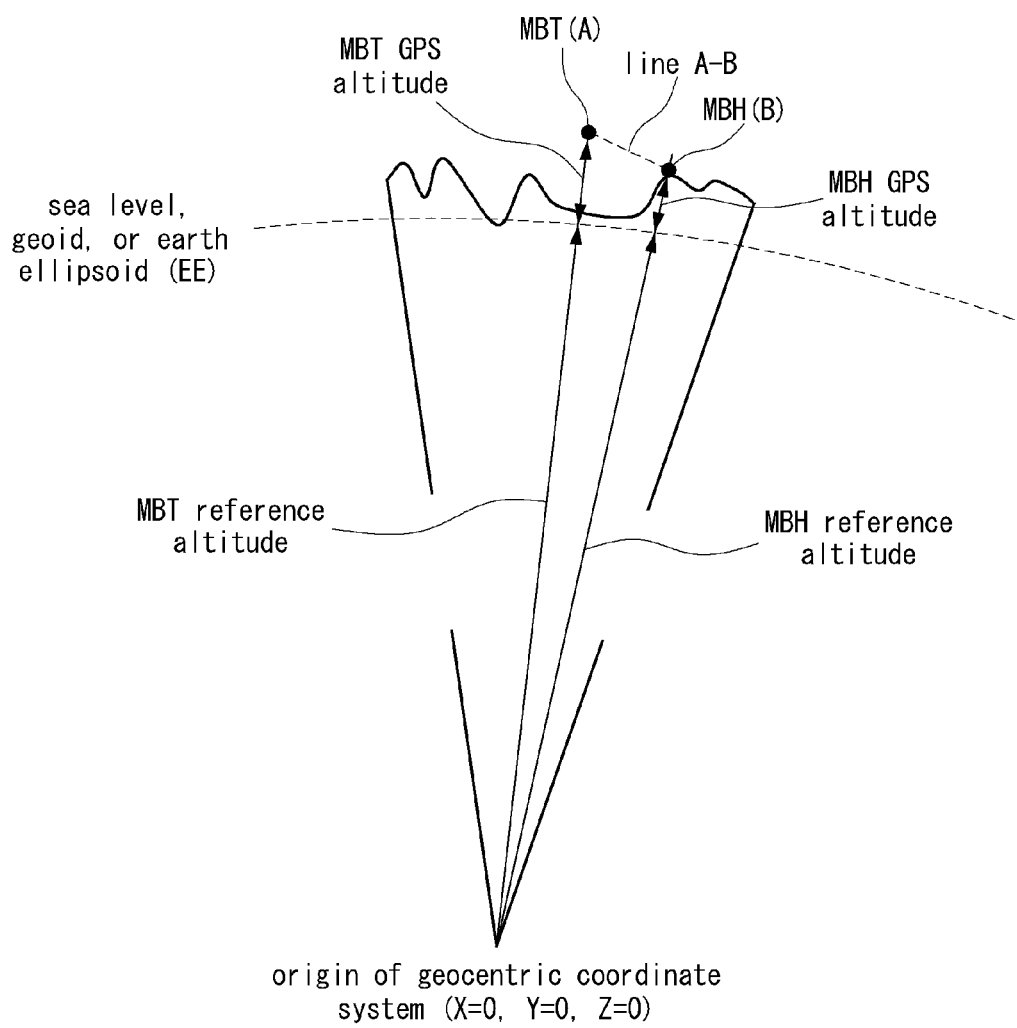
FIGS. 5A and 5B are conceptual diagrams for describing a first exemplary embodiment of a coordinate information expression method in a communication system.
Figure 5B:
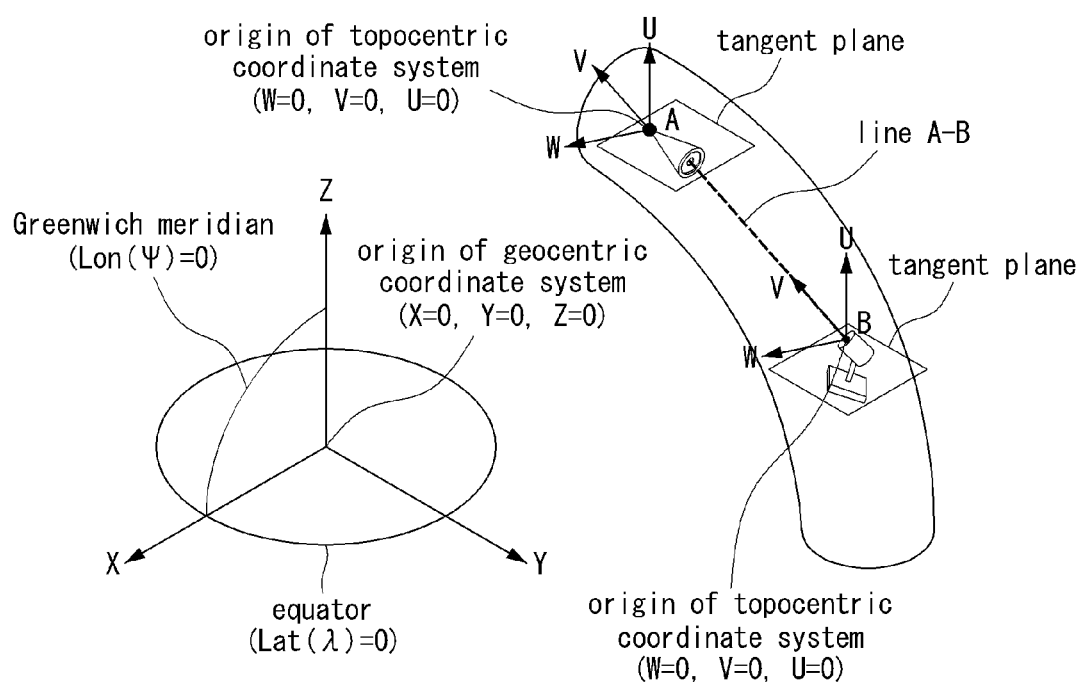

FIGS. 5A and 5B are conceptual diagrams for describing a first exemplary embodiment of a coordinate information expression method in a communication system.

FIG. 5A shows an exemplary embodiment of a method for expression coordinate information based on a geocentric coordinate system (GCS). FIG. 5B shows an exemplary embodiment of a method for expressing coordinate information based on the GCS and a topocentric coordinate system. In an exemplary embodiment of the communication system, coordinate information of communication nodes such as an MBT (A) and an MBH (B) may be expressed based on a coordinate system such as the GCS and/or topocentric coordinate system. Here, the MBT (A) and MBH (B) may be the same as or similar to the MBT 410 and MBH 420 described with reference to FIGS. 4A to 4C, respectively. Hereinafter, in describing exemplary embodiments of a method for expressing coordinate information in a communication system with reference to FIGS. 5A and 5B, content overlapping with those described with reference to FIGS. 1 to 4C may be omitted.

The MBT (A) and MBH (B) may obtain coordinate information by performing a position measurement (positioning) operation. The MBT (A) and the MBH (B) may obtain the other's coordinate information by mutually transmitting and receiving coordinate information. The MBT (A) and MBH (B) may perform a beam alignment operation based on the obtained coordinate information. The MBT (A) and MBH (B) may use one or more sensors for the positioning operation and beam alignment operation. For example, the MBT (A) and/or MBH (B) may use the GPS, horizontal sensor, compass sensor (or a true north sensor), etc. for the positioning operation and beam alignment operation. The MBT (A) and MBH (B), which perform the positioning operation and beam alignment operation using the GPS, horizontal sensor, compass sensor, etc., may be configured with relatively low cost and low complexity. On the other hand, the MBT (A) and/or MBH (B) may further use an inertial sensor (e.g., gyroscope, accelerometer, etc.), barometric pressure sensor, magnetometer, etc. to improve the accuracy of the positioning operation and beam alignment operation. In order to improve the accuracy of beam alignment between the MBT (A) and MBH (B), the MBT (A) and MBH (B) may be configured to use the same type of sensors for the positioning operation and beam alignment operation.

Referring to FIGS. 5A and 5B, the GCS may be a coordinate system in which each position is indicated with the center of the earth as an origin. In an exemplary embodiment of the communication system, the GCS may be expressed based on three axes, such as X-axis, Y-axis, and Z-axis. In another exemplary embodiment of the communication system, the GCS may be expressed based on latitude, longitude, and altitude. The latitude and longitude may be defined as angular values. The latitude may have a unit of '°' (i.e., degree) and may be expressed as 'Lat (λ)'. The latitude may have values of 0°, 90° north latitude (90° N), and 90° south latitude (90° S) at the equator, north pole, and south pole, respectively. The longitude may have a unit of '°' and may be expressed as 'Lon (φ)' or 'Lon (ψ)'. The longitude may have a value of 0° at the Greenwich Meridian. The longitude may have a value up to 180° east longitude (180° E) east of the Greenwich meridian, and may have a value up to 180° west longitude (180° W) west of the Greenwich meridian. The altitude may be defined as a height value. The altitude may be a value indicating a distance between a certain position and the center of the earth. Alternatively, the altitude may be a value indicating how much the height of a certain position differs from the height of a predetermined reference plane. The predetermined reference plane as a reference for the altitude may be an earth ellipsoid (EE), a geoid that is an imaginary surface defined by gravity, or a sea level. FIG. 5A shows an exemplary embodiment in which an altitude is expressed based on the EE or sea level. When the sea level is the reference plane, the altitude may be referred to as an 'altitude above sea level'.

Referring to FIG. 5A, in an exemplary embodiment of the communication system, the positioning operation may be performed using the GCS and GPS. The GPS may express each position as latitude, longitude, and altitude values. The MBT (A) and MBH (B) may obtain information on their positions through the GPS. The information on the position obtained through the GPS may include information on an altitude value that is a height value calculated based on the predetermined reference plane.

In order to convert information on the position identified through the GPS into the GCS, a 'total height value', which is a distance from the center of the earth, rather than an altitude value, may be needed. The total height value of the position of the MBT (A) may be calculated as a sum of an MBT GPS altitude value corresponding to the altitude of the position of the MBT (A) and a distance (i.e., MBT reference height) between the center of the earth and the predetermined reference plane that is the basis of the altitude information at the position of the MBT. In other words, the 'MBT total height value=MBT GPS altitude+MBT reference height' may be established. The total height value of the position of the MBH (B) may be calculated as a sum of an MBH GPS altitude value corresponding to the altitude of the position of the MBH (B) and a distance (i.e., MBH reference height) between the center of the earth and the predetermined reference plane that is the basis of the altitude information at the position of the MBH. In other words, the 'MBH total height value=MBH GPS altitude+MBH reference height' may be established. The values of the MBT reference height and the MBH reference height may be the same or different. Based on the calculated total height values of the MBT (A) and MBH (B), coordinates of the MBT (A) and MBH (B) in the GCS may be calculated. The coordinate values of each of the MBT (A) and MBH (B) in the GCS may be calculated as a latitude Lat (λ), a longitude Lon (w), and an altitude Alt. Here, the latitude and longitude values in the GCS may be the same as or approximate to the latitude and longitude values in the GPS. The altitude values in the GCS may correspond to the above total height values of the MBT (A) and MBH (B). Alternatively, the coordinate values of the MBT (A) and MBH (B) in the GCS may be calculated based on three axes, such as X-axis, Y-axis, and Z-axis. The coordinate values of the MBT (A) in the GCS calculated based on X-axis, Y-axis, and Z-axis may be expressed as '(XA, YA, ZA)'. The coordinate values of the MBH (B) in the GCS calculated based on X-axis, Y-axis, and Z-axis may be expressed as '(XB, YB, ZB)'. Based on the coordinate values of the MBT (A) and MBH (B), information on a line A-B corresponding to a wireless communication path between the MBT (A) and the MBH (B) may be calculated.

Referring to FIG. 5B, in an exemplary embodiment of the communication system, the positioning operation may be performed using the topocentric coordinate system. The topocentric coordinate system may be referred to as an 'observation-centric coordinate system' or an 'observer-centric coordinate system'. The topocentric coordinate system may be a coordinate system defined based on a tangent plane and a real north (or, true north) direction when the tangent plane is configured based on coordinate information of a specific point in the GCS as a horizontal plane. In the topocentric coordinate system of the MBT (A), the position of the MBT (A) may become an origin. In the topocentric coordinate system of the MBH (B), the position of the MBH (B) may become an origin. In the topocentric coordinate system, coordinates or directions may be expressed based on three axes, such as V-axis, W-axis, and U-axis. The coordinate system expressing coordinates or directions based on three axes, such as V-axis, W-axis, and U-axis, may be referred to as a VWU coordinate system. The topocentric coordinate system configured based on the true north direction may be referred to as a 'real north head (RNH) VWU coordinate system (RNH VWU coordinate system, RVCS)'.

The RVCS may express direction information or angle information based on V-axis, W-axis, and U-axis. In an exemplary embodiment of the communication system, the RVCS may be configured so that the V-axis faces the true north direction. The RVCS may be configured so that a UW plane formed by the U and W axes coincides with a predetermined tangent plane configured based on coordinate information of the GCS. When the V-axis and the UW plane of the RVCS are configured to coincide with the true north direction identified through the compass sensor and the tangent plane identified through the horizontal sensor, respectively, the positioning operation based on the RVCS may be performed only through a 2-axis sensor instead of a 3-axis sensor. The RVCS may optionally further express size information or scalar information. A method of expressing direction information based on values such as roll, pitch, and yaw in the coordinate system such as the VWU coordinate system and the RVCS coordinate system will be described in more detail below with reference to FIGS. 6A and 6B.

Figure 6A:
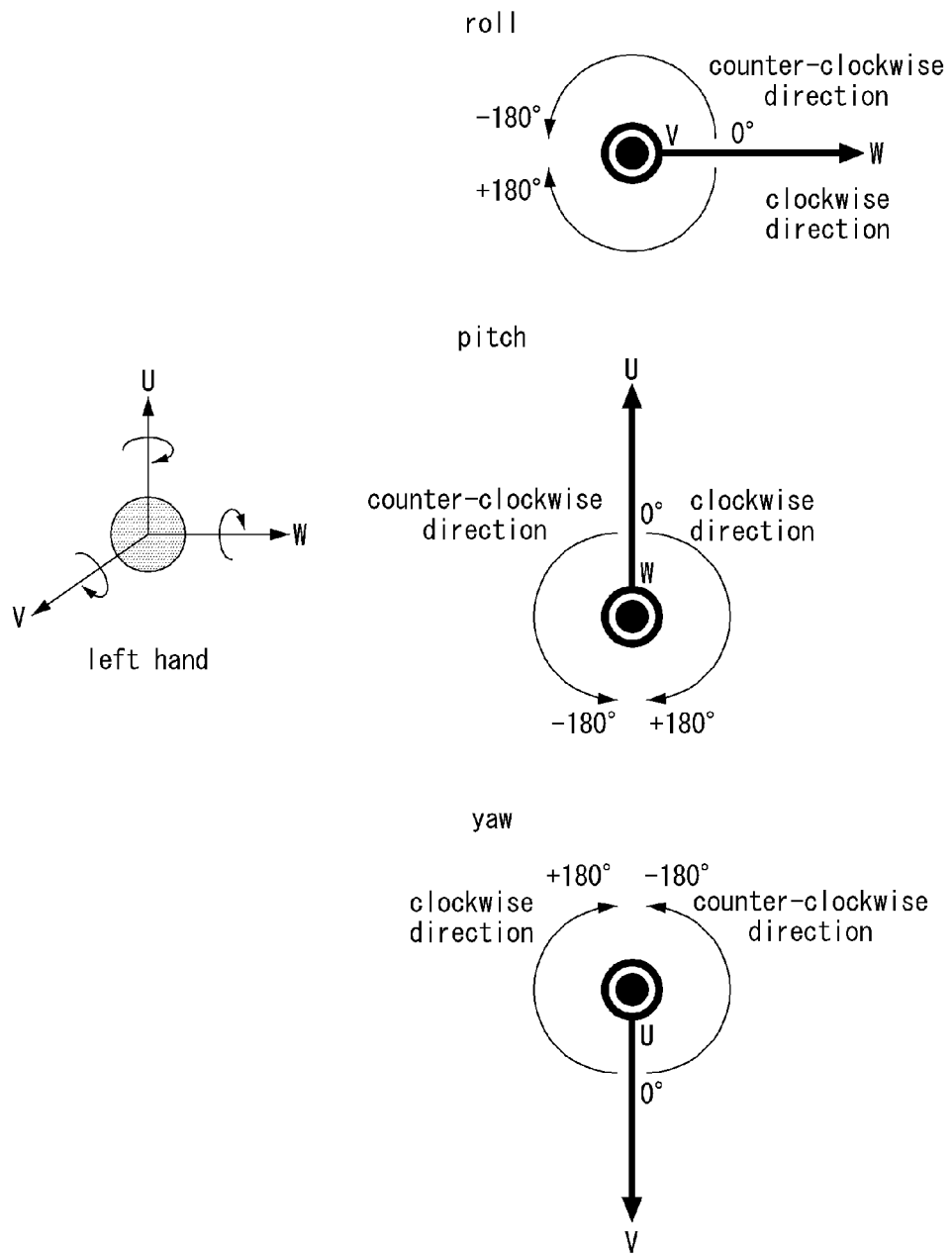
FIGS. 6A and 6B are conceptual diagrams for describing exemplary embodiments of a coordination information expression method in a communication system.
Figure 6B:
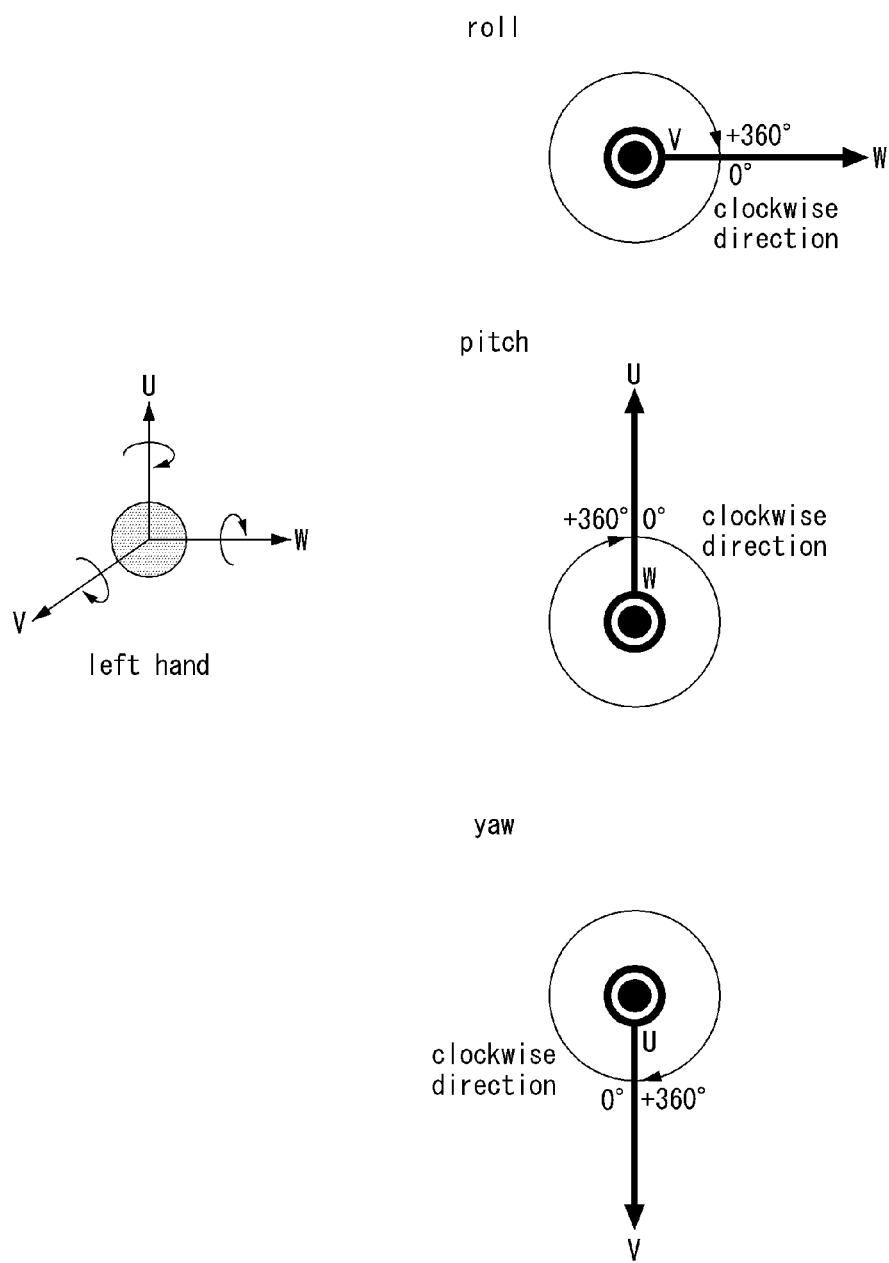

FIGS. 6A and 6B are conceptual diagrams for describing exemplary embodiments of a coordination information expression method in a communication system.

Referring to FIGS. 6A and 6B, in an exemplary embodiment of the communication system, direction information may be expressed around three axes, such as V-axis, W-axis, and U-axis. Here, the communication system may be the same as or similar to the communication system described with reference to FIGS. 5A and 5B. In the communication system, direction information may be expressed based on a coordinate system such as the VWU coordinate system described with reference to FIG. 5B or the RVCS defined based on the VWU coordinate system.

Specifically, in the VWU coordinate system, values such as roll, pitch, and yaw may be expressed based on V axis, W axis, and U axis. Here, each of roll, pitch, and yaw may mean an angle rotating around any one of V-axis, W-axis, and U-axis. For example, the roll may mean an angle value that rotates about the W axis. The pitch may mean an angle value rotated about the U-axis. The yaw may mean an angle value rotated about the V-axis. The roll, pitch, and yaw rotation values may refer to angle values rotated in a left hand direction or clockwise direction about the W axis, the U axis, and the V axis. Alternatively, the roll, pitch, and yaw may refer to an angle value rotated in a right-hand direction or a counter-clockwise (CCW) direction about the W-axis, the U-axis, and the V-axis. FIGS. 6A and 6B shown an exemplary embodiment in which the rotation values of roll, pitch, and yaw are calculated based on a left hand direction or a clockwise direction (CW). However, this is only an example for convenience of description, and exemplary embodiments of the present disclosure are not limited thereto. In another exemplary embodiment of the communication system, the rotation values of roll, pitch, and yaw may be calculated based on a right hand direction or a counterclockwise direction (CCW).

In exemplary embodiments of the direction information expression method shown in FIGS. 6A and 6B, when roll, pitch, and yaw information for a specific object is provided, it may be considered that direction information for the corresponding object is provided. In other words, in the exemplary embodiments of the direction information expression method shown in FIGS. 6A and 6B, the direction information for the specific object may be expressed through roll, pitch, and yaw information for the corresponding object. For example, information on a direction in which a first object is currently facing may be expressed through information on a roll, pitch, and yaw of the first object. Alternatively, information on a target direction in which the first object is to face may be expressed through roll, pitch, and yaw information in the target direction in which the first object intends to face.

Referring to FIG. 6A, in an exemplary embodiment of the direction information expression method based on the VWU coordinate system, rotation values of roll, pitch, and yaw may be calculated based on a left-handed direction or a clockwise direction. Here, the roll may have a value of up to +180° in a clockwise direction and up to −180° in a counterclockwise direction with respect to the W axis. The pitch may have a value of up to +180° in a clockwise direction and up to −180° in a counterclockwise direction with respect to the U-axis. The yaw may have a value of up to +180° in a clockwise direction and up to −180° in a counterclockwise direction with respect to the V axis.

Referring to FIG. 6B, in another exemplary embodiment of the direction information expression method based on the VWU coordinate system, rotation values of roll, pitch, and yaw may be calculated based on a left-handed direction or a clockwise direction. Here, the roll may have a value of up to +360° in a clockwise direction with respect to the W axis. The pitch may have a value up to +360° in a clockwise direction with respect to the U-axis. The yaw may have a value up to +360° in a clockwise direction with respect to the V-axis.

Figure 7:
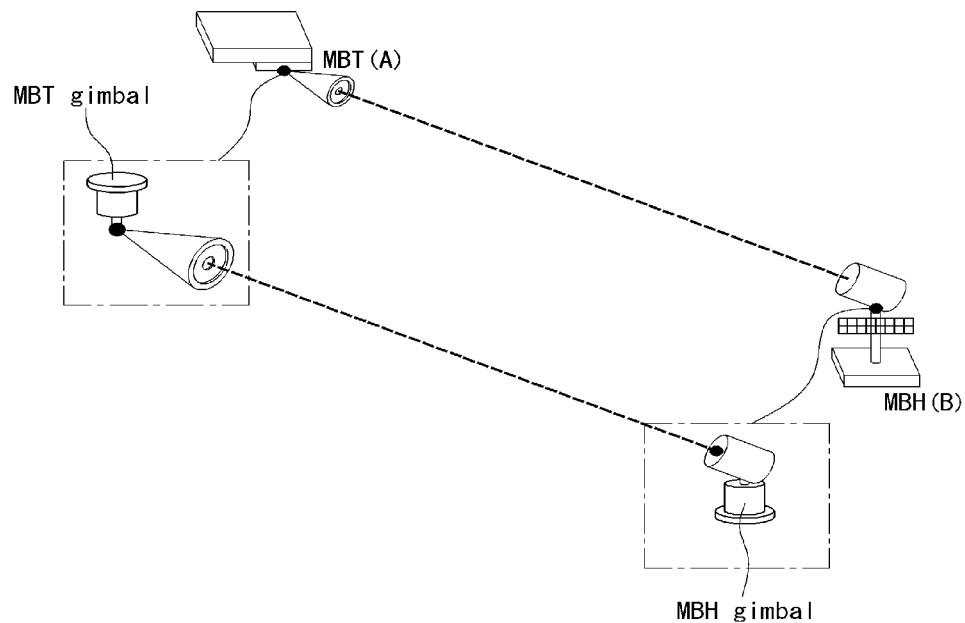
FIG. 7 is a conceptual diagram for describing a second exemplary embodiment of a beam control method in a communication system.

FIG. 7 is a conceptual diagram for describing a second exemplary embodiment of a beam control method in a communication system.

Referring to FIG. 7, a communication system may include a plurality of communication nodes that communicate with each other through beams. In FIG. 7, an exemplary embodiment in which the communication system includes one MBT (A) and one MBH (B) performing mutual communication through beams is shown. Here, the MBT (A) and MBT(B) may be the same as or similar to the MBT 410 and the MBH 420 described with reference to FIGS. 4A and 4B. The MBT (A) and MBH (B) may control antennas or antenna heads based on coordinate information and/or direction information expressed in the same or similar manner to the coordinate information expression method described with reference to FIGS. 5A and 5B and the direction information expression method described with reference to FIG. 6. Hereinafter, in describing the second exemplary embodiment of the beam control method in the communication system with reference to FIG. 7, content overlapping with those described with reference to FIGS. 1 to 6B may be omitted.

The MBT (A) and MBH (B) may communicate with each other through beams. For accurate control of beam directions of the MBT (A) and MBH (B), each of antennas for transmitting beams of the MBT (A) and MBH (B) may be installed in a predetermined direction control device. For example, each antenna for transmitting beams of the MBT (A) and MBH (B) may be installed on a gimbal. In an exemplary embodiment of the communication system, the MBT (A) and MBH (B) may control the directions of the antennas and the beams by controlling the gimbals on which the antennas are installed. Unless otherwise stated, the configurations described for the 'gimbal' in the present disclosure may be equally applied to other direction control devices other than the gimbal.

In an exemplary embodiment of the communication system, the MBT (A) and MBH (B) performing mutual communication through beams, to control the antennas to face in the direction of the counterpart, may perform an operation of identifying its own coordinate information and the counterpart's coordinate information. An operation of converting coordinate information expressed based on a specific coordinate system into coordinate information based on another coordinate system may be performed. For example, the MBT (A) and the MBH (B) may obtain their position information through the GPS. The position information obtained through the GPS may be expressed based on the GPS coordinate system. The coordinate information of the MBT (A) and MBH (B) based on the GPS coordinate system may be converted into coordinate information based on the GCS. The coordinate information based on the GPS coordinate system or GCS may be converted into coordinate information based on the RVCS. In Table 1, an exemplary embodiment in which coordinate information for each of the MBT (A) and MBH (B) is expressed as coordinate information based on each of the GPS coordinate system, GCS, and RVCS is shown.

TABLE 1

|  | MBT (A) coordination information | MBH (B) coordination information |
| --- | --- | --- |
| GPS coordinate system | GPS A(Lat A($\lambda$), Lon A($\psi$), Alt A) | GPS B(Lat B($\lambda$), Lon B($\psi$), Alt B) |
| GCS | GCS A(Lat A($\lambda$), Lon A($\psi$), Alt A) → GCS A(XA, YA, ZA) | GCS B(Lat B($\lambda$), Lon B($\psi$), Alt B) → GCS B(XB, YB, ZB) |
| RVCS | RVCS A(Roll A°, Pitch A°, Yaw A°, Scalar A (Optional)) | RVCS B(Roll B°, Pitch B°, Yaw B°, Scalar B (Optional)) |

Here, latitude (Lat A($\lambda$), Lat B($\lambda$)) information and longitude (Lon A($\psi$), Lon B($\psi$)) information included in the GCS A and GCS B may be determined to be the same as or approximate to latitude (Lat A($\lambda$), Lat B($\lambda$)) information and longitude (Lon A($\psi$), Lon B($\psi$)) information included in the GPS A and GPS B. On the other hand, altitude (Alt A, Alt B) information included in the GCS A and GCS B may be determined to be different from altitude (Alt A, Alt B) information included in the GPS A and GPS B. For example, as described with reference to FIG. 5A, the values of the altitudes (Alt A, Alt B) included in the GCS A and GCS B may be determined as the values obtained by adding a predetermined reference height to the altitudes (Alt A, Alt B) included in the GPS A and GPS B. The GCS A (Lat A($\lambda$),Lon A($\psi$),Alt A) and the GCS B(Lat B($\lambda$),Lon B($\psi$),Alt B) expressed based on the latitude, longitude and altitude information may be converted into coordinate information based on the axis, Y axis, and Z axis, and may be expressed as the GCS A(XA,YA,ZA) and the GCS B(XB,YB,ZB).

The coordinate information based on the RVCS may indicate information of a line A-B corresponding to a wireless communication path between the MBT (A) and the MBH (B). For example, the MBT (A) may provide, to the MBH (B), the coordinate information (i.e., GPS A) of the MBT (A) based on the GPS coordinate system or the coordinate information (i.e., GCS A) of the MBT (A) based on the GCS. The MBH (B) may provide, to the MBT(A), the coordinate information (i.e., GPS B) of the MBH (B) based on the GPS coordinate system or the coordinate information (i.e., GCS B) of the MBH (B) based on the GCS to the MBT. The MBT (A) and MBH (B) may calculate the coordinate information based on the RVCS based on the mutually transmitted and received coordinate information.

Specifically, the MBH (B) may identify the coordinate information of the MBT (A) provided from the MBT (A). The MBH (B) may calculate the direction information of the MBT (A) with respect to the position of MBH (B) based on the coordinate information of the MBH (B) and the coordinate information of the MBT (A) provided from the MBT (A). The calculated direction information may be the same as the RVCS A of Table 1. The MBH (B) may control its antenna to face the direction of the MBT (A) based on the calculated RVCS A. Alternatively, the MBT (A) may calculate the direction information of the MBT (A) with respect to the position of the MBH (B) based on the coordinate information of the MBT (A) and the coordinate information of the MBH (B) provided from the MBH (B), similarly to the calculation of the RVCS A. The MBT (A) may provide information of the calculated RVCS A to the MBH (B). The MBH (B) may control its antenna to face the direction of the MBT (A) based on the information of the RVCS A provided from the MBT (A).

On the other hand, the MBT (A) may identify the coordinate information of the MBH (B) provided from the MBH (B). The MBT (A) may calculate the direction information of the MBH (B) with respect to the position of MBT (A) based on the coordinate information of the MBT (A) and the coordinate information of the MBH (B) provided from the MBH (B). The calculated direction information may be the same as the RVCS B of Table 1. The MBT (A) may control its antenna to face the direction of the MBH (B) based on the calculated RVCS B. Alternatively, the MBH (B) may calculate the direction information of the MBH (B) with respect to the position of the MBT (A) based on the coordinate information of the MBH (B) and the coordinate information of the MBT (A) provided from the MBT (A), similarly to the calculation of the RVCS B. The MBH (B) may provide information of the calculated RVCS B to the MBT (A). The MBT (A) may control its antenna to face the direction of the MBH (B) based on the information of the RVCS B provided from the MBH (B).

The RVCS A and RVCS B may include direction information such as roll, pitch, and yaw. The RVCS A and RVCS B may optionally further include scalar value information (Scalar A, Scalar B). Specifically, in an exemplary embodiment of the communication system, the RVCS A and RVCS B may not include scalar value information. In this case, the RVCS A and RVCS B may indicate only direction information and may not indicate accurate position information. In another exemplary embodiment of the communication system, the RVCS A and RVCS B may include scalar value information. Here, the scalar values (Scalar A, Scalar B) included in the RVCS A and RVCS B may correspond to a distance between the MBT (A) and the MBH (B). In this case, the RVCS A and RVCS B may indicate accurate position information by including both direction information and distance information.

On the other hand, the scalar value information (Scalar A, Scalar B) included in the RVCS A and RVCS B may indicate transmission powers of the antennas. For example, the MBH (B) may calculate the direction information of the MBT (A) with respect to the position of the MBH (B) as Roll A°, Pitch A°, and Yaw A°. The MBH (B) may determine the transmission power of the antenna for the MBT (A), and express the transmission power of the antenna for the MBT (A) as Scalar A. The MBH (B) may control the direction and transmission power of the antenna based on the RVCS A including information of Roll A°, Pitch A°, Yaw A°, and Scalar A. Conversely, the MBT (A) may calculate the direction information of the MBH (B) with respect to the position of the MBT (A) as Roll B°, Pitch B°, and Yaw B. The MBT (A) may determine the transmission power of the antenna for the MBH (B), and express the transmission power of the antenna for the MBH (B) as Scalar B. The MBT (A) may control the direction and transmission power of the antenna based on the RVCS B including information of Roll B°, Pitch B°, Yaw B°, and Scalar B.

In an exemplary embodiment of the communication system, the MBT (A) and MBH (B) may express information on the current directions of the antennas in the same or similar form as the RVCS A and RVCS B. Alternatively, the MBT (A) and MBH (B) may express information on the directions that the antennas intend to face in the future in the same or similar form as the RVCS A and RVCS B. The MBT (A) and MBH (B) may control the directions of the antennas by controlling the corresponding gimbals based on the direction information expressed in the same or similar form as the RVCS A and RVCS B.

As described with reference to FIGS. 6A and 6B, in an exemplary embodiment of the direction information expression method based on roll, pitch, and yaw, each of the roll, pitch, and yaw may have a total rotation value of 360°. In an exemplary embodiment of the communication system, communication nodes such as the MBT (A), MBH (B), etc. may control the directions of the antennas based on the direction information based on the roll, pitch, and yaw each having a total rotation value of 360°.

Meanwhile, in another exemplary embodiment of the communication system, the gimbal on which the antenna of the communication node such as the MBT (A), MBH (B), or the like is installed may not have a rotation value of 360° in all directions due to a limitation on a hardware structure. For example, the gimbal on which the antenna is installed may have a rotatable angle of up to 120° with respect to any one or more axes of roll, pitch, and yaw. If a target direction of the antenna is out of the range of the rotatable angle of the gimbal on which the antenna is installed, it may not be easy to control the direction of the antenna by controlling only the gimbal. In this case, a method of adjusting the direction of the antenna through additional physical control on a body of the communication node itself may be used.

Figure 8:
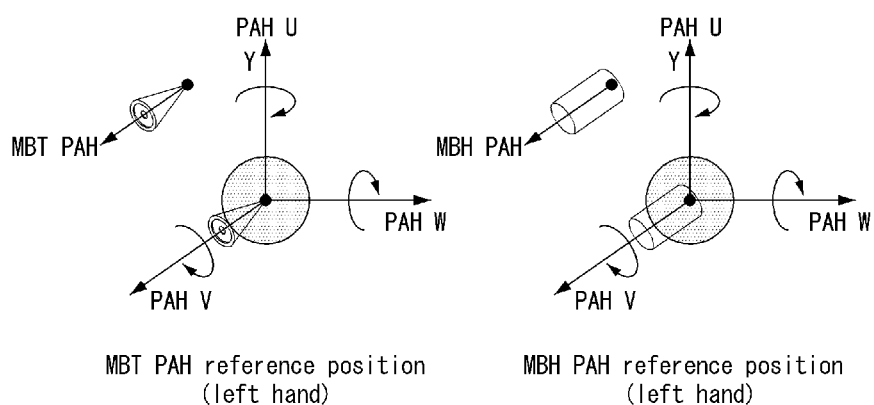
FIG. 8 is a conceptual diagram for describing a second exemplary embodiment of a coordinate information expression method in a communication system.

FIG. 8 is a conceptual diagram for describing a second exemplary embodiment of a coordinate information expression method in a communication system.

Referring to FIG. 8, a communication system may include a plurality of communication nodes that communicate with each other through beams. For example, the communication system includes one MBT and one MBH performing mutual communication through beams. However, this is only an example for convenience of description, and exemplary embodiments of the present disclosure are not limited thereto. The MBT included in the communication system may be the same as or similar to the MBT (A) described with reference to FIG. 7. The MBH included in the communication system may be the same as or similar to the MBH (B) described with reference to FIG. 7. Hereinafter, in describing the second exemplary embodiment of the coordinate information expression method in the communication system with reference to FIG. 8, content overlapping with those described with reference to FIGS. 1 to 7 may be omitted.

The MBT and MBH may express coordinate information based on a coordinate system such as the GPS coordinate system, GCS, and RVCS described with reference to FIG. 7. The MBT and MBH may perform beam control operations based on the coordinate information expressed based on a coordinate system such as the GPS coordinate system, GCS, and RVCS described with reference to FIG. 7.

Meanwhile, the MBT and MBH may configure a coordinate system based on a position and direction of a 'physical antenna head (PAH)' corresponding to a physical head of each antenna, respectively. Here, the position and direction of the PAH of the antenna may refer to a position and direction of a radiator emitting a beam in the antenna. Alternatively, the position and direction of the PAH of the antenna may refer to a position of an axis or origin of a gimbal controlling the direction of the antenna, and a direction to which the antenna whose direction is determined by the gimbal is directed.

Each of the MBT and MBH may configure a coordinate system expressing the direction with three axes, V-axis, W-axis, and U-axis, by setting the position of the PAH as a reference position or origin and setting the direction of the PAH as the V-axis. In this manner, the VWU coordinate system configured based on the position and direction of the PAH may be referred to as a 'PAH VWU coordinate system'. The VWU coordinate system configured based on the position and direction of the PAH of the MBT may be referred to as an 'MBT PAH VWU coordinate system'. The VWU coordinate system configured based on the position and direction of the PAH of the MBH may be referred to as an 'MBH PAH VWU coordinate system'.

Figure 9:
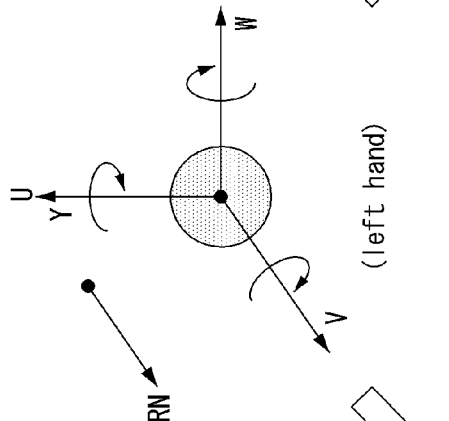
FIG. 9 is a conceptual diagram for describing a third exemplary embodiment of a coordinate information expression method in a communication system.
Figure 9:
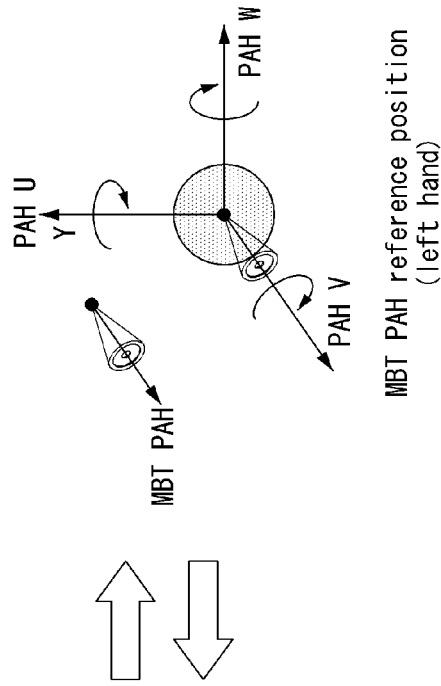
Figure 9:
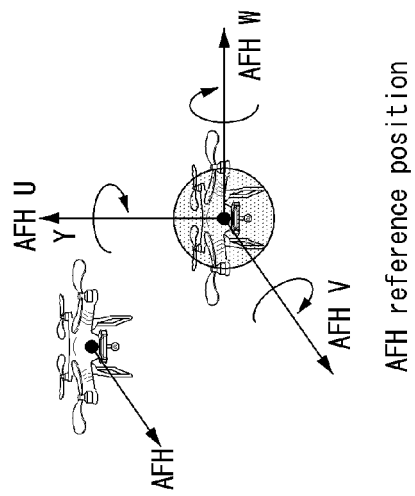

FIG. 9 is a conceptual diagram for describing a third exemplary embodiment of a coordinate information expression method in a communication system.

Referring to FIG. 9, a communication system may include a plurality of communication nodes that communicate with each other through beams. For example, the communication system includes one MBT performing communication through beams. However, this is only an example for convenience of description, and exemplary embodiments of the present disclosure are not limited thereto. The MBT included in the communication system may be the same as or similar to the MBT (A) described with reference to FIG. 7. The MBT included in the communication system may be mounted on a type of aerial flight. The aerial flight on which the MBT is mounted may be the same as or similar to the first and second aerial vehicles 112 and 122 described with reference to FIG. 1. In describing the third exemplary embodiment of the coordinate information expression method in the communication system with reference to FIG. 9, the content overlapping with those described with reference to FIGS. 1 to 8 may be omitted.

The coordinate information such as the position and direction of the MBT may be expressed based on the coordinate system such as the GPS coordinate system, GCS, and RVCS described with reference to FIG. 7, or the PAH VWU coordinate system described with reference to FIG. 8. The coordinate information such as the position and direction of the aerial flight may be expressed based on the coordinate system such as the GPS coordinate system, GCS, and RVCS described with reference to FIG. 7.

Meanwhile, as described with reference to FIG. 7, in an exemplary embodiment of the communication system, a gimbal on which an antenna of a communication node such as the MBT is installed may not have a rotation value of 360° in all directions due to a limitation on a hardware structure. If a target direction of the antenna is out of a rotatable angle range of the gimbal on which the antenna is installed, it may not be easy to control the direction of the antenna by controlling only the gimbal. In this case, a method of adjusting the direction of the antenna through additional physical control on a body of the communication node itself may be used.

For example, when it is not easy to control the direction of the antenna of the MBT by controlling only the gimbal on which the antenna of the MBT is installed, an operation of adjusting the direction of the antenna by controlling the direction of the aerial flight equipped with the MBT may be performed. To this end, a coordinate system based on the position and direction of an 'aerial flight head (AFH)' corresponding to a head of the aerial flight may be configured. Here, the position and direction of the AFH may be configured based on a reference position and a reference direction of the aerial flight, which are configured in an attitude control program of the aerial flight.

The aerial flight may configure a coordinate system expressing a direction with three axes, V-axis, W-axis, and U-axis, by setting the position of the AFH as a reference position or origin and setting the direction of the AFH as the V-axis. In this manner, the VWU coordinate system configured based on the position and direction of the AFH may be referred to as an 'AFH VWU coordinate system'.

The coordinate information expressed based on a coordinate system such as the RVCS may be converted into coordinate information based on the PAH VWU coordinate system based on the PAH of the MBT, or the AFH VWU coordinate system based on the AFH. The coordinate information based on the PAH VWU coordinate system may be converted into coordinate information based on the AFH VWU coordinate system. Conversely, coordinate information based on the AFH VWU coordinate system may be converted into coordinate information based on the PAH VWU coordinate system. The coordinate information conversion operation between the PAH VWU coordinate system and the AFH VWU coordinate system may be performed based on relative position information between the MBT, the antenna of the MBT, and the aerial flight.

Figure 10:
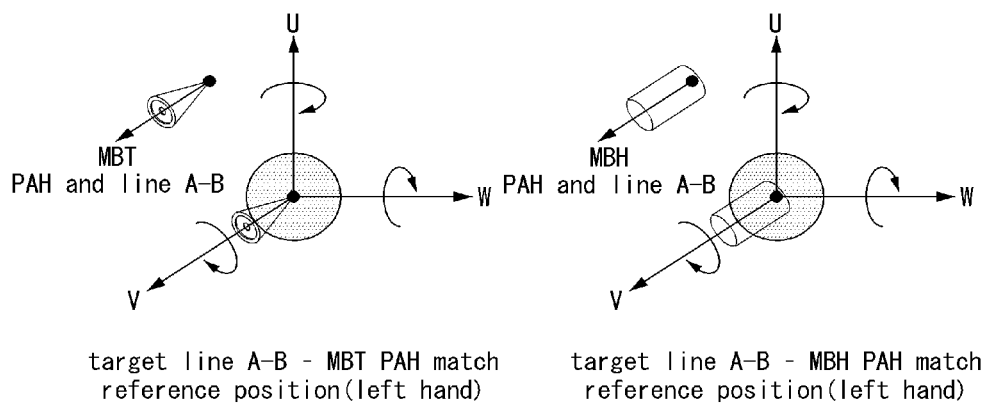
FIG. 10 is a conceptual diagram for describing a fourth exemplary embodiment of a coordinate information expression method in a communication system.

FIG. 10 is a conceptual diagram for describing a fourth exemplary embodiment of a coordinate information expression method in a communication system.

Referring to FIG. 10, a communication system may include a plurality of communication nodes that communicate with each other through beams. For example, the communication system includes one MBT and one MBH performing mutual communication through beams. However, this is only an example for convenience of description, and exemplary embodiments of the present disclosure are not limited thereto. The MBT included in the communication system may be the same as or similar to the MBT described with reference to FIG. 8. The MBH included in the communication system may be the same as or similar to the MBH described with reference to FIG. 8. Hereinafter, in describing the fourth exemplary embodiment of the coordinate information expression method in the communication system with reference to FIG. 10, content overlapping with those described with reference to FIGS. 1 to 9 may be omitted.

The coordinate information such as the positions and directions of the MBT and MBH may be expressed based on the coordinate system such as the GPS coordinate system, GCS, and RVCS described with reference to FIG. 7, or the PAH VWU coordinate system described with reference to FIG. 8. In the PAH VWU coordinate system, current reference position information of the PAH of the MBT and current reference position information of the PAH of the MBH may be expressed based on the current positions and current directions of the MBT and MBH.

Meanwhile, for smooth wireless communications between the MBT and the MBH, the PAH of the MBT may have to be aligned in the direction of the MBH or in the direction of the PAH of the MBH. To this end, the MBT may receive, from the MBH, the coordinate information of the MBH or the PAH of the MBH. The MBT may convert the coordinate information received from the MBH into coordinate information based on the MBT PAH VWU coordinate system. The converted coordinate information may correspond to information on the direction of the MBH or the direction of the PAH of the MBH viewed from the MBT. The converted coordinate information may be used so that a wireless communication path (i.e., line A-B) between the MBT and the MBH and the direction of the PAH of the MBT match normally. The converted coordinate information may be referred to as a 'target line A-B_MBT PAH match reference position'.

Conversely, for smooth wireless communications between the MBT and the MBH, the PAH of the MBH may have to be aligned in the direction of the MBT or in the direction of the PAH of the MBT. To this end, the MBH may receive, from the MBT, the coordinate information of the MBT or the PAH of the MBT. The MBH may convert the coordinate information received from the MBT into coordinate information based on the MBH PAH VWU coordinate system. The converted coordinate information may correspond to information on the direction of the MBT or the direction of the PAH of the MBT viewed from the MBH. The converted coordinate information may be used so that the wireless communication path (i.e., line A-B) between the MBT and the MBH matches to the direction of the PAH of the MBH normally. The converted coordinate information may be referred to as a 'target Line A-B_MBH PAH match reference position'.

[Initial Beam Alignment Procedure]

Figure 11:
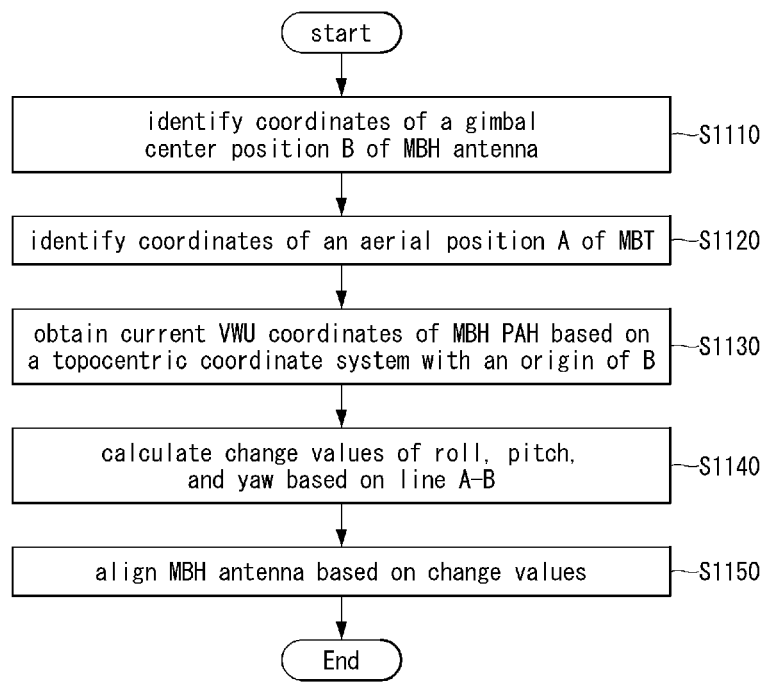
FIG. 11 is a flowchart for describing a third exemplary embodiment of a beam control method in a communication system.

FIG. 11 is a flowchart for describing a third exemplary embodiment of a beam control method in a communication system.

Referring to FIG. 11, a communication system may include a plurality of communication nodes that communicate with each other through beams. For example, the communication system includes one MBT and one MBH performing mutual communication through beams. However, this is only an example for convenience of description, and exemplary embodiments of the present disclosure are not limited thereto. The MBT included in the communication system may be the same as or similar to the MBT described with reference to FIG. 8. The MBH included in the communication system may be the same as or similar to the MBH described with reference to FIG. 8. The MBT and the MBH may perform an initial beam alignment procedure for mutual communications through operations according to the third exemplary embodiment of the beam control method in the communication system shown in FIG. 11. Hereinafter, in describing the third exemplary embodiment of the beam control method in the communication system with reference to FIG. 11, content overlapping with those described with reference to FIGS. 1 to 10 may be omitted.

In order to perform initial beam alignment in the direction of the MBT, the MBH may first identify coordinate information such as a position and direction of the PAH of the MBH (hereinafter, 'MBH PAH'). For example, the MBH may identify coordinates of a center position B of a gimbal that controls a direction of an antenna of the MBH (S1110). The MBH may determine the coordinates of the position B based on the GPS or the like. The MBH may determine the identified position B as the position of the MBH PAH. The MBH may transmit coordinate information of the position B. Here, the coordinate information of the position B may be transmitted in a broadcast scheme, a multicast scheme, a unicast scheme, and/or the like.

The MBH may identify coordinates of an aerial position A of the MBT or the aerial vehicle on which the MBT is mounted (S1120). For example, the MBT may transmit a signal including the coordinate information of the position A corresponding to the aerial position of the MBT. Here, the coordinate information of the position A may be transmitted in a broadcast scheme or may be transmitted to the MBH in a unicast scheme. Here, the aerial position of the MBT may refer to the aerial position of the MBT PAH. The position A may be the current aerial position of the MBT. Alternatively, the position A may correspond to a position where the MBT is to move and perform wireless communication with the MBH. In this case, the MBT may transmit a signal including information on the coordinates of the position A corresponding to the position where the MBT is to move and perform wireless communication with the MBH, and then move to the position A. The MBH may receive the signal transmitted from the MBT, and identify information on the coordinates of the position A.

The MBH may configure an MBH PAH VWU coordinate system based on the coordinate information of the position B (S1130). The MBH may convert the coordinate information of the position B into coordinate information based on the coordinate system such as the topocentric coordinate system, RVCS, or the like. The MBH may configure the MBH PAH VWU coordinate system based on the converted coordinate information. Such the process may be the same as or similar to the operations in the second exemplary embodiment of the coordinate information expression method in the communication system described with reference to FIG. 8. The MBH may convert the current coordinate information of the position B and the coordinate information of the position A into coordinate information based on the MBH PAH VWU coordinate system (S1130). That is, the MBH may obtain information on a line A-B expressed based on the MBH PAH VWU coordinate system. The MBH may obtain information on the 'target line A-B_MBH PAH match reference position' described with reference to FIG. 10.

The MBH may calculate direction change values of the MBH PAH for making the direction of the MBT PAH coincide with the line A-B based on the obtained information on the line A-B (S1140). For example, the MBH may compare the current direction information of the MBH PAH based on the MBH PAH VWU coordinate system with the direction information of the line A-B. The MBH may calculate direction change values of the MBH PAH, such as roll, pitch, yaw, etc., based on a result of comparing the current direction information of the MBH PAH with the direction information of the line A-B. In an exemplary embodiment of the communication system, the MBH may additionally calculate a scalar value in addition to the direction change values of the MBH PAH based on the coordinate information of the position A. For example, the MBH may calculate a scalar value corresponding to a distance between the MBT at the position A and the MBH at the position B. Alternatively, the MBH may calculate the distance between the MBT at the position A and the MBH at the position B, and calculate a scalar value corresponding to a strength of a beam to be transmitted to the MBT based on the distance between the MBT and the MBH.

The MBH may control the direction of the MBH PAH based on the direction change values calculated in the step S1140 (S1150). In other words, the MBH may align the antenna of the MBH based on the direction change values obtained in the step S1140. If a scalar value such as the beam strength is additionally calculated in the step S1140, the MBH may additionally perform an operation based on information on the additionally calculated scalar value.

FIG. 11 shows exemplary embodiments of an operation for performing an initial beam alignment procedure from the view point of the MBH. The MBT may also perform an initial beam alignment procedure through the same or similar operations as the MBH. For example, the MBT may identify and transmit coordinate information of the aerial position A of the MBT. The aerial position of the MBT may refer to the aerial position of the MBT PAH. The position A may mean the current aerial position of the MBT. Alternatively, the position A may correspond to a position where the MBT is to move and perform wireless communication with the MBH. In this case, the MBT may transmit the coordinate information of the position A, and then move to the position A.

The MBT may receive the coordinate information of the position B of the MBH transmitted from the MBH. The MBT may convert the coordinate information of the position A and the position B into coordinate information based on the MBT PAH VWU coordinate system. The MBT may obtain information on the 'target line A-B_MBT PAH match reference position' described with reference to FIG. 10. The MBT may calculate direction change values of roll, pitch, yaw, etc. to control the direction of the MBT PAH. In an exemplary embodiment of the communication system, the MBT may additionally calculate a scalar value corresponding to the distance between the MBT and the MBH, or a strength of a beam to be transmitted to the MBH. The MBT may perform a beam alignment operation such as controlling the direction of the MBH PAH based on information such as the calculated direction change values.

[Adaptive Beam Alignment Procedure]

Figure 12:
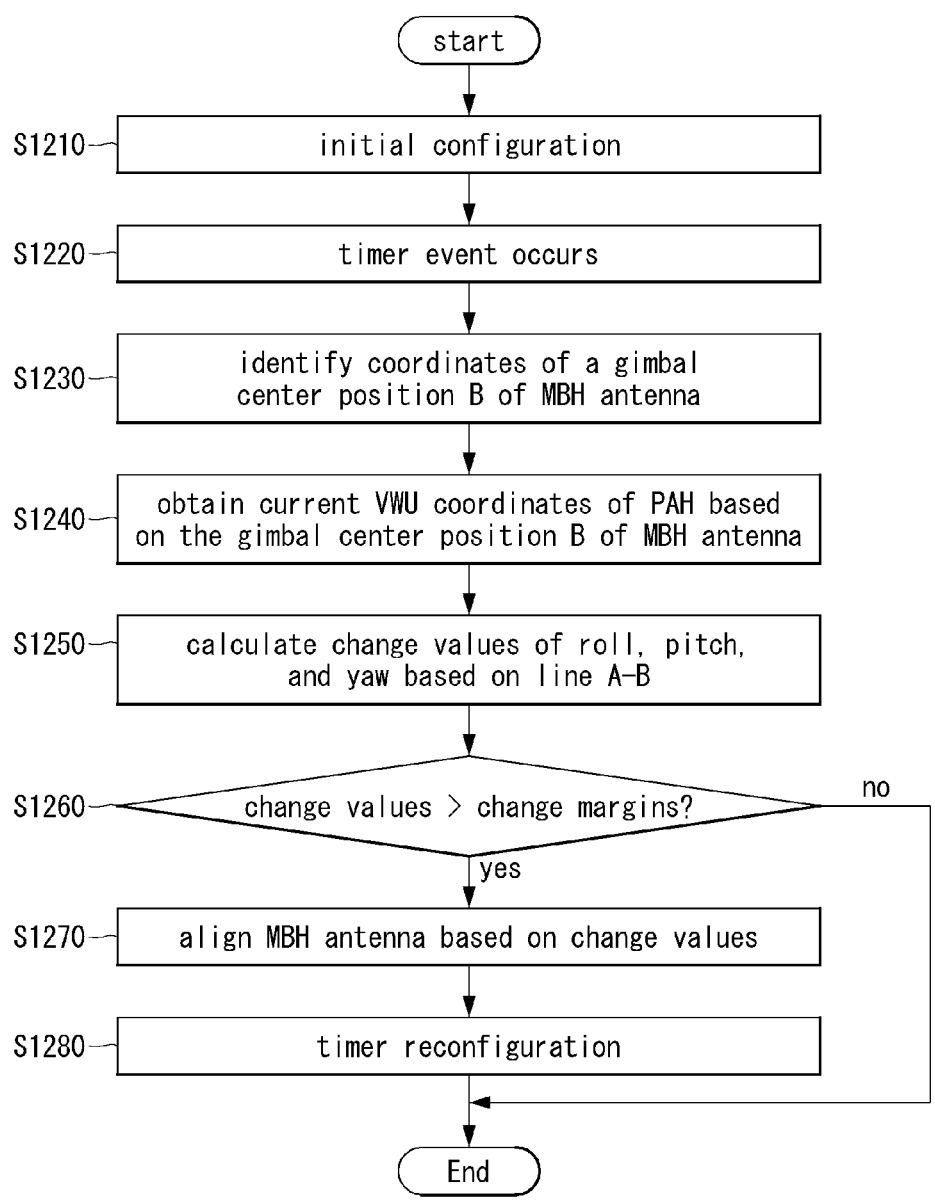
FIG. 12 is a flowchart for describing a fourth exemplary embodiment of a beam control method in a communication system.

FIG. 12 is a flowchart for describing a fourth exemplary embodiment of a beam control method in a communication system.

Referring to FIG. 12, a communication system may include a plurality of communication nodes that communicate with each other through beams. For example, the communication system includes one MBT and one MBH performing mutual communication through beams. However, this is only an example for convenience of description, and exemplary embodiments of the present disclosure are not limited thereto. The MBT included in the communication system may be the same as or similar to the MBT described with reference to FIG. 11. The MBH included in the communication system may be the same as or similar to the MBH described with reference to FIG. 11. The MBT and the MBH may perform an initial beam alignment procedure for mutual communications through the operations according to the third exemplary embodiment of the beam control method in the communication system shown in FIG. 11. When the MBH misalignment and/or the MBT misalignment described with reference to FIGS. 4B and 4C occurs after the MBT and the MBH perform the initial beam alignment, an adaptive beam alignment procedure may be required for smooth communication. For example, if the beams are misaligned over time after the MBT and MBH perform the initial beam alignment, it may be required to adjust the beam alignment. Alternatively, when the initial beam alignment procedure is not accurately performed due to a positioning error or the like, additional adjustment of the beam alignment may be required. In this case, the MBT and the MBH may perform an adaptive beam alignment procedure for beam alignment adjustment through operations according to the fourth exemplary embodiment of the beam control method in the communication system shown in FIG. 12. Hereinafter, in describing the fourth exemplary embodiment of the beam control method in the communication system with reference to FIG. 12, content overlapping with those described with reference to FIGS. 1 to 11 may be omitted.

After performing the initial beam alignment in the direction of the MBH, the MBT may configure initial configuration values for the adaptive beam alignment procedure. For example, the MBT may initially configure parameters such as a unit time interval, periodic event timer time, number of observations, observation time margin, observation time parameter, gimbal change count parameter, gimbal change count margin, direction change margins (i.e., offset margins (OMs)), and/or the like. An initial value of the unit time interval may be set to 1 second (i.e., unitTimeInterval=1 sec). An initial value of the periodic timer time may be set equal to the initial value of the unit time interval (i.e., Timer T=unitTimeInterval). An initial value of the number of observations may be set to 100 (i.e., Mon N=100).

An initial value of the observation time margin may be set as a product of the periodic timer time and the initial value of the number of observations (i.e., MonTMargin=Timer T×Mon N=100 sec). The observation time parameter may be set to zero (i.e., MonTVar=0). An initial value of the gimbal change count parameter may be set to 0 (i.e., countVar=0). An initial value of the gimbal change count margin may be set to 10 times (i.e., countMargin=10). Among the direction change margins, change margins for roll, pitch, and yaw may be set to 5°, 2°, and 2°, respectively (i.e., rollOM=5, pitchOM=2, yawOM=2). However, this is only an example for convenience of description, and exemplary embodiments of the present disclosure are not limited thereto.

Whenever the periodic timer time set in the step S1210 elapses, a timer event may occur periodically (S1220). When a timer event occurs, the MBT may update the value of the observation time parameter to a value obtained by adding the value of the periodic timer time to the value of the existing observation time parameter (i.e., MonTVar=MonTVar+Timer T).

The MBT may identify coordinate information of a position A' of the MBT PAH. For example, the MBT may identify coordinates of a center position of a gimbal that controls the direction of the MBT antenna (S1230). The MBT may determine the identified position A' as the position of the MBT PAH. Here, the position A' may be the same as or different from the position A described with reference to FIG. 11. For example, when the MBT-mounted aerial vehicle is hovering at the existing position after the initial beam alignment procedure, the position A' may be the same as the position A. On the other hand, when the MBT-mounted aerial vehicle moves from the existing position after the initial beam alignment procedure or an aerial hovering error occurs, the position A' may be different from the position A. Since the MBH is not a mobile communication node, the position B may remain the same even after the initial beam alignment. Alternatively, if a measurement error occurs during the initial measurement of the position B, the position B at the corresponding time may not be the same as the position B initially identified. The MBT may identify the coordinate information of the position of the MBH based on a signal transmitted from the MBH.

The MBT may convert the coordinate information of the current position B and the coordinate information of the current position A' into coordinate information based on the MBT PAH VWU coordinate system (S1240). That is, the MBT may obtain information of a line A-B expressed based on the MBT PAH VWU coordinate system. The MBT may calculate direction change values of roll, pitch, yaw, etc. for controlling the direction of the MBT PAH in the direction of the line A-B (S1250). In an exemplary embodiment of the communication system, the MBT may additionally calculate a scalar value corresponding to the distance between the MBT and the MBH, or a strength of a beam to be transmitted to the MBH.

The MBT may compare the direction change values calculated in the step S1250 with the direction change margins set in the step S1210 (S1260). Even when the beams between the MBT and the MBH are misaligned, if the misalignment is within a level that does not impair communication quality, it may not be necessary to actually perform direction change control. The direction change margins set in the step S1210 may be considered to be set to prevent wastage of resources such as time or power required for beam alignment control by not performing unnecessary direction change control. For example, when one or more of the change values of roll, pitch, and yaw exceeds the direction change margin(s) set in the step S1210, the MBT may determine that direction change control is required. The MBT may perform a beam alignment operation such as controlling the direction of the antenna (i.e., the direction of the MBT PAH) by controlling the gimbal on which the antenna of the MBT is installed based on the calculated direction change values (S1270). After performing the beam alignment operation in the step S1270, the MBT may perform a reconfiguration operation for the periodic timer (S1280). On the other hand, when the calculated roll, pitch, and yaw change values are all below the roll, pitch, and yaw change margins set in the step S1210, the MBT may determine that additional direction change control is not required and may terminate the beam alignment operation. Then, whenever a timer event occurs periodically (S1220), the MBT may perform operations according to the steps S1230 to S1280.

In the periodic timer reconfiguration operation in the step S1280, first, the MBT may increase the value of the gimbal change count parameter by 1 (i.e., countVar=countVar+1). If the observation time parameter exceeds the observation time margin (i.e., MonTVar>MonTMargin) and the gimbal change count parameter is less than or equal to the gimbal change count margin (i.e., countVar≤countMargin), the MBT may update the periodic timer time value to a value obtained by adding the unit time interval to the existing periodic timer time value (i.e., Timer T=Timer T+unitTimerinterval). The MBT may set the change count parameter and observation time parameter to zero. Then, whenever a timer event occurs periodically (S1220), the MBT may perform the operations according to the steps S1230 to S1280.

If the observation time parameter exceeds the observation time margin (i.e., MonTVar>MonTMargin) and the gimbal change count parameter exceeds the gimbal change count margin (i.e., countVar>countMargin), the MBT may update the value of the periodic timer to a value obtained by subtracting the unit time interval from the existing periodic timer time value (i.e., Timer T=Timer T-unitTimerinterval). The MBT may set the change count parameter and observation time parameter to zero. Then, whenever a timer event occurs periodically (S1220), the MBT may perform the operations according to the steps S1230 to S1280.

If the observation time parameter is less than or equal to the observation time margin (i.e., MonTVar≤MonTMargin) and the gimbal change count parameter is less than or equal to the gimbal change count margin (i.e., countVar≤countMargin), the MBT may update the value of the periodic timer to a value obtained by subtracting the unit time interval from the existing value of the periodic timer (i.e., Timer T=Timer T−unitTimerinterval). The MBT may set the change count parameter and observation time parameter to zero. Then, whenever a timer event occurs periodically (S1220), the MBT may perform the operations according to the steps S1230 to S1280.

If the observation time parameter is less than the observation time margin (i.e., MonTVar≤MonTMargin) and the gimbal change count parameter exceeds the gimbal change count margin (i.e., countVar>countMargin), the MBT may not perform a separate operation for reconfiguring the timer and may terminate the beam alignment operation. Then, whenever a timer event occurs periodically (S1220), the MBT may perform the operations according to the steps S1230 to S1280.

FIG. 12 shows exemplary embodiments of the operation for performing the adaptive beam alignment procedure from the view point of the MBT. The MBH may also perform an adaptive beam alignment procedure through the same or similar operations as the MBT. For example, the MBH may configure an initial configuration value for a periodic timer and the like, and may adaptively perform the beam alignment operations whenever a periodic timer event occurs. Based on signals transmitted from the MBT, the MBH may identify coordinate information for the current aerial position A' of the MBT. The aerial position of the MBT may refer to the aerial position of the MBT PAH. The position A' may mean the current aerial position of the MBT. Meanwhile, the MBH may re-identify coordinate information of the current position of the MBH or the position of the MBH PAH by performing a positioning operation.

The MBH may calculate direction change values such as roll, pitch, and yaw for controlling the direction of the MBH PAH. When the calculated direction change values exceed the direction change margins set by the initial configuration, the MBH may perform a direction adjustment operation for the MBH PAH and a timer reconfiguration operation. On the other hand, when the calculated direction change values are equal to or less than the direction change margins set by the initial configuration, the MBH may determine that a separate direction change control is not required and terminate the beam alignment operation.

[Open-Loop Beam Alignment Procedure]

Figure 13A:
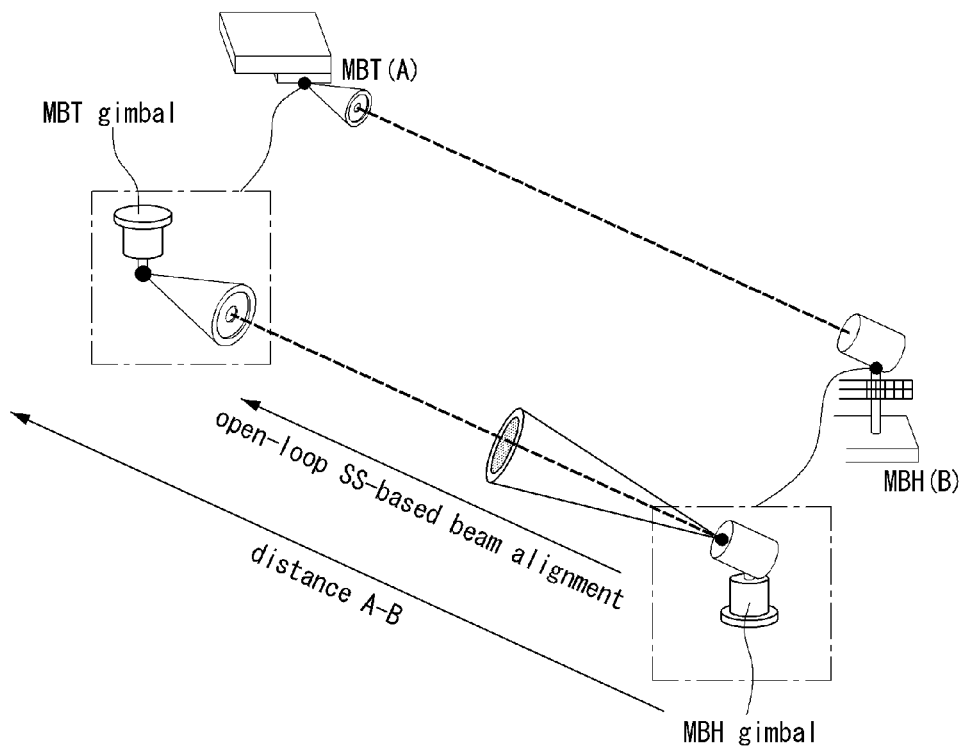
Figure 13A:
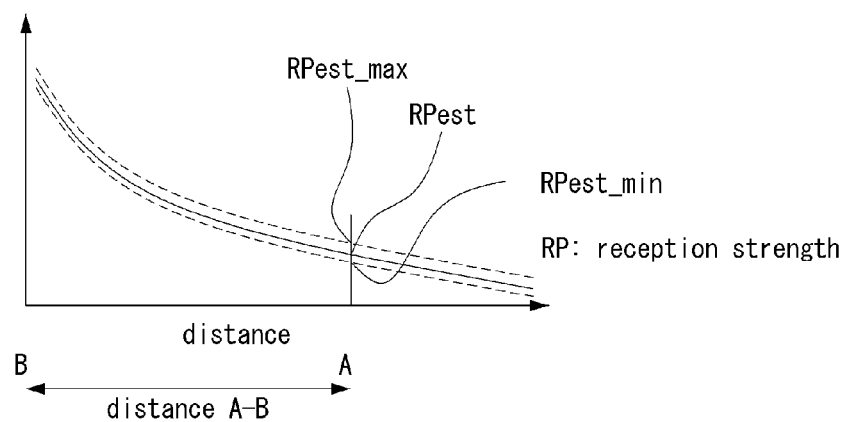

FIGS. 13A and 13B are exemplary diagrams for describing a fifth exemplary embodiment of a beam control method in a communication system.

Referring to FIGS. 13A and 13B, a communication system may include a plurality of communication nodes that communicate with each other through beams. For example, the communication system includes one MBT (A) and one MBH (B) performing mutual communication through beams. However, this is only an example for convenience of description, and exemplary embodiments of the present disclosure are not limited thereto. The MBT (A) included in the communication system may be the same as or similar to the MBT (A) described with reference to FIG. 7. The MBH (B) included in the communication system may be the same as or similar to the MBH (B) described with reference to FIG. 7. The MBT (A) and MBH (B) may perform an open-loop beam alignment procedure through operations according to the fifth exemplary embodiment of the beam control method in the communication system shown in FIGS. 13A and 13B. Here, the open-loop beam alignment procedure may be performed together with the initial beam alignment procedure and the adaptive beam alignment procedure described with reference to FIGS. 11 and 12, or may be performed independently of the initial beam alignment procedure and the adaptive beam alignment procedure.

Hereinafter, in describing the fifth exemplary embodiment of the beam control method in the communication system with reference to FIGS. 13A and 13B, the content overlapping with those described with reference to FIGS. 1 to 12 may be omitted.

Even when a beam alignment operation between transmission/reception antennas of communication nodes performing mutual communications through beams in a communication environment is normally performed, the best communication quality may not be guaranteed. Accordingly, a procedure for achieving an optimal beam alignment state may be performed based on a value of a signal strength (SS) of a beam transmitted from the MBH (B) to the MBT (A). Such the procedure may be referred to as an 'open loop SS-based beam alignment' procedure.

Referring to FIG. 13A, the MBH (B) may provide, to the MBT (A), information on a transmission (TX) power of a beam transmitted to the MBT (A). Here, the information on the transmission power of the beam may be provided on a paging control channel (PCCH). The MBT (A) may obtain the information on the transmission power of the beam from the MBH (B). The MBT (A) may calculate an estimated range of a reception power (RP) at the MBT, which is an RP when the MBT (A) receives a beam transmitted by the MBH (B), based on the information on the transmission power of the beam obtained from the MBH (B). The estimated range of the RP at the MBT may include an estimated RP maximum value (i.e. RPest_max) and an estimated RP minimum value (i.e., RPest_min). The estimated range of the RP at the MBT may be calculated based on a distance (i.e., distance A-B) between the MBT (A) and the MBH (B), information on the transmission power of the beam transmitted from the MBH (B), and the like. The estimated range of the RP at the MBT may be calculated under the assumption that the wireless communication path between the MBT (A) and the MBH (B) has a line-of-sight (LOS) condition. The estimated range of the RP at the MBT may be calculated based on a predetermined system performance target (e.g., downlink 1.25 Gbps or more when using 400 MHz) set within the maximum communication distance between the MBT (A) and the MBH (B).

If the RP at the MBT is within the estimated range of the RP, the wireless communication between the MBT (A) and the MBH (B) may be expected to be normally performed. On the other hand, if the RP at the MBT is outside the estimated range of the RP, it may be required to adjust the beam alignment state between the MBT (A) and the MBH (B).

Referring to FIG. 13B, the MBT (A) may calculate the estimated range of the RP at the MBT based on a predetermined paging message transmitted on a PCCH from the MBH (B). Here, the paging message may include information of the antenna of the MBH (i.e., MBH Antenna info) (S1310). The paging message may include a list of position information of the MBT antenna (i.e., MBT Antenna's Position Info List) (S1320). The paging message may be configured to include some or all of the information of the antenna of the MBH (i.e., MBH Antenna info) and the list of position information of the MBT antenna (i.e., MBT Antenna's Position Info List).

The information of the antenna of the MBH (i.e., MBH Antenna info) (S1310) may include information on the type of position information of the antenna of the MBH (i.e., MBH Antenna's Position Type) and the position information of the antenna of the MBH (i.e., MBH Antenna's Position Info). Here, the position information of the antenna of the MBH may have a type such as GPS coordinate information, GCS coordinate information based on latitude, longitude, and altitude information, or GCS coordinate information based on X, Y, and Z axes. The information of the antenna of the MBH may include information on a TX power of a beam transmitted from the MBH antenna. The MBH antenna information may include information on a beam width of the beam transmitted from the MBH antenna. Here, the information on the beam width may include information on a vertical angle (Vertical°) and/or information on a horizontal angle (Horizontal°) of the beam.

The list of the position information of the MBT antenna (i.e., MBT Antenna's Position Info List) (S1320) may include the position information of the MBT antenna, which is identified or guessed by the MBH. When the MBH is performing communication with a plurality of MBTs, the list of the position information of the MBT antenna may include a position information entry for each of antennas of the plurality of MBTs. When the MBT includes a plurality of antennas, the list of the position information of the MBT antenna may include a position information entry for each of the plurality of MBT antennas. Even when there is one MBT antenna, if the MBH guesses that the MBT antenna is located in any one of a plurality of positions, the list of the position information of the MBT antenna may include a position information entry for each of the plurality of positions. FIG. 13B shows an exemplary embodiment (i.e., a case when List.n=1) in which one MBT antenna communicating with the MBH exists, the MBH identifies or guesses the position of the MBT antenna as a specific one position, and the list of the position information of the MBT antenna includes only one position information entry ([0]). Each position information entry for the MBH antenna may include information on the type of position information of the MBT antenna (i.e., MBT Antenna's Position Type), and the position information of the MBT antenna (i.e., MBT Antenna's Position Info). Here, the position information of the MBT antenna may have a type such as GPS coordinate information, GCS coordinate information based on latitude, longitude, and altitude information, or GCS coordinate information based on X, Y, Z axes.

The MBT may identify the information included in the paging message transmitted from the MBH. In an exemplary embodiment of the communication system, the MBT may compare the position information of the MBH antenna included in the paging message transmitted from the MBH and the position information of the MBH or the position information of the MBH antenna identified by the MBT. When there is an error exceeding a predetermined reference between the position information of the MBH or the MBH antenna identified by the MBT and the position information of the MBH antenna included in the paging message, the MBT may adjust the direction of the MBT PAH based on the position information of the MBH antenna included in the paging message, thereby improving the communication quality.

In an exemplary embodiment of the communication system, the MBT may compare the position information of the MBT antenna included in the paging message transmitted from the MBH, which is identified by the MBH, and the actual position information of the MBT antenna. If there is an error exceeding a predetermined reference in the position information of the MBT antenna identified by the MBH, the MBT may perform position movement of the aerial vehicle on which the MBT is mounted and/or physical control on the MBT antenna, so as to match the actual position of the MBT antenna to the position information of the MBT antenna identified by the MBH. Alternatively, if there is an error exceeding a predetermined reference in the position information of the MBT antenna identified by the MBH, the MBT may transmit a signal including the actual position information of the MBT antenna to the MBH. In this case, the MBH may improve the communication quality by adjusting the direction of the MBH PAH based on the position information of the MBT antenna provided from the MBT.

In an exemplary embodiment of the communication system, the MBT may calculate an estimated range of the RP at the MBT based on the information included in the paging message transmitted from the MBH. The MBT may calculate an RP value or an estimated RP value (i.e., RPest) based on a reception result of a beam transmitted from the MBH. When the RP value or the estimated RP value calculated according to the reception result of the beam is outside the estimated RP range, the MBT may improve the communication quality by performing the sixth to eighth exemplary embodiments of the beam control method in the communication system described below with reference to FIGS. 14A to 16C.

[Triangular Moving Beam Alignment Procedure]

FIGS. 14A to 14D are exemplary diagrams for describing a sixth exemplary embodiment of a beam control method in a communication system.

Figure 14A:
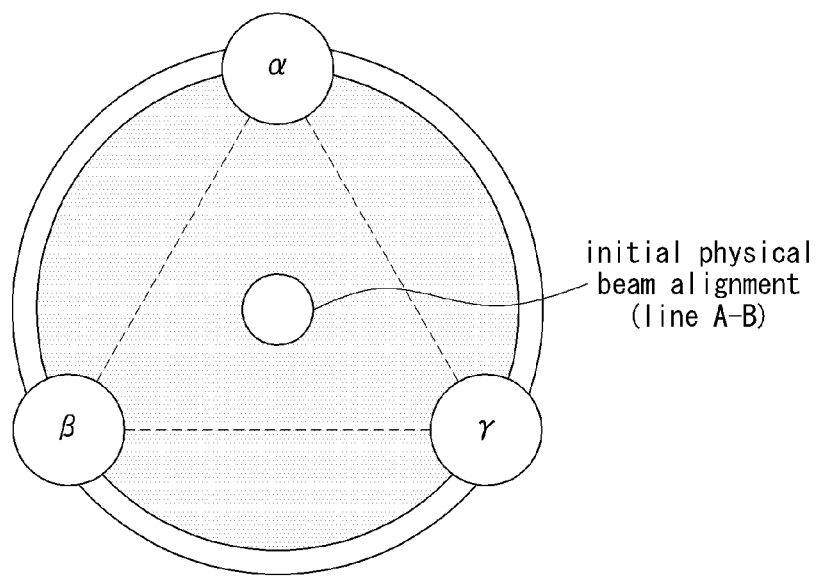
FIGS. 14A to 14D are exemplary diagrams for describing a sixth exemplary embodiment of a beam control method in a communication system.
Figure 14B:
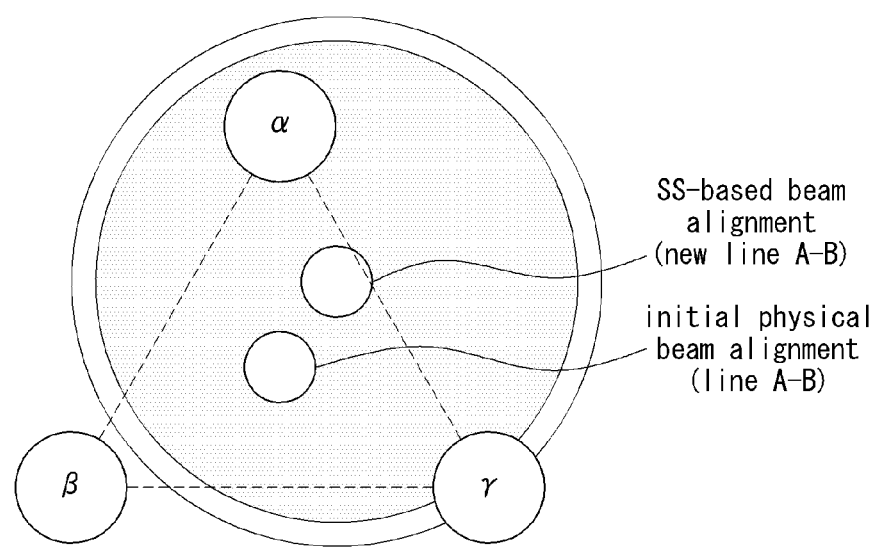
Figure 14C:
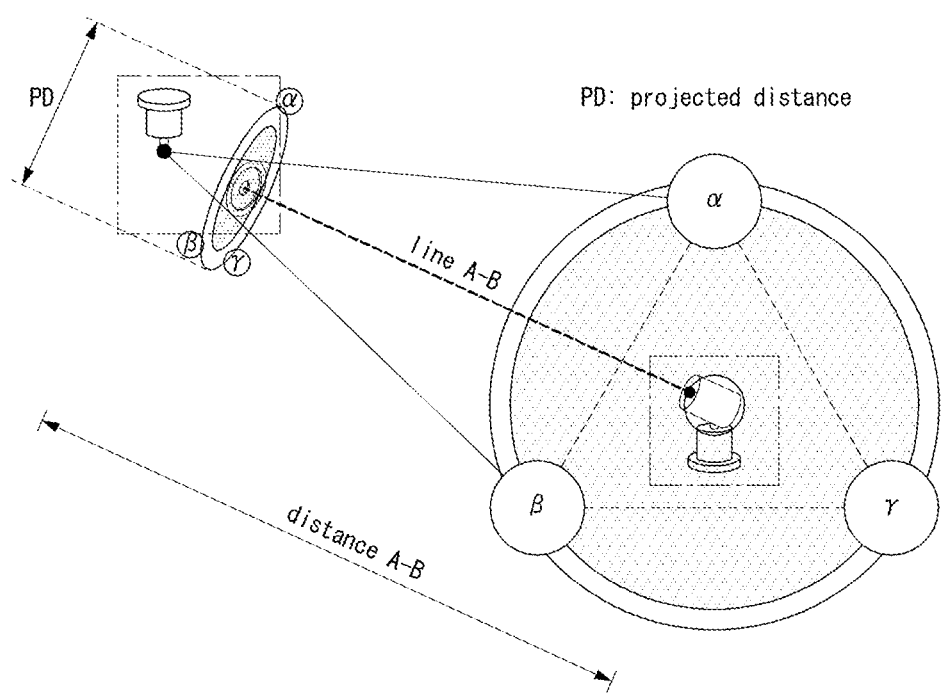
Figure 14D:
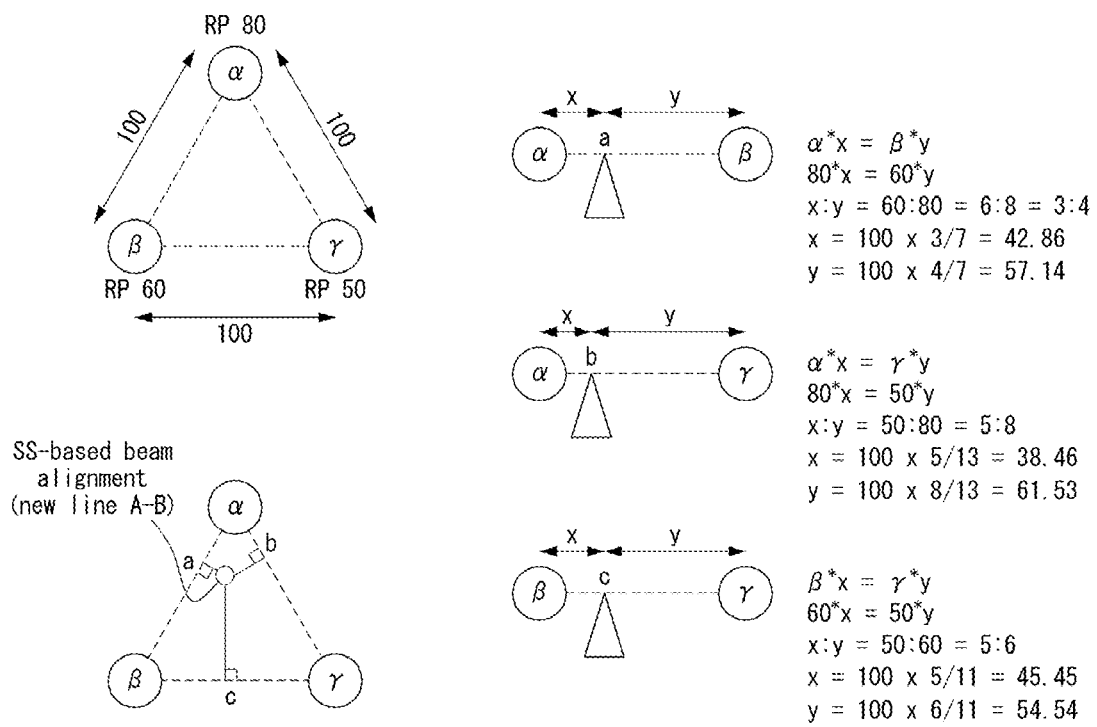

Referring to FIGS. 14A and 14D, a communication system may include a plurality of communication nodes that communicate with each other through beams. For example, the communication system includes one MBT and one MBH performing mutual communication through beams. However, this is only an example for convenience of description, and exemplary embodiments of the present disclosure are not limited thereto. The MBT included in the communication system may be the same as or similar to the MBT described with reference to FIGS. 13A and 13B. The MBH included in the communication system may be the same as or similar to the MBH described with reference to FIGS. 13A and 13B. Hereinafter, in describing the sixth exemplary embodiment of the beam control method in the communication system with reference to FIGS. 14A and 14D, the content overlapping with those described with reference to FIGS. 1 to 13B may be omitted.

FIG. 14A shows a state in which initial physical beam alignment for the MBT in the MBH is normally performed based on information of a line A-B corresponding to a wireless communication path between the MBT and the MBH. When the initial physical beam alignment between the MBT and the MBH is normally performed, an additional beam alignment operation between the MBT and the MBH may not be required. On the other hand, FIG. 14B shows a state in which the initial physical beam alignment for the MBT in the MBH is not normally performed. For example, when the information on the line A-B identified by the MBT and/or MBH is not accurate, an error may occur in the beam alignment. Alternatively, when the communication path and/or communication environment including the existing line A-B is not an optimal condition for wireless communication between the MBT and the MBH, the result of the beam alignment based on the information of the line A-B may be evaluated as not normal. In this case, the MBT and/or MBH may require an additional beam alignment operation for adjusting the beam alignment state. The MBT and/or MBH may modify or update the information of the line A-B, and may perform an SS-based beam alignment operation based on information of the new line A-B.

FIG. 14C shows an exemplary embodiment in which the MBT performs a triangular moving beam alignment procedure based on information included in a paging message transmitted from the MBH. Here, the paging message transmitted from the MBH may be the same as or similar to the paging message described with reference to FIGS. 13A and 13B. The paging message transmitted from the MBH may include position information of the MBH antenna, information on a beam width of a beam transmitted from the MBH, position information of the MBT antenna, and the like.

The MBT may calculate a distance (i.e., distance A-B) between the MBT and the MBH based on the information included in the paging message transmitted from the MBH. Based on the information included in the paging message transmitted from the MBH and the value of the distance A-B, a projected distance or a projected area of the beam transmitted from the MBH at the position of the MBT may be estimated. Here, the projected area may correspond to the entire region 425 in the cross-section of the beam of the MBH described with reference to FIG. 4A, or may correspond to the partial region 427 in the cross-section of the beam of the MBH in which uniform expected power is guaranteed.

The MBT may select a plurality of points within the estimated projected area. For example, in an exemplary embodiment of the communication system, the MBT may select three points α, β, and γ within the calculated projected area. In an exemplary embodiment of the communication system, the three points α, β, and γ may be selected to form a triangle inscribed in the projected area. However, this is only an example for convenience of description, and exemplary embodiments of the present disclosure are not limited thereto.

The MBT may adjust the MBT PAH based on three selected points α, β, and γ. By slightly adjusting the angle of the PAH through the gimbal of the antenna, the MBT may match the three points α, β, and γ with the position and direction of the MBT PAH once, respectively. The MBT may receive a beam transmitted from the MBH at each of three points α, β, and γ.

Referring to FIG. 14D, the MBT may calculate an RP of the beam received at each of the three points α, β, and γ. The MBT may estimate an optimal reception point for the beam of the MBH based on the RP values calculated at the respective three points α, β, and γ. The MBT may estimate the optimal reception point through proportional calculation using the RPs for the respective points. The MBT may configure new information of a new line A-B based on the estimated optimal reception point.

Specifically, when the RP at the point α is 80 dB, the RP at the point β is 60 dB, and the RP at the point γ is 50 dB, the MBT may determine the optimal reception point based on the following calculation process. First, on a line α-β connecting the point α and the point β, a point (i.e., point a) at which a ratio between a distance from the point α and a distance from the point β is 60:80 may be identified. Also, on a line α-γ connecting the point α and the point γ, a point (i.e., point b) at which a ratio between a distance from the point α and a distance from the point γ is 50:80 may be identified. Also, on a line β-γ connecting the point β and the point γ, a point (i.e., point c) at which a ratio between a distance from the point β and a distance from the point γ is 50:60 may be identified. The MBT may estimate an optimal reception point based on the point a, point b, and point c. For example, the MBT may estimate a point where a normal line a passing through the line α-β at the point a, a normal line b passing through the line α-γ at the point b, and a normal line c passing through the line β-γ at the point c meet as the optimal reception point. The MBT may update information on the line A-B based on the estimated optimal reception point. The MBT may receive the beam transmitted from the MBH at the estimated optimal reception point by controlling the MBT PAH based on the information on the new line A-B. Through this, the communication quality between the MBT and MBH may be improved.

[Extended Triangular Moving Beam Alignment Procedure]

Figure 15A:
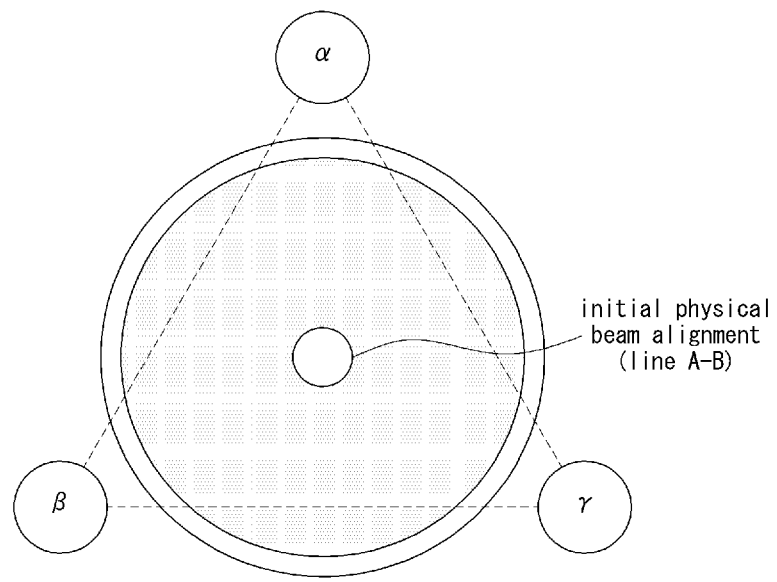
FIGS. 15A to 15C are exemplary diagrams for describing a seventh exemplary embodiment of a beam control method in a communication system.
Figure 15B:
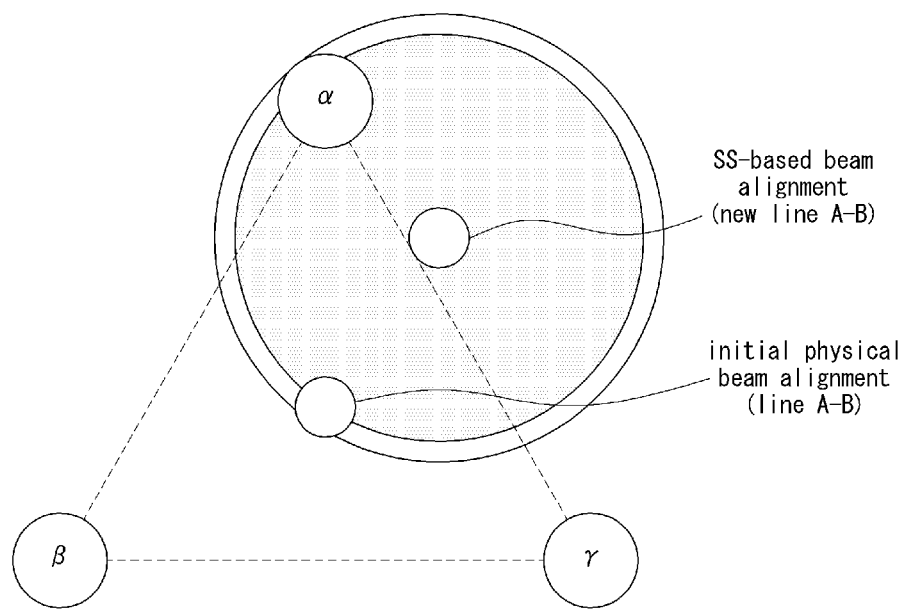
Figure 15C:
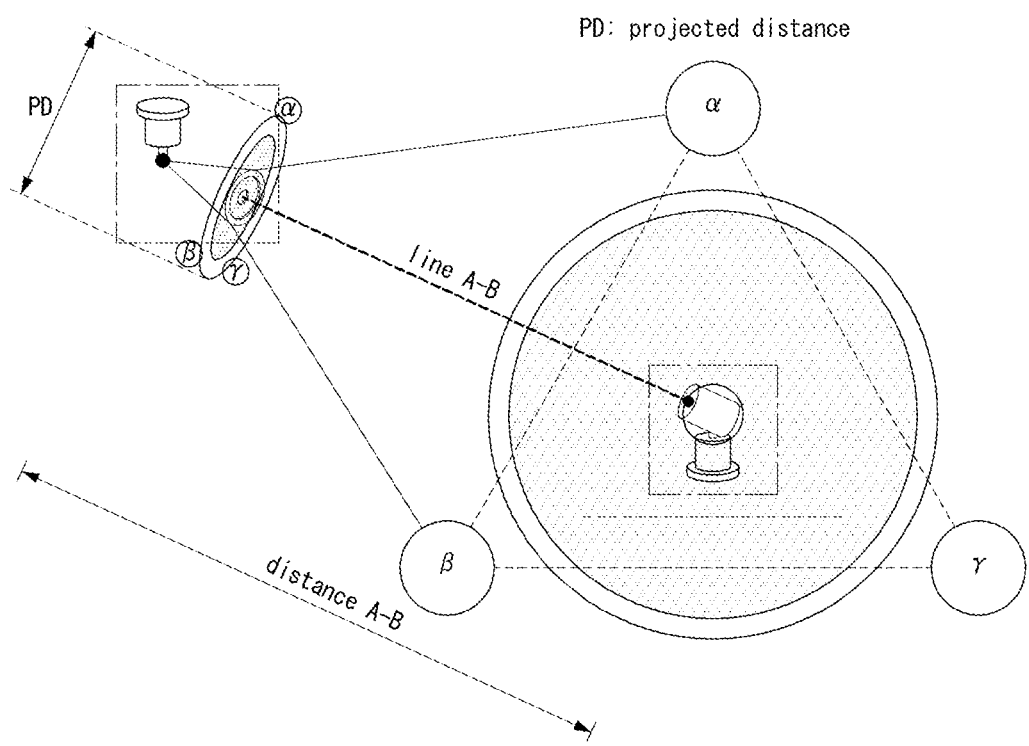

FIGS. 15A to 15C are exemplary diagrams for describing a seventh exemplary embodiment of a beam control method in a communication system.

Referring to FIGS. 15A and 15C, a communication system may include a plurality of communication nodes that communicate with each other through beams. For example, the communication system includes one MBT and one MBH performing mutual communication through beams. However, this is only an example for convenience of description, and exemplary embodiments of the present disclosure are not limited thereto. The MBT included in the communication system may be the same as or similar to the MBT described with reference to FIGS. 13A and 13B. The MBH included in the communication system may be the same as or similar to the MBH described with reference to FIGS. 13A and 13B. Hereinafter, in describing the seventh exemplary embodiment of the beam control method in the communication system with reference to FIGS. 15A to 15C, the content overlapping with those described with reference to FIGS. 1 to 14D may be omitted.

In the seventh exemplary embodiment of the beam control method in the communication system, similarly to the sixth exemplary embodiment of the beam control method, the MBT may receive a beam transmitted from the MBH at a plurality of different points, and may obtain an RP at each point. For example, the MBT may receive the beam transmitted from the MBH at three predetermined points to identify three RP values, and may estimate an optimal reception point based on the obtained three RP values. In the seventh exemplary embodiment of the beam control method in the communication system, unlike the sixth exemplary embodiment of the beam control method, the RP value may be calculated at each of three of virtual points according to the maximum rotatable angle supported by a gimbal on which the MBT PAH is installed. The three points at which the MBT receives the beam transmitted from the MBH in the seventh exemplary embodiment may be selected from a wider area than the three points at which the beam transmitted from the MBH is received in the sixth exemplary embodiment of the beam control method. An alignment procedure according to the seventh exemplary embodiment of the beam control method may be referred to as an 'extended triangular moving beam alignment procedure'.

FIG. 15A shows a state in which initial physical beam alignment for the MBT at the MBH is normally performed. On the other hand, FIG. 15B shows a state in which the initial physical beam alignment for the MBT at the MBH is not normally performed. In this case, the MBT may select three points α, β, and γ from among the virtual points according to the maximum rotatable angle supported by the gimbal on which the MBT PAH is installed. Referring to FIG. 15C, the MBT may receive the beam transmitted from the MBH at each of the three selected points α, β, and γ, and may calculate the RP value at each of the three points α, β, and γ based on the reception results. The MBT may estimate an optimal reception point based on the RP values at the respective three selected points α, β, and γ. The operation in which the MBT estimates the optimal reception point based on the RP values at the respective three points α, β, and γ may be performed identically or similarly to the operation of estimating the optimal reception point described with reference to FIG. 14D.

[Aerial Vehicle Triangular Moving Beam Alignment Procedure]

Figure 16A:
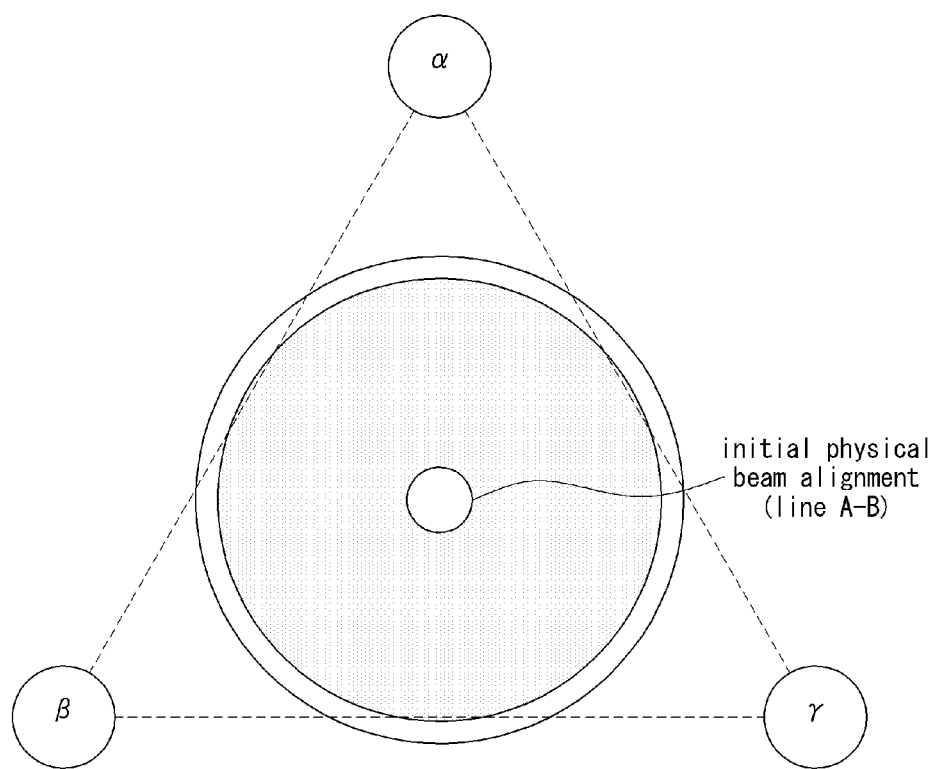
FIGS. 16A to 16C are exemplary diagrams for describing an eighth exemplary embodiment of a beam control method in a communication system.
Figure 16B:
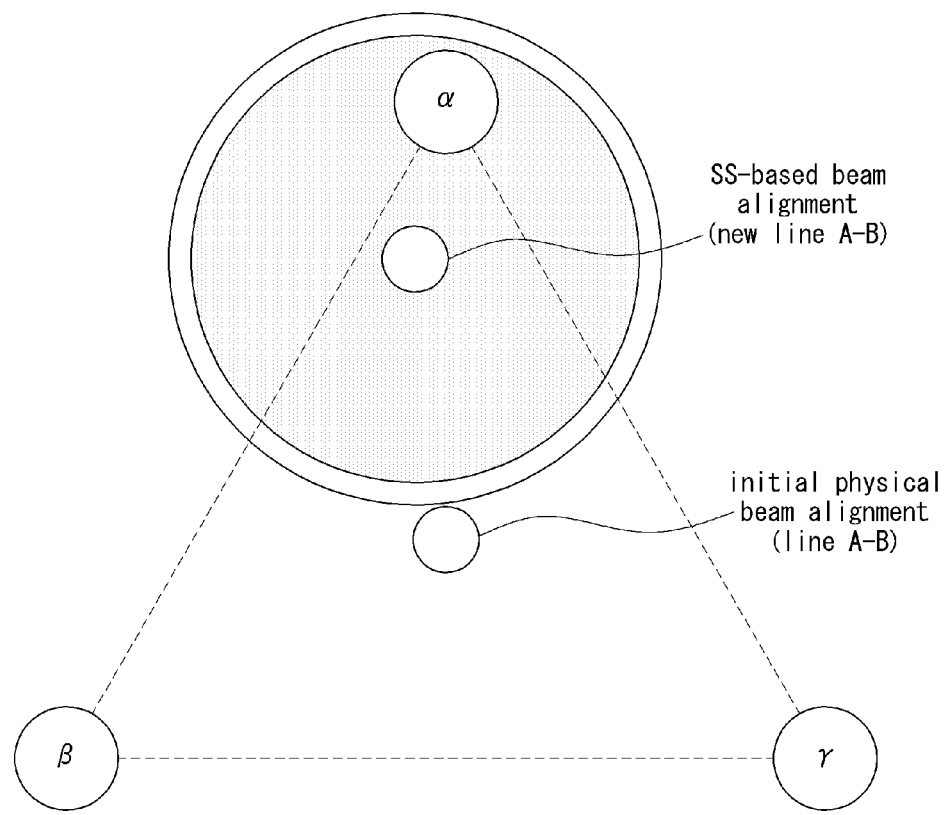
Figure 16C:
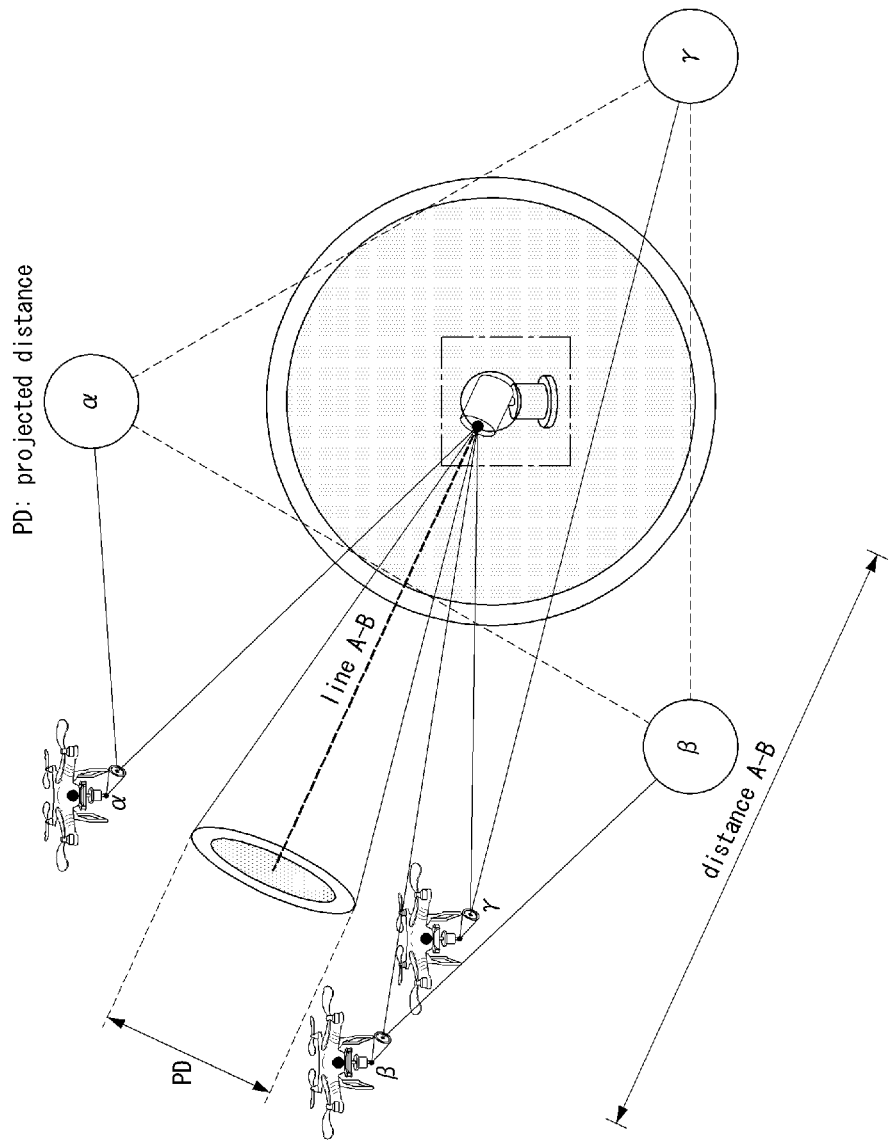

FIGS. 16A to 16C are exemplary diagrams for describing an eighth exemplary embodiment of a beam control method in a communication system.

Referring to FIGS. 16A and 16C, a communication system may include a plurality of communication nodes that communicate with each other through beams. For example, the communication system includes one MBT and one MBH performing mutual communication through beams. However, this is only an example for convenience of description, and exemplary embodiments of the present disclosure are not limited thereto. The MBT included in the communication system may be the same as or similar to the MBT described with reference to FIGS. 13A and 13B. The MBH included in the communication system may be the same as or similar to the MBH described with reference to FIGS. 13A and 13B. Hereinafter, in describing the eighth exemplary embodiment of the beam control method in the communication system with reference to FIGS. 16A to 16C, the content overlapping with those described with reference to FIGS. 1 to 15C may be omitted.

In the eighth exemplary embodiment of the beam control method in the communication system, similarly to the sixth and seventh exemplary embodiments of the beam control method, the MBT may receive a beam transmitted from the MBH at a plurality of different points, and may obtain an RP value at each point. For example, the MBT may receive the beam transmitted from the MBH at three predetermined points to identify three RP values, and may estimate an optimal reception point based on the obtained three RP values. In the eighth exemplary embodiment of the beam control method, unlike in the sixth and seventh exemplary embodiments of the beam control method, three points may be selected based on not only the movement of the MBT PAH through the gimbal, but also the movement of the position of the MBT-mounted aerial vehicle itself. That is, in the eighth exemplary embodiment of the beam control method, the three points may be selected in a wider area than an area according to the maximum rotatable angle supported by the gimbal on which the MBT PAH is installed, and the RP values at the respective selected three points may be calculated. The three points at which the MBT receives the beam transmitted from the MBH in the eighth exemplary embodiment of the beam control method may be selected in a wider area than the three points at which the beam transmitted from the MBH is received in the sixth and seventh exemplary embodiments of the beam control method. An alignment procedure according to the eighth exemplary embodiment of the beam control method may be referred to as an 'aerial vehicle triangular moving beam alignment procedure'.

FIG. 16A shows a state in which initial physical beam alignment for the MBT at the MBH is normally performed. On the other hand, FIG. 16B shows a state in which the initial physical beam alignment for the MBT at the MBH is not normally performed. In this case, the MBT may select three points α, β, and γ to which the MBT can move through the MBT-mounted aerial vehicle. The three points α, β, and γ may be selected based on a predetermined movement interval reference, centered on the initial physical beam alignment position based on information of the line A-B. Here, the predetermined movement interval reference may be set for the aerial vehicle on which the MBT is mounted. The predetermined movement interval reference may be determined based on a communication distance between the MBT and the MBH. In an exemplary embodiment of the communication system, the predetermined movement interval reference may be set in units of several meters. In another exemplary embodiment of the communication system, when the communication distance between the MBT and the MBH is 10 km, the predetermined movement interval reference may be set to 100 m or more. The distance between the three points α, β, and γ selected based on the predetermined movement interval reference may have a value equal to or close to the predetermined movement interval reference.

Referring to FIG. 16C, the MBT may receive the beam transmitted from the MBH at each of the three selected points α, β, and γ, and may calculate the RP values at the respective three points α, β, and γ. The MBT may estimate the optimal reception point based on the RP values at the respective three selected points α, β, and γ. The operation in which the MBT estimates the optimal reception point based on the RP values at the respective three points α, β, and γ may be performed identically or similarly to the operation of estimating the optimal reception point described with reference to FIG. 14D.

[TX/RX Power Information-Based Beam Alignment Procedure]

Figure 17:
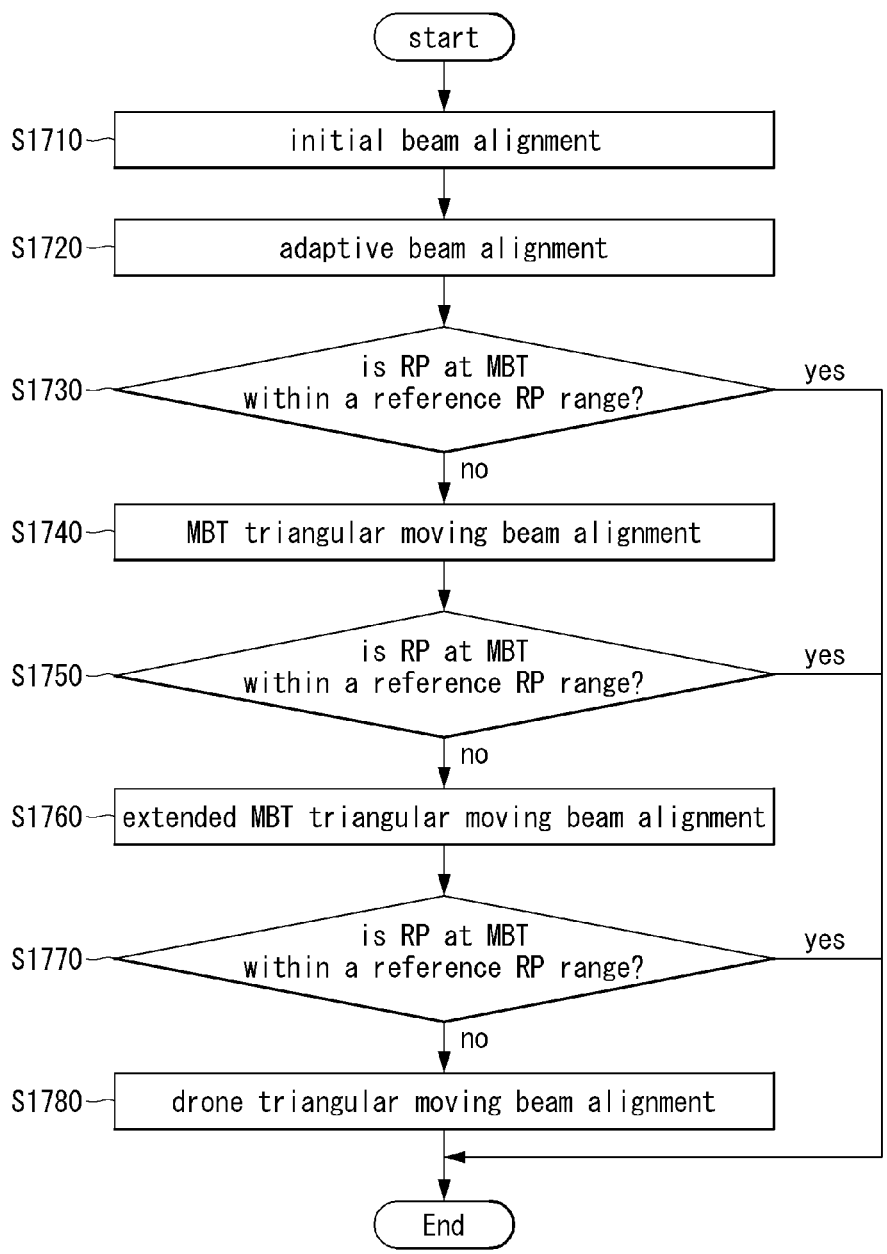
FIG. 17 is a flow chart for describing a ninth exemplary embodiment of a beam control method in a communication system.

FIG. 17 is a flow chart for describing a ninth exemplary embodiment of a beam control method in a communication system.

Referring to FIG. 17, a communication system may include a plurality of communication nodes that communicate with each other through beams. For example, the communication system includes one MBT and one MBH performing mutual communication through beams. However, this is only an example for convenience of description, and exemplary embodiments of the present disclosure are not limited thereto. The MBT included in the communication system may be the same as or similar to the MBT described with reference to FIGS. 13A and 13B. The MBH included in the communication system may be the same as or similar to the MBH described with reference to FIGS. 13A and 13B. The MBT and MBH may perform a beam alignment procedure based on transmission/reception power information through operations according to the ninth exemplary embodiment of the beam control method shown in FIG. 17. Hereinafter, in describing the ninth exemplary embodiment of the beam control method in the communication system with reference to FIG. 17, the content overlapping with those described with reference to FIGS. 1 to 16C may be omitted.

In an exemplary embodiment of the communication system, the MBT and MBH may perform an initial beam alignment procedure in order to perform mutual wireless communication through beams (S1710). The operations according to the step S1710 may be the same as or similar to the operations according to the third exemplary embodiment of the beam control method described with reference to FIG. 11. After the initial beam alignment procedure is performed, the MBT and MBH may perform an adaptive beam alignment procedure to maintain and/or adjust the beam alignment (S1720). The operations according to the step S1720 may be the same as or similar to the operations according to the fourth exemplary embodiment of the beam control method described with reference to FIG. 12. In order to maintain or improve the quality of mutual wireless communication, the MBT and MBH may perform an open loop signal strength (SS)-based beam alignment procedure.

In an exemplary embodiment of the communication system, the MBH may transmit, to the MBT, a first signal including information of a TX power of a beam transmitted from the MBH. The MBT may identify information on the TX power of the beam transmitted from the MBH, based on the first signal transmitted from the MBH. The MBH may transmit the first signal once or may transmit the first signal multiple times. In an exemplary embodiment of the communication system, at least some of the first signals transmitted one or more times may further include position information of an antenna of the MBH, position information of an antenna of the MBT identified by the MBH, and the like. In this case, the MBT may update information of the line A-B based on the position information of the MBH antenna included in the first signal, the position information of the MBT antenna identified by the MBH, and the like, and may receive the beam transmitted from the MBH based on the updated information of the line A-B. The MBT may calculate a reference RP range based on a distance between the MBT and the MBH, information on the TX power of the beam transmitted from the MBH identified based on the first signal, and the like. Here, the reference RP range may be the same as or similar to the estimated RP range at the MBT described with reference to FIG. 13A.

The MBT may calculate the RP value at the MBT based on the reception result for the beam transmitted from the MBH. The MBT may determine whether the RP value at the MBT is within or outside the reference RP range (S1730). If it is determined that the RP value at the MBT is within the reference RP range in the step S1730, the MBT may determine that the current beam alignment state is normal. In this case, the MBT may terminate the transmission/reception power information-based beam alignment procedure. Alternatively, the MBT may perform the adaptive beam alignment procedure according to the step S1720 or the determination operation according to the step S1730 again. On the other hand, if it is determined that the RP value at the MBT is outside the reference RP range in the step S1730, the MBT may perform the triangular moving beam alignment procedure (S1740). The operations in the step S1740 may be the same as or similar to the operations according to the sixth exemplary embodiment of the beam control method described with reference to FIGS. 14A to 14D.

After performing the triangular moving beam alignment procedure according to the step S1740, the MBT may calculate the RP value at the MBT again based on the reception result for the beam transmitted from the MBH. The MBT may determine whether the RP value at the MBT is within or outside the reference RP range (S1750). If it is determined that the RP value at the MBT is within the reference RP range in the step S1750, the MBT may determine that the current beam alignment state is normal. In this case, the MBT may terminate the transmission/reception power information-based beam alignment procedure. Alternatively, the MBT may perform the adaptive beam alignment procedure according to the step S1720 or the determination operation according to the step S1730 again. On the other hand, if it is determined that the RP value at the MBT is outside the reference RP range in the step S1750, the MBT may perform the extended triangular moving beam alignment procedure (S1760). The operations in the step S1760 may be the same as or similar to the operations according to the seventh exemplary embodiment of the beam control method described with reference to FIGS. 15A to 15C.

After performing the extended triangular moving beam alignment procedure according to the step S1760, the MBT may calculate the RP value at the MBT again based on the reception result for the beam transmitted from the MBH. The MBT may determine whether the RP value at the MBT is within or outside the reference RP range (S1770). If it is determined that the RP value at the MBT is within the reference RP range in the step S1770, the MBT may determine that the current beam alignment state is normal. In this case, the MBT may terminate the transmission/reception power information-based beam alignment procedure. Alternatively, the MBT may perform the adaptive beam alignment procedure according to the step S1720 or the determination operation according to the step S1730 again. On the other hand, if it is determined that the RP value at the MBT is outside the reference RP range in the step S1770, the MBT may perform a drone triangular moving beam alignment procedure or the aerial vehicle triangular moving beam alignment procedure (S1780). The operations in the step S1780 may be the same as or similar to the operations according to the eighth exemplary embodiment of the beam control method described with reference to FIGS. 16A to 16C.

After performing the aerial vehicle triangular moving beam alignment procedure according to the step S1780, the MBT may terminate the transmission/reception power information-based beam alignment procedure. Alternatively, the MBT may perform the adaptive beam alignment procedure according to the step S1720, the determination operation according to the step S1730, or the determination operation according to the step S1770 again.

Based on the operations according to the steps S1710 to S1780, the MBT and the MBH may perform the beam alignment procedure based on transmission/reception power information. Accordingly, the MBT and the MBH may control so that wireless communication between the MBT and the MBH configured through the initial beam alignment procedure and the adaptive beam alignment procedure can be continuously performed smoothly.

[Closed-Loop Beam Alignment Procedure]

Figure 18A:
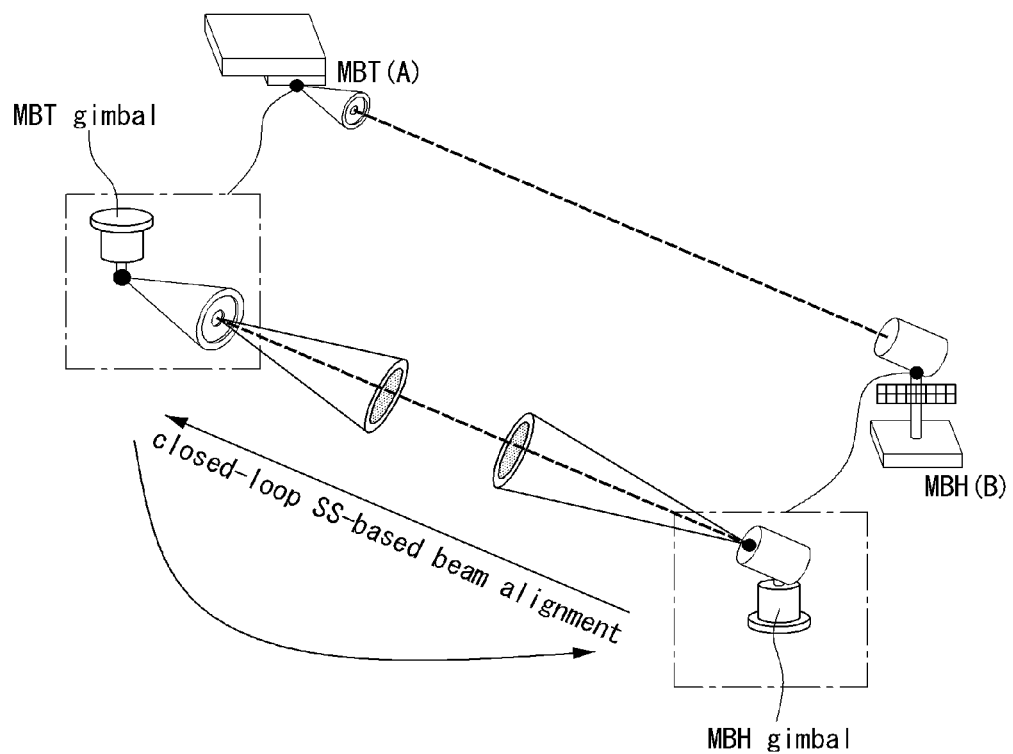

FIGS. 18A to 18C are exemplary diagrams for describing a tenth exemplary embodiment of a beam control method in a communication system.

Referring to FIGS. 18A and 18C, a communication system may include a plurality of communication nodes that communicate with each other through beams. For example, the communication system includes one MBT (A) and one MBH (B) performing mutual communication through beams. However, this is only an example for convenience of description, and exemplary embodiments of the present disclosure are not limited thereto. The MBT (A) included in the communication system may be the same as or similar to the MBT (A) described with reference to FIG. 7. The MBH (B) included in the communication system may be the same as or similar to the MBH (B) described with reference to FIG. 7. The MBT (A) and MBH (B) may perform a closed-loop beam alignment procedure through operations according to the tenth exemplary embodiment of the beam control method shown in FIGS. 18A to 18C. Here, the closed-loop beam alignment procedure may be performed together with at least some of the exemplary embodiments of the beam alignment procedure described with reference to FIGS. 11 to 17, or may be performed independently from the exemplary embodiments of the beam alignment procedure described with reference to FIGS. 11 to 17. Hereinafter, in describing the tenth exemplary embodiment of the beam control method in the communication system with reference to FIGS. 18A to 18C, the content overlapping with those described with reference to FIGS. 1 to 17 may be omitted.

Even if a beam alignment operation between transmission/reception antennas of communication nodes performing mutual communications through beams in a communication environment is normally performed, the best communication quality may not be guaranteed. Accordingly, based on a value of a signal strength (SS) of a beam transmitted from the MBH (B) to the MBT (A), and/or a value of an SS of a beam transmitted from the MBT (A) to the MBH (B), a procedure for achieving an optimal beam alignment state may be performed. Such the procedure may be referred to as a 'closed loop SS-based beam alignment' procedure.

Referring to FIG. 18A, the MBH (B) may provide, to the MBT (A), information on a transmission (TX) power of a beam transmitted to the MBT (A). The MBH (B) may transmit, to the MBT (A), a first signal including information on the TX power of the beam transmitted to MBT (A). On the other hand, the MBT (A) may provide, to the MBH (B), information on a TX power of a beam transmitted to the MBH (B). The MBT (A) may transmit, to the MBH (B), a second signal including information on the TX power of the beam transmitted to the MBH (B). Here, in a state in which a wireless connection between the MBT (A) and the MBH (B) is established, the first and second signals may be transmitted on a predetermined dedicated channel for the MBT (A). For example, the MBH (B) may transmit the first signal to the MBT (A) on a dedicated control channel (DCCH) for the MBT (A). On the other hand, the MBT (A) may transmit the second signal to the MBH (B) on the DCCH for the MBT (A).

The MBT (A) may obtain information on the TX power of the beam from the MBH (B) based on the first signal. The MBT (A) may calculate an estimated range of an RP at the MBT (A), which is an RP measured by the MBT (A) on the beam transmitted from the MBH (B), based on the information on the TX power of the beam transmitted from the MBH (B) which is obtained from the MBH (B). The estimated range of the RT at the MBT (A) may be calculated based on a distance (i.e., distance A-B) between the MBT (A) and the MBH (B), information on the TX power of the beam transmitted from the MBH (B), and the like. The estimated range of the RP at the MBT (A) may be calculated under the assumption that the wireless communication path between the MBT (A) and the MBH (B) has a LOS condition. The estimated range of the RP at the MBT (A) may be calculated based on a predetermined system performance target set within the maximum communication distance between the MBT (A) and the MBH (B). If the RP at the MBT (A) is within the estimated range of the RP at the MBT (A), the wireless communication between the MBT (A) and the MBH (B) may be expected to be normally performed. On the other hand, if the RP at the MBT (A) is outside the estimated range of the RP at the MBT (A), it may be required to adjust the beam alignment state between the MBT (A) and the MBH (B).

The MBH (B) may obtain information on the TX power of the beam from the MBT (A) based on the second signal. The MBH (B) may calculate an estimated range of an RP at the MBH (B), which is an RP measured by the MBH (B) on the beam transmitted from the MBT (A), based on the information on the TX power of the beam transmitted from the MBT (A) which is obtained from the MBT (A). The estimated range of the RT at the MBH (B) may be calculated based on the distance (i.e., distance A-B), information on the TX power of the beam transmitted from the MBT (A), and the like. The estimated range of the RP at the MBH (B) may be calculated under the assumption that the wireless communication path between the MBT (A) and the MBH (B) has a LOS condition. The estimated range of the RP at the MBH (B) may be calculated based on a predetermined system performance target set within the maximum communication distance between the MBT (A) and the MBH (B). If the RP at the MBH (B) is within the estimated range of the RP at the MBH (B), the wireless communication between the MBT (A) and the MBH (B) may be expected to be normally performed. On the other hand, if the RP at the MBH (B) is outside the estimated range of the RP at the MBH (B), it may be required to adjust the beam alignment state between the MBT (A) and the MBH (B).

FIG. 18A shows an exemplary embodiment in which one MBT (A) and one MBH (B) perform communications through beams. However, exemplary embodiments of the present disclosure are not limited thereto. For example, in an exemplary embodiment of the communication system, one MBH may communicate with a plurality of MBTs through beams. In this case, the MBH may not be able to maintain an optimal beam alignment state for each of all the MBTs. The MBH may select any one of the plurality of MBTs based on a plurality of second signals transmitted from the plurality of MBTs. For example, the MBH may select a first MBT from among the plurality of MBTs, and adjust a beam alignment state of the MBH for the first MBT. The MBH may perform an operation for preventing a collision between the MBTs for the remaining MBTs excluding the first MBT. For example, the MBH may perform beam alignment based on the first signal transmitted from the first MBT, and then provide information on the position of the MBH to the remaining MBTs. Alternatively, the MBH may perform beam alignment based on the first signal transmitted from the first MBT, and then provide different virtual information on the position of the MBH to the remaining MBTs.

Referring to FIG. 18B, the MBT (A) may calculate the estimated RP range for the RP at the MBT based on the first signal transmitted on a DCCH from the MBH (B). Here, the first signal may correspond to an RRC message. The RRC message may include MBH-driven beam alignment information (S1810). The RRC message may include information on the antenna of the MBH antenna (i.e., MBH Antenna info) (S1820). The RRC message may include a list of position information of the MBT antenna (i.e., MBT Antenna's Position Info List) (S1830).

Here, the information on the antenna of the MBH (S1820) may be the same as or similar to the MBH antenna information (S1310) included in the paging message described with reference to FIG. 13B. The list of position information of the MBT antenna (i.e., MBT Antenna's Position Info List) (S1830) may be the same as or similar to the list of position information of the MBT antenna included in the paging message described with reference to FIG. 13B. The MBT may identify the information included in the RRC message transmitted from the MBH. In an exemplary embodiment of the communication system, the MBT may evaluate and adjust the beam alignment state by comparing the position information of the MBH antenna included in the RRC message transmitted from the MBH with the position information of the MBH or the position information of the MBH antenna identified by the MBT. In an exemplary embodiment of the communication system, the MBT may evaluate and adjust the beam alignment state by comparing the position information of the MBT antenna identified by the MBH, which is included in the RRC message transmitted from the MBH, and the actual position information of the MBT antenna. Such the process may be the same as or similar to that described with reference to FIG. 13B.

In an exemplary embodiment of the communication system, the MBT may calculate an estimated range of the RP at the MBT RP based on the information included in the RRC message transmitted from the MBH. Based on comparison of the estimated range of the RP at the MBT with the actually-measured RP at the MBT, the MBT may perform beam alignment procedures such as the triangular moving beam alignment procedure, the extended triangular moving beam alignment procedure, and the aerial vehicle triangular moving beam alignment procedure. Such the process may be the same as or similar to that described with reference to FIGS. 14A to 17.

The MBH-driven beam alignment information included in the RRC message (i.e., MBH-driven Beam Alignment info) (S1810) may include information indicating whether the MBT is to maintain the existing beam alignment state or perform an operation of updating the beam alignment. An MBH-driven beam alignment stop flag (i.e., MBH-driven beam align. lock flag) set to 'setup (1)' may indicate a beam alignment stop, the flag set to 'release (0)' may indicate release of the beam alignment stop, and the flag set to 'mutual-movement (2)' may indicate a beam alignment operation based on movement of both the MBH and MBT. Meanwhile, an MBH-driven beam alignment activation time (i.e., MBH-driven beam align. Activation time) may indicate a timing of applying the command indicated by the MBH-driven beam alignment stop flag. The MBH-driven beam alignment information (i.e., MBH-driven Beam Alignment info) (S1810) may optionally further include information on a duration time (i.e., Duration Time). The information on the duration time may refer to a length of time for which the command indicated by the MBH-led beam alignment stop flag lasts.

In an exemplary embodiment of the communication system, when the MBH-driven beam alignment information of the RRC message received by the MBT indicates 'setup (1), activation time (X=2), duration time (Y=10)', the MBT may stop the beam alignment operation after 2 seconds, and may maintain the existing beam alignment state for 10 seconds thereafter. If 12 seconds elapses after the MBT receives the RRC message, the beam alignment stop may be released. On the other hand, when the MBH-driven beam alignment information of the RRC message received by the MBT indicates 'setup (1), activation time (X=0), duration time (Y=0)', the MBT may stop the beam alignment operation immediately after receiving the RRC message. The MBT may continue the beam alignment stop state until 'release (0)' is indicated through a separate RRC message thereafter.

Referring to FIG. 18C, the MBH (B) may calculate the estimated RP range for the RP at the MBH (B) based on the second signal transmitted on a DCCH from the MBT (A). Here, the second signal may correspond to an RRC message. The RRC message may include the position information of the MBT antenna (i.e., MBT Antenna's Position Info' (S1840). The RRC message may include information on the antenna of the MBH (i.e., MBH Antenna info) (S1850).

The position information of the MBT antenna (i.e., MBT Antenna's Position Info) (S1840) may include information of the type of position information of the MBT antenna (i.e., MBT Antenna's Position Type), and the position information of the MBT antenna (i.e., MBT Antenna's Position Info). The position information of the MBT antenna may include information on a TX power of the beam transmitted from the antenna of the MBT. The position information of the MBT antenna may include information on a beam width of the beam transmitted from the antenna of the MBT.

The information on the antenna of the MBH (i.e., MBH Antenna Info) (S1850) may include position information of the MBH antenna identified or guessed by the MBT. The information on the antenna of the MBH may include information on the type of position information of the MBH antenna (i.e., MBH Antenna's Position Type) and the position information of the MBH antenna (i.e., MBH Antenna's Position Info).

The MBH may identify the information included in the RRC message transmitted from the MBT. In an exemplary embodiment of the communication system, the MBH may compare the position information of the MBT antenna included in the RRC message transmitted from the MBT, and the position information of the MBT or the position information of the MBT antenna identified by the MBH. When there is an error exceeding a predetermined reference between the position information of the MBT or the position information of the MBT antenna, which is identified by the MBH, and the position information of the MBT antenna included in the paging message, the MBH may improve the communication quality by adjusting the direction of the MBH PAH based on the position information of the MBT antenna included in the RRC message.

In an exemplary embodiment of the communication system, the MBH may compare the position information of the MBH antenna identified by the MBT, which is included in the paging message transmitted from the MBT, and the actual position information of the MBH antenna. If there is an error exceeding a predetermined reference in the position information of the MBH antenna identified by the MBT, the MBH may perform physical control on the MBH antenna to match the actual position of the MBH antenna to the position information of the MBH antenna identified by the MBT. Alternatively, if there is an error exceeding a predetermined reference in the position information of the MBH antenna identified by the MBT, the MBH may transmit a signal including the actual position information of the MBH antenna to the MBT. In this case, the MBT may improve the communication quality by adjusting the direction of the MBT PAH based on the position information of the MBH antenna provided from the MBH.

In an exemplary embodiment of the communication system, the MBH may calculate an estimated range of the RP at the MBH based on the information included in the RRC message transmitted from the MBT. Based on comparison between the estimated range of the RP at the MBH and the actually-measured RP at the MBH, the MBH may perform beam alignment procedures such as the triangular moving beam alignment procedure, the extended triangular moving beam alignment procedure, and the like. Such the process may be similar to the beam alignment operations of the MBT described with reference to FIGS. 14A to 15C.

[Aerial Vehicle Movement Based Beam Alignment Procedure]

Figure 19A:
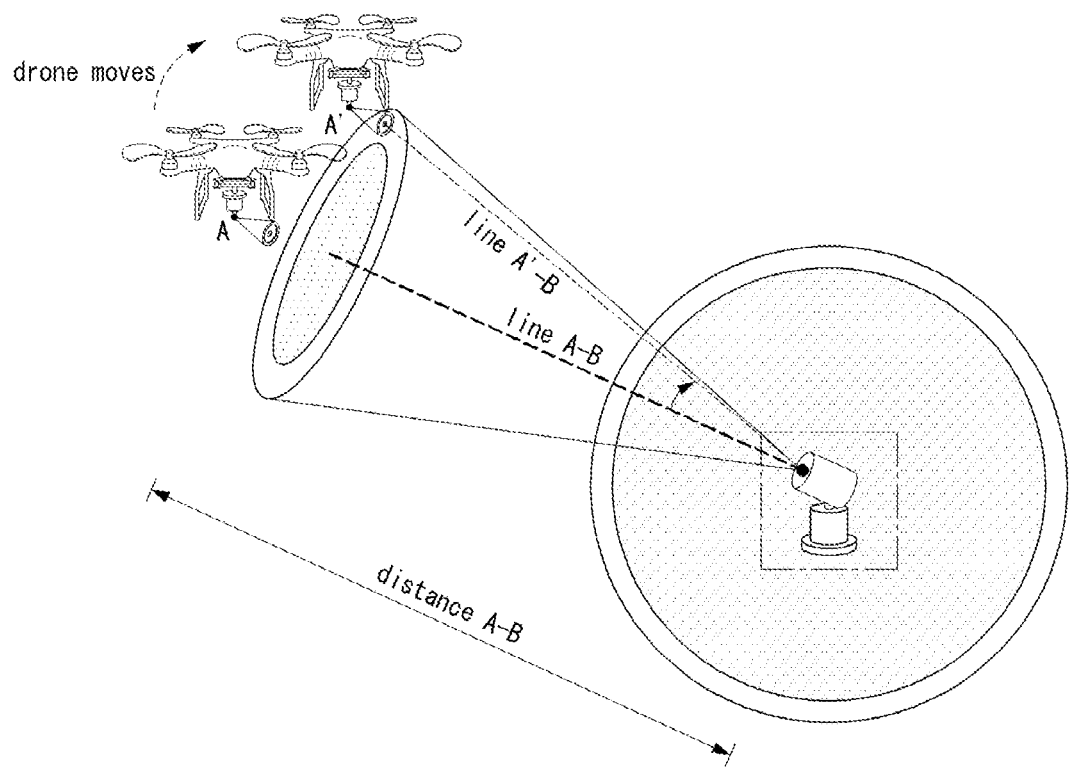
FIGS. 19A to 19B are exemplary diagrams for describing an eleventh exemplary embodiment of a beam control method in a communication system.
Figure 19B:
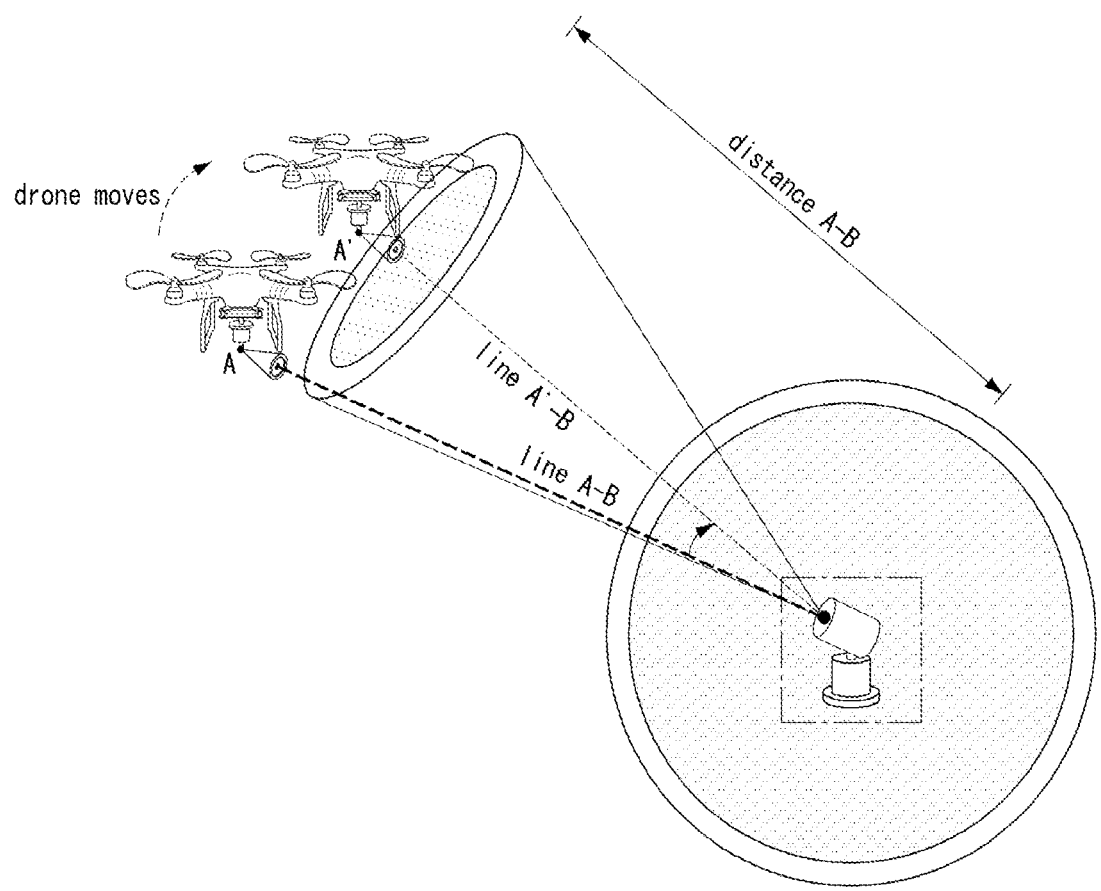

FIGS. 19A to 19B are exemplary diagrams for describing an eleventh exemplary embodiment of a beam control method in a communication system.

Referring to FIGS. 19A and 19B, a communication system may include a plurality of communication nodes that communicate with each other through beams. For example, the communication system includes one MBT and one MBH performing mutual communication through beams. However, this is only an example for convenience of description, and exemplary embodiments of the present disclosure are not limited thereto. The MBT included in the communication system may be the same as or similar to the MBT (A) described with reference to FIGS. 18A to 18C. The MBH included in the communication system may be the same as or similar to the MBH (B) described with reference to FIGS. 18A to 18C. Hereinafter, in describing the eleventh exemplary embodiment of the beam control method in the communication system with reference to FIGS. 19A and 19B, the content overlapping with those described with reference to FIGS. 1 to 18C may be omitted.

An aerial vehicle, such as a drone on which the MBT is mounted, may perform hovering at any one position in the air. Alternatively, the aerial vehicle may move from one position to another position in the air in order to perform a mission. Due to the movement of the aerial vehicle, the position of the MBT may be changed from a position A to a position A'. When the position of the MBT is changed from the position A to the position A', the MBT and the MBH may have to update the beam alignment based on the existing line A-B to the beam alignment based on the line A'-B.

In an exemplary embodiment of the communication system, the MBT may transmit information on a movement path of the MBT to the MBH. Here, information on the movement path of the MBT may be transmitted from the MBT to the MBH by being included in an RRC message transmitted on a DCCH. The information on the movement path of the MBT may include information on a destination. The information on the movement path of the MBT may further include information on intermediate positions to be passed before reaching the destination. On the other hand, in another exemplary embodiment of the communication system, the MBT may move based on the information on the movement path of the MBT indicated by the MBH. In this case, the information on the movement path of the MBT may be transmitted from the MBH to the MBT by being included in an RRC message on a DCCH.

The MBH may calculate direction change values for changing the direction of the MBH PAH from the line A-B to the line A'-B based on the information on the movement path of the MBT. The MBH may calculate values such as an MBH offset roll, MBH offset pitch, and MBH offset yaw through a direction change value calculation operation.

The MBT may calculate direction change values for changing the direction of the MBT PAH from the line A-B to the line A'-B based on the information on the movement path of the MBT. The MBT may calculate values such as an MBT offset roll, MBT offset pitch, and MBT offset yaw through a direction change value calculation operation.

The MBH may instruct the MBT to perform beam alignment based on the movement of both the MBH and the MBT. The MBH may transmit, to the MBT, a message identical or similar to the RRC message described with reference to FIG. 18B on a DCCH. Here, the value of the MBH-driven beam alignment stop flag may be set to 'mutual-movement (2)'. The MBH-driven beam alignment activation time may be set based on a time required for the MBT to prepare for the movement. The duration time may be set based on a time required for the MBT to move from the position A to the position A'.

For example, when the MBH-driven beam alignment information of the RRC message received by the MBT indicates 'mutual-movement (2), activation time (X=1), duration time (Y=10)', the MBT may move the position A to the position A' for 10 seconds after one second elapses from the time when the RRC message is transmitted. The MBT and MBH may adjust their respective antenna directions for 10 seconds after one second elapses from the time when the RRC message is transmitted.

The MBT and MBH may each independently adjust the direction of the antenna, or may adjust the direction of the antenna based on a mutually synchronized direction adjustment schedule. For the synchronized direction adjustment schedule, the MBT and MBH may configure a unit time. For example, when the MBH offset roll, MBH offset pitch, and MBH offset yaw are 3°, 4°, and 2° respectively, the MBT offset roll, MBT offset pitch, and MBT offset yoga are 0°, 7°, and 8° respectively, and the unit time mutually configured by the MBT and MBH is one second, the MBT and MBH may adjust the directions of the antennas based on the synchronized direction adjustment schedule configured identically or similarly to that shown in Table 2.

TABLE 2

| | MBH | | | MBT | | |
|---|---|---|---|---|---|---|
| Step | Offset roll | Offset pitch | Offset yaw | Offset roll | Offset pitch | Offset yaw |
| 0 | 0.000 | 0.000 | 0.000 | 0.000 | 0.000 | 0.000 |
| 1 | 0.300 | 0.400 | 0.200 | 0.000 | 0.700 | 0.800 |
| 2 | 0.600 | 0.800 | 0.400 | 0.000 | 1.400 | 1.600 |
| 3 | 0.900 | 1.200 | 0.600 | 0.000 | 2.100 | 2.400 |
| 4 | 1.200 | 1.600 | 0.800 | 0.000 | 2.800 | 3.200 |
| 5 | 1.500 | 2.000 | 1.000 | 0.000 | 3.500 | 4.000 |
| 6 | 1.800 | 2.400 | 1.200 | 0.000 | 4.200 | 4.800 |
| 7 | 2.100 | 2.800 | 1.400 | 0.000 | 4.900 | 5.600 |
| 8 | 2.400 | 3.200 | 1.600 | 0.000 | 5.600 | 6.400 |
| 9 | 2.700 | 3.600 | 1.800 | 0.000 | 6.300 | 7.200 |
| 10 | 3.000 | 4.000 | 2.000 | 0.000 | 7.000 | 8.000 |

When the movement of the MBT and the direction adjustment of the antennas of the MBT and the MBH are completed, the MBT may perform communication with the MBH in a beam aligned state at the position A'. On the other hand, as the communication path between the MBT and the MBH is changed from the line A-B to the line A'-B, the communication distance between the MBT and the MBH may also be changed from the distance A-B to the distance A'-B. The MBT and/or MBH may further perform an operation of changing a beam strength according to the change in the communication distance.

[Backup Aerial Vehicle Based Beam Alignment Procedure]

Figure 20A:
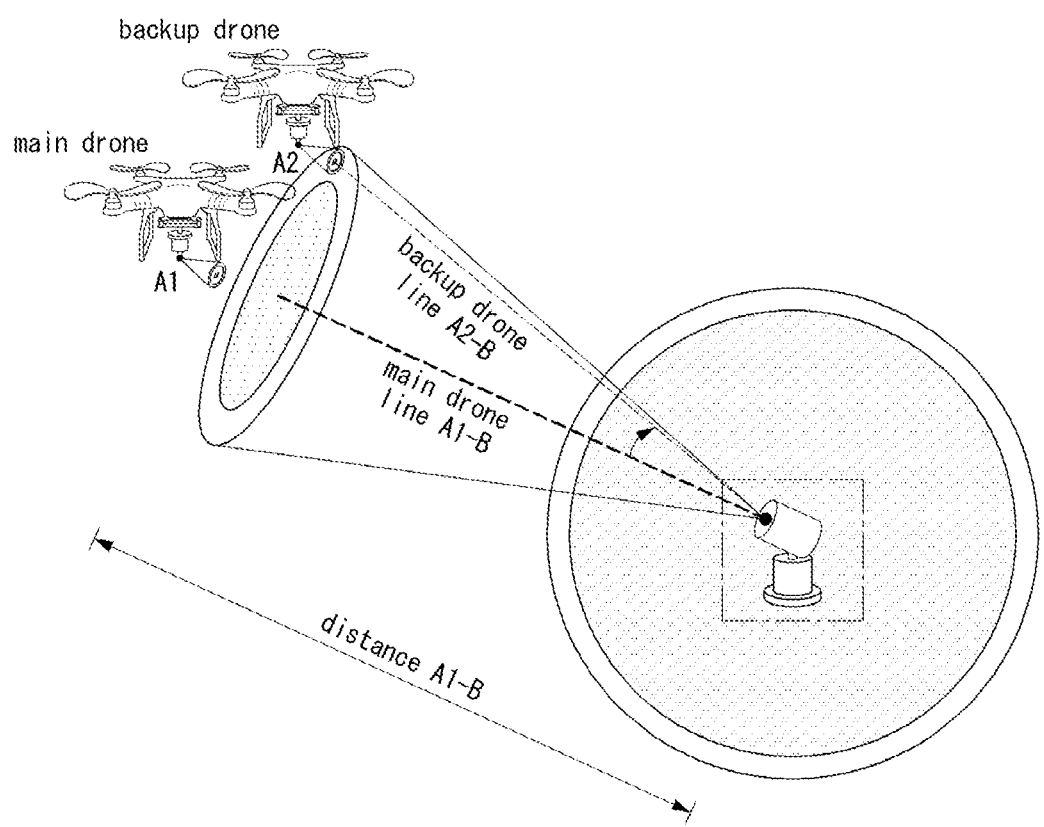
FIGS. 20A to 20B are exemplary diagrams for describing a twelfth exemplary embodiment of a beam control method in a communication system.
Figure 20B:
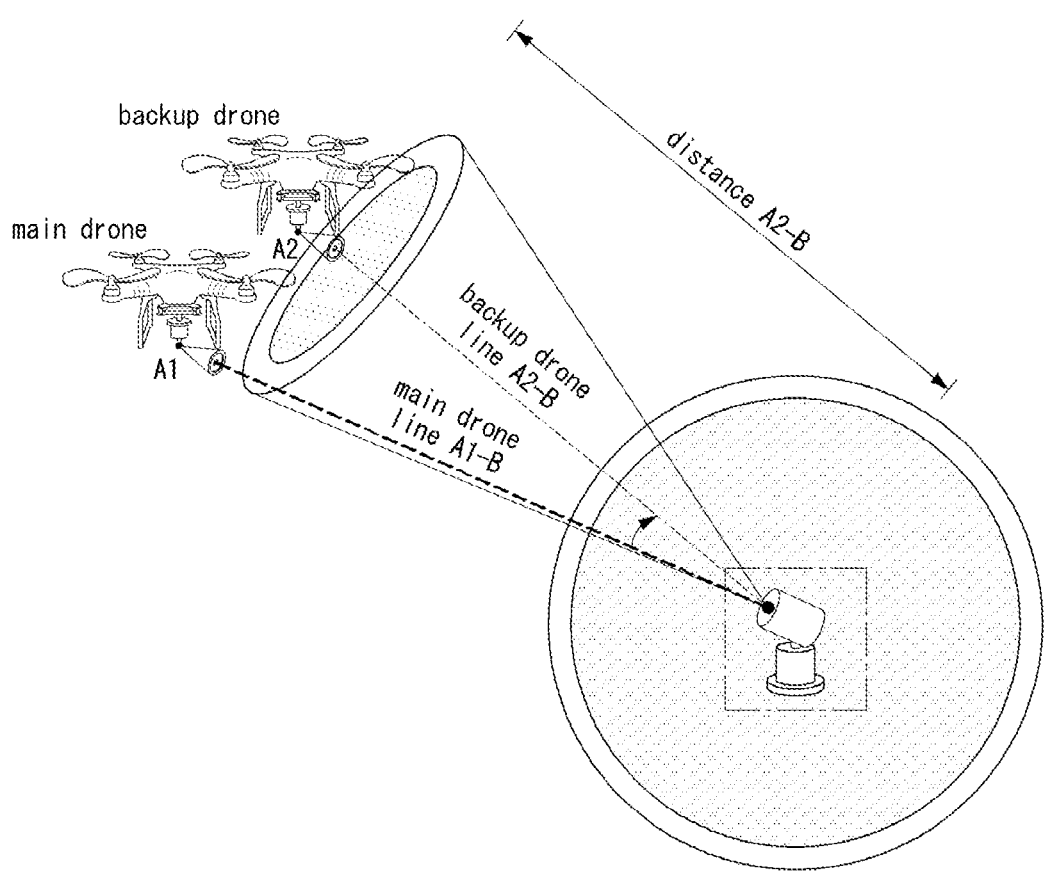

FIGS. 20A to 20B are exemplary diagrams for describing a twelfth exemplary embodiment of a beam control method in a communication system.

Referring to FIGS. 20A and 20B, a communication system may include a plurality of communication nodes that communicate with each other through beams. For example, the communication system includes first and second MBTs and one MBH performing mutual communication through beams. However, this is only an example for convenience of description, and exemplary embodiments of the present disclosure are not limited thereto. The first and second MBTs included in the communication system may be the same as or similar to the MBT (A) described with reference to FIGS. 18A to 18C. The MBH included in the communication system may be the same as or similar to the MBH (B) described with reference to FIGS. 18A to 18C. Hereinafter, in describing the twelfth exemplary embodiment of the beam control method in the communication system with reference to FIGS. 20A and 20B, the content overlapping with those described with reference to FIGS. 1 to 19B may be omitted.

An aerial vehicle such as a drone on which the MBT is mounted may perform flight in the air. If the aerial vehicle is operated with its own fuel or its own battery without a separate wired connection, there may be restrictions on a flight time. Therefore, in order to continuously perform a mission, it may be necessary to replace an aerial vehicle whose fuel or battery has been exhausted more than a certain amount by an additional aerial vehicle serving as a backup. For example, FIGS. 20A and 20B show a procedure in which a main drone equipped with the first MBT is replaced by a backup drone equipped with the second MBT. When the backup drone replaces the main drone, the MBH that previously communicated with the first MBT may have to communicate with the second MBT. In an exemplary embodiment of the communication system, when the main drone deviates from the existing position and the backup drone moves to the existing position of the main drone, the second MBT may perform communication with the MBH at the position where the first MBT communicated with the MBH. On the other hand, in another exemplary embodiment of the communication system, when the backup drone moves to a position adjacent to the main drone, the MBH may perform an operation of changing the direction of the antenna from the direction toward the first MBT to the direction toward the second MBT. In an exemplary embodiment of the communication system, the first MBT and/or the second MBT may transmit, to the MBH, MBT replacement information including information indicating that the second MBT is to replace the first MBT, and information on the position of the second MBT. For example, the MBT replacement information may be transmitted from the first MBT to the MBH by being included in an RRC message transmitted on a DCCH. On the other hand, in another exemplary embodiment of the communication system, the first and second MBTs may perform a replacement procedure based on MBT replacement information indicated from the MBH. In this case, the MBT replacement information may be transmit from the MBH to the first and second MBTs by being included in an RRC message on a DCCH.

The MBH may calculate direction change values for changing the direction of the MBH PAH from the line A1-B to the line A2-B based on the MBT replacement information. The MBH may calculate values such as an MBH offset roll, MBH offset pitch, and MBH offset yaw through a direction change value calculation operation.

The MBH may instruct the first and second MBTs to stop the beam alignment operation for a predetermined time. The MBH may transmit a message identical or similar to the RRC message described with reference to FIG. 18B to the first and second MBTs on a DCCH. Here, the value of the MBH-driven beam alignment stop flag may be set to 'setup (1)'. The MBH-driven beam alignment activation time may be set based on a time required for the MBH to prepare for the antenna direction change. The duration time may be set based on a time required for the MBH to change the direction of the antenna from the direction A1 to the direction A2. Alternatively, the duration time may be set based on a time required for the backup drone to take over the mission of the main drone.

For example, when the MBH-driven beam alignment information of the RRC message received by the first and second MBTs indicates 'setup (1), activation time (X=1), duration time (Y=10)', the first and second MBTs may stop the beam alignment operation based on change of the directions of the respective antennas for 10 seconds after 1 second elapses from the time when the RRC message is transmitted. The MBH may adjust the direction of the MBH antenna for 10 seconds after one second elapses from the time when the RRC message is transmitted.

In an exemplary embodiment of the communication system, the MBH may adjust the direction of the antenna based on a predetermined direction adjustment schedule. For the direction adjustment schedule, the MBH may configure a unit time. For example, when the MBH offset roll, MBH offset pitch, and MBH offset yoga are 3°, 4°, and 2° respectively, and the preset unit time is one second, the MBH may adjust the direction of the antenna based on the direction adjustment schedule configured identically or similarly to that shown in Table 3.

TABLE 3

| | MBH | | |
|---|---|---|---|
| Step | Offset roll | Offset pitch | Offset yaw |
| 0 | 0.000 | 0.000 | 0.000 |
| 1 | 0.300 | 0.400 | 0.200 |
| 2 | 0.600 | 0.800 | 0.400 |
| 3 | 0.900 | 1.200 | 0.600 |
| 4 | 1.200 | 1.600 | 0.800 |
| 5 | 1.500 | 2.000 | 1.000 |
| 6 | 1.800 | 2.400 | 1.200 |
| 7 | 2.100 | 2.800 | 1.400 |
| 8 | 2.400 | 3.200 | 1.600 |
| 9 | 2.700 | 3.600 | 1.800 |
| 10 | 3.000 | 4.000 | 2.000 |

When the direction adjustment of the antenna of the MBH is completed, the second MBT may perform communication with the MBH at the position A2. Meanwhile, as the communication path of the MBH is changed from the line A1-B to the line A2-B, the communication distance may also be changed from the distance A1-B to the distance A2-B. The MBH may further perform an operation of changing a beam strength according to the change in the communication distance.

At least some of the exemplary embodiments of the present disclosure described with reference to FIGS. 1 to 20B may be applied to a beam alignment operation between a communication node mounted on an aerial vehicle and a communication node performing communication at a predetermined position on the ground. At least some of the exemplary embodiments of the present disclosure described with reference to FIGS. 1 to 20B may be equally or similarly applied to a beam alignment operation between a plurality of communication nodes mounted on aerial vehicles.

At least some of the exemplary embodiments of the present disclosure described with reference to FIGS. 1 to 20B may be applied when a communication medium is a beam having a high frequency such as a millimeter wave or a higher frequency. At least some of the exemplary embodiments of the present disclosure described with reference to FIGS. 1 to 20B may be equally or similarly applied to a beam alignment operation in free space optic (FSO) communication or communication using laser beams.

At least some of the exemplary embodiments of the present disclosure described with reference to FIGS. 1 to 20B may be equally or similarly applied to a beam alignment operation between high-spec communication devices with a maximum communication distance exceeding 10 km. For example, at least some of the exemplary embodiments of the present disclosure described with reference to FIGS. 1 to 20B may be equally or similarly applied to a beam alignment operation of a military beam having a maximum communication distance exceeding 100 km.

According to exemplary embodiments of the present disclosure, a beam alignment operation for communication between a communication node mounted on an aerial vehicle such as an aerial base station and another communication node can be effectively performed. To this end, each communication node may process coordinate information based on a plurality of coordinate systems such as a GPS coordinate system, a geocentric coordinate system (GCS), an RVCS coordinate system, and a PAH coordinate system. According to exemplary embodiments of the present disclosure, the aerial base station performing communication in the air can effectively maintain a wireless connection with another communication node on the ground or in the air, such as a wireless backhaul link for communication with a core network.

However, effects that can be achieved by the method and apparatus for controlling an aerial base station in a wireless communication system according to exemplary embodiments of the present disclosure are not limited to those mentioned above. From the configurations described in the present disclosure, other effects not mentioned above may be clearly understood by those of ordinary skill in the art to which the present disclosure belongs.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A beam alignment method performed by a first communication node in a communication system, the beam alignment method comprising:
   identifying a position of a first antenna of the first communication node;
   configuring a first coordinate system based on a physical position and direction of the first antenna, based on information on the position of the first antenna;
   identifying a position of a second antenna of a second communication node of the communication system;
   converting information on the position of the second antenna into coordinate information based on the first coordinate system;
   calculating direction change values of the first antenna based on the information on the position of the second antenna, which is converted based on the first coordinate system;
   changing a direction of the first antenna based on the direction change values of the first antenna;
   updating a beam alignment state between the first and second antennas by re-identifying information on the position of the first antenna when a predetermined timer event occurs and updating the first coordinate system based on the re-identified information on the position of the first antenna;
   re-converting the information on the position of the second antenna based on the updated first coordinate system; and
   recalculating the direction change values of the first antenna based on the re-converted information on the position of the second antenna.

2. The beam alignment method according to claim 1, wherein the first coordinate system is a VWU coordinate system with the physical position of the first antenna as an origin and the direction of the first antenna as a V axis.

3. The beam alignment method according to claim 1, wherein the recalculating of the direction change values comprises:
   comparing the recalculated direction change values of the first antenna with preset change margins; and
   changing the direction of the first antenna again based on the recalculated direction change values of the first antenna when the recalculated direction change values of the first antenna exceed the preset change margins.

4. The beam alignment method according to claim 1, further comprising:
   receiving a first signal transmitted from the second communication node; and
   adjusting the beam alignment state between the first and second antennas based on information included in the first signal.

5. The beam alignment method according to claim 4, wherein the first signal includes information on a transmission (TX) power and a beam width of a beam transmitted from the second communication node, and the adjusting of the beam alignment state comprises:
   calculating an estimated range of a reception power (RP) when a beam transmitted from the second communication node is received at the first antenna, based on the information included in the first signal;
   receiving a beam transmitted from the second communication node;
   calculating an RP of the beam transmitted from the second communication node; and
   in response to determining that the RP of the beam transmitted from the second communication node is within the estimated range of the RP, determining that the beam alignment state is normal.

6. The beam alignment method according to claim 4, wherein the first signal includes information on a transmission (TX) power and a beam width of a beam transmitted from the second communication node, and the adjusting of the beam alignment state comprises:

calculating an estimated range of a reception power (RP) when a beam transmitted from the second communication node is received at the first antenna, based on the information included in the first signal;

receiving a first beam transmitted from the second communication node;

calculating an RP of the first beam;

in response to determining that the RP of the first beam is outside the estimated range of the RP, estimating an optimal reception point through physical control on the first antenna; and controlling the first antenna based on the estimated optimal reception point.

7. The beam alignment method according to claim 6, wherein the estimating of the optimal reception point comprises:

receiving beams through the first antenna at each of three predetermined points, the beams being transmitted from the second communication node; and estimating a specific point between the three predetermined points as the optimal reception point based on RPs measured at the three predetermined points, wherein the three predetermined points are determined based on one of a projected area in which the beams transmitted from the second communication node are projected at a position of the first communication node, and a maximum rotatable angle supported by a direction control device in which an antenna of the first communication node is installed.

8. The beam alignment method according to claim 6, wherein the estimating of the optimal reception point comprises:

receiving beams through the first antenna at each of three predetermined points, the beams being transmitted from the second communication node; and estimating a specific point between the three predetermined points as the optimal reception point based on RPs measured at the three predetermined points, wherein the three predetermined points are determined based on a predetermined movement interval reference set for an aerial vehicle on which the first communication node is mounted.

9. The beam alignment method according to claim 4, wherein the adjusting of the beam alignment state comprises:

determining whether the beam alignment state is normal based on at least one of information on the position of the second antenna included in the first signal or information on the position of the first antenna identified by the second communication node; and in response to determining that the beam alignment state is not normal, adjusting the beam alignment state by physically controlling the first antenna based on the information included in the first signal.

10. The beam alignment method according to claim 4, wherein the adjusting of the beam alignment state comprises:

determining whether the beam alignment state is normal based on at least one of information on the position of the second antenna included in the first signal or information on the position of the first antenna identified by the second communication node; and in response to determining that the beam alignment state is not normal, adjusting the beam alignment state by physically controlling an aerial vehicle on which the first communication node is mounted based on the information included in the first signal.

11. The beam alignment method according to claim 1, further comprising:

identifying information on a movement path of the second communication node;

transmitting, to the second communication node, a second signal indicating to change a direction of the second antenna based on the information on the movement path of the second communication node; and changing the direction of the first antenna based on information indicated by the second signal.

12. The beam alignment method according to claim 1, further comprising:

identifying replacement information indicating that a third communication node of the communication system is to replace the second communication node;

transmitting, to the second and third communication nodes, a third signal indicating not to change directions of the second antenna and a third antenna of the third communication node for a predetermined time, based on the replacement information; and changing the direction of the first antenna based on information indicated by the third signal.

13. A first communication node performing beam alignment in a communication system, the first communication node comprising:

a processor;

a memory electronically communicating with the processor; and instructions stored in the memory, wherein when executed by the processor, the instructions cause the first communication node to:

identify a position of a first antenna of the first communication node;

configure a first coordinate system based on a physical position and direction of the first antenna, based on information on the position of the first antenna;

identify a position of a second antenna of a second communication node of the communication system;

convert information on the position of the second antenna into coordinate information based on the first coordinate system;

calculate direction change values of the first antenna based on the information on the position of the second antenna, which is converted based on the first coordinate system;

change a direction of the first antenna based on the direction change values of the first antenna;

update a beam alignment state between the first and second antennas by re-identifying information on the position of the first antenna when a predetermined timer event occurs and updating the first coordinate system based on the re-identified information on the position of the first antenna;

re-convert the information on the position of the second antenna based on the updated first coordinate system; and recalculate the direction change values of the first antenna based on the re-converted information on the position of the second antenna.

14. The first communication node according to claim 13, wherein the first coordinate system is a VWU coordinate system with the physical position of the first antenna as an origin and the direction of the first antenna as a V axis.

15. The first communication node according to claim 13, wherein the instructions further cause the first communication node to:
- receive a first signal transmitted from the second communication node; and
- adjust the beam alignment state between the first and second antennas based on information included in the first signal.

16. The first communication node according to claim 13, wherein the instructions further cause the first communication node to:
- identify information on a movement path of the second communication node;
- transmit, to the second communication node, a second signal indicating to change a direction of the second antenna based on the information on the movement path of the second communication node; and
- change the direction of the first antenna based on information indicated by the second signal.

17. The first communication node according to claim 13, wherein the instructions further cause the first communication node to:
- identify replacement information indicating that a third communication node of the communication system is to replace the second communication node;
- transmit, to the second and third communication nodes, a third signal indicating not to change directions of the second antenna and a third antenna of the third communication node for a predetermined time, based on the replacement information; and
- change the direction of the first antenna based on information indicated by the third signal.

* * * * *